United States Patent
Karinta et al.

(10) Patent No.: US 10,496,488 B2
(45) Date of Patent: Dec. 3, 2019

(54) METHODS AND SYSTEMS FOR CLONE MANAGEMENT

(71) Applicant: NETAPP, INC., Sunnyvale, CA (US)

(72) Inventors: Vineeth Karinta, Fremont, CA (US); Santosh C. Lolayekar, Saratoga, CA (US); Vrishali Namdeo Thorat, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 493 days.

(21) Appl. No.: 14/695,356

(22) Filed: Apr. 24, 2015

(65) Prior Publication Data

US 2016/0188415 A1 Jun. 30, 2016

Related U.S. Application Data

(60) Provisional application No. 62/098,601, filed on Dec. 31, 2014.

(51) Int. Cl.
*G06F 16/00* (2019.01)
*G06F 7/00* (2006.01)
(Continued)

(52) U.S. Cl.
CPC ...... *G06F 11/1451* (2013.01); *G06F 11/1446* (2013.01); *G06F 11/1471* (2013.01); *G06F 16/172* (2019.01); *G06F 16/183* (2019.01); *G06F 16/185* (2019.01); *G06F 16/188* (2019.01); *G06F 16/951* (2019.01); *G06F 21/6218* (2013.01); *H04L 67/1002* (2013.01); *H04L 67/1097* (2013.01);
(Continued)

(58) Field of Classification Search
CPC ............. G06F 11/1469; G06F 11/1458; G06F 11/1451; G06F 11/1461; G06F 11/1464; G06F 16/128; G06F 16/27
USPC ........................................................ 707/764
See application file for complete search history.

(56) References Cited

U.S. PATENT DOCUMENTS

| 6,704,885 B1 | 3/2004 | Salas-Meza et al. |
| 7,926,087 B1 | 4/2011 | Holl, II et al. |

(Continued)

OTHER PUBLICATIONS

Final Office Action dated Feb. 24, 2017 for U.S. Appl. No. 14/695,362.
(Continued)

*Primary Examiner* — Usmaan Saeed
*Assistant Examiner* — Raquel Perez-Arroyo
(74) *Attorney, Agent, or Firm* — Klein, O'Neill & Singh, LLP

(57) ABSTRACT

Methods and systems for storage services is provided. An inventory view listing a plurality of application objects of an application from among a plurality of applications is provided on a display device by a management device that interfaces with a plurality of application plugins executed by one or more host computing devices that interface with the plurality of applications for managing backup, restore and clone operations involving objects that are stored on behalf of the plurality of applications by a storage system. A clone dataset object for an application object is selected from the plurality of application objects of the application. A clone lifecycle option for the clone dataset object is selected for managing lifecycle of a clone of a backup of the selected application object.

20 Claims, 53 Drawing Sheets

(51) Int. Cl.
*G06F 11/14* (2006.01)
*G06F 16/172* (2019.01)
*G06F 16/182* (2019.01)
*G06F 16/185* (2019.01)
*G06F 16/188* (2019.01)
*G06F 16/951* (2019.01)
*G06F 21/62* (2013.01)
*H04L 29/08* (2006.01)
*G06F 11/20* (2006.01)

(52) U.S. Cl.
CPC ...... *G06F 11/2094* (2013.01); *G06F 2201/80* (2013.01); *G06F 2201/815* (2013.01); *G06F 2201/82* (2013.01); *G06F 2201/84* (2013.01); *G06F 2201/86* (2013.01); *G06F 2221/2113* (2013.01)

(56) References Cited

U.S. PATENT DOCUMENTS

| | | | |
|---|---|---|---|
| 8,429,140 | B1 | 4/2013 | Lolayekar et al. |
| 8,453,159 | B2 | 5/2013 | Appelbaum et al. |
| 8,489,811 | B1 | 7/2013 | Corbett et al. |
| 8,635,189 | B1 | 1/2014 | Tenzer |
| 9,197,538 | B2 | 11/2015 | Hopen et al. |
| 9,804,929 | B2 | 10/2017 | Karinta et al. |
| 9,805,075 | B1* | 10/2017 | Bachu ................ G06F 9/4843 |
| 2003/0018657 | A1 | 1/2003 | Monday |
| 2005/0182910 | A1* | 8/2005 | Stager ................ G06F 11/1456 711/162 |
| 2006/0242229 | A1 | 10/2006 | Kinsey et al. |
| 2007/0073791 | A1 | 3/2007 | Bruce et al. |
| 2007/0186127 | A1 | 8/2007 | Desai et al. |
| 2007/0217436 | A1 | 9/2007 | Markley et al. |
| 2007/0220320 | A1 | 9/2007 | Sen et al. |
| 2008/0120302 | A1 | 5/2008 | Thompson et al. |
| 2008/0172414 | A1* | 7/2008 | Tien ................ G06Q 10/06 |
| 2008/0320003 | A1 | 12/2008 | Heinson et al. |
| 2010/0070448 | A1 | 3/2010 | Omoigui |
| 2010/0115334 | A1* | 5/2010 | Malleck ................ G06F 9/485 714/15 |
| 2010/0211547 | A1* | 8/2010 | Kamei ................ G06F 11/1451 707/649 |
| 2011/0107327 | A1 | 5/2011 | Barkie et al. |
| 2012/0109958 | A1* | 5/2012 | Thakur ............ G06F 17/30082 707/737 |
| 2013/0054531 | A1* | 2/2013 | Susairaj ............ G06F 17/30306 707/640 |
| 2014/0082167 | A1 | 3/2014 | Robinson et al. |
| 2014/0282472 | A1* | 9/2014 | Vinograd ................ G06F 8/63 717/170 |
| 2014/0310679 | A1 | 10/2014 | Bhattacharya et al. |
| 2014/0359238 | A1* | 12/2014 | Imazaki ................ C09K 5/16 711/162 |
| 2015/0012571 | A1 | 1/2015 | Powell et al. |
| 2015/0074536 | A1* | 3/2015 | Varadharajan ........ G06F 16/188 715/734 |
| 2015/0134618 | A1 | 5/2015 | Teterin et al. |
| 2016/0004721 | A1* | 1/2016 | Iyer ................ G06F 17/30212 707/649 |
| 2016/0072727 | A1 | 3/2016 | Leafe et al. |
| 2016/0188417 | A1 | 6/2016 | Karinta et al. |
| 2016/0188421 | A1 | 6/2016 | Karinta et al. |
| 2016/0188621 | A1 | 6/2016 | Karinta et al. |
| 2016/0188898 | A1 | 6/2016 | Karinta et al. |

OTHER PUBLICATIONS

Non-Final Office Action dated Jun. 1, 2017 for U.S. Appl. No. 14/747,267.
Non-Final Office Action dated Jun. 2, 2017 for U.S. Appl. No. 14/695,362.
Notice of Allowance dated Jun. 20, 2017 for U.S. Appl. No. 14/747,267.
Non-Final Office Action dated Jul. 11, 2017 for U.S. Appl. No. 14/747,357.
Notice of Allowance on co-pending U.S. Appl. No. 14/747,357 dated Aug. 25, 2017.
Non-Final Office Action dated Aug. 12, 2016 for U.S. Appl. No. 14/695,362.
Non-Final Office Action dated May 25, 2017 for U.S. Appl. No. 14/695,349.
Final Office Action on co-pending U.S. Appl. No. 14/695,349 dated Sep. 14, 2017.
Final Office Action on co-pending U.S. Appl. No. 14/695,362 dated Nov. 15, 2017.
Non-Final Office Action on co-pending U.S. Appl. No. 14/695,349 dated May 17, 2018.
Final Office Action of co-pending U.S. Appl. No. 14/695,349 dated Jan. 4, 2019.
Notice of Allowance on related U.S. Appl. No. 14/695,349 dated Jun. 19, 2019.

* cited by examiner

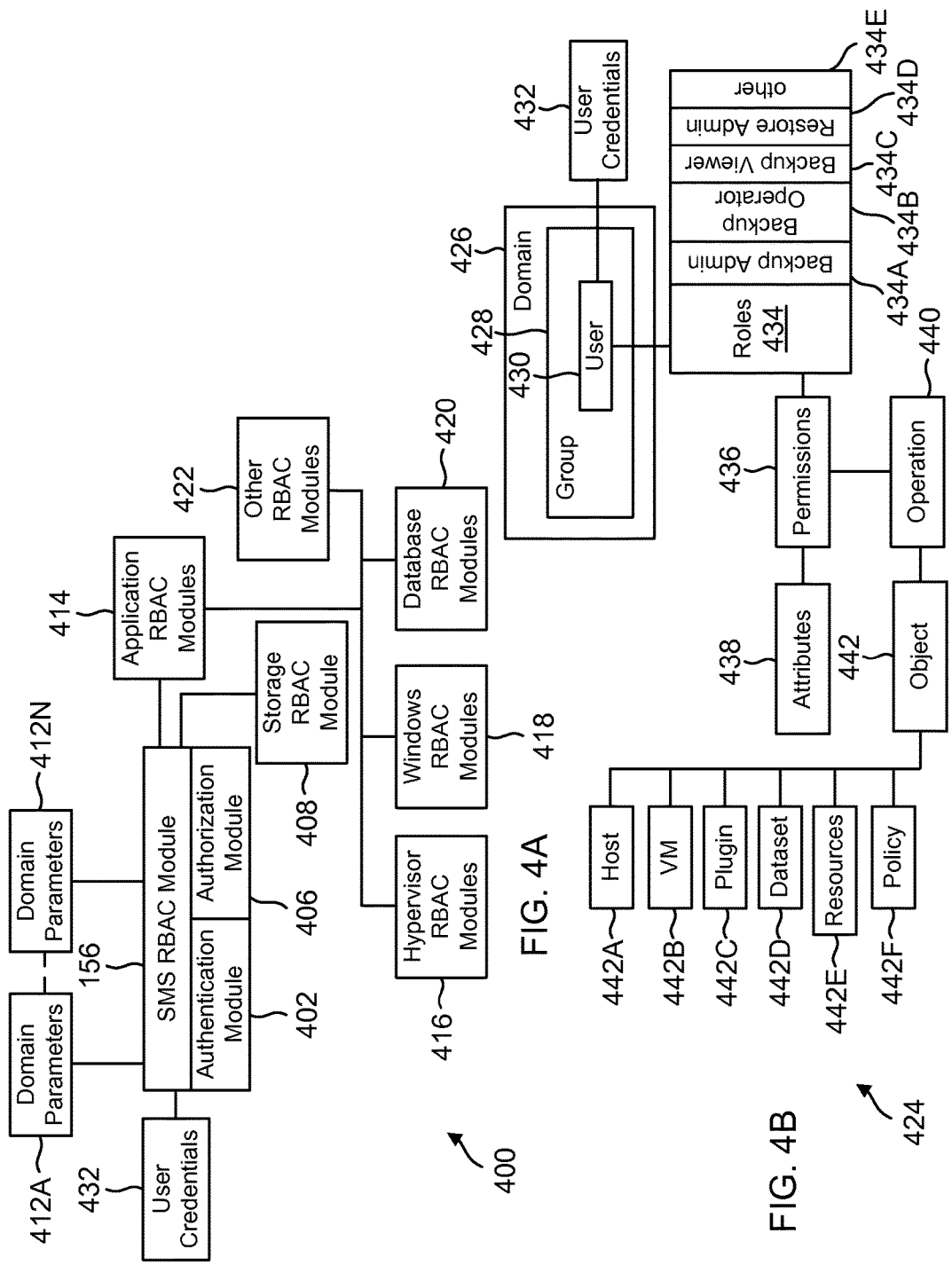

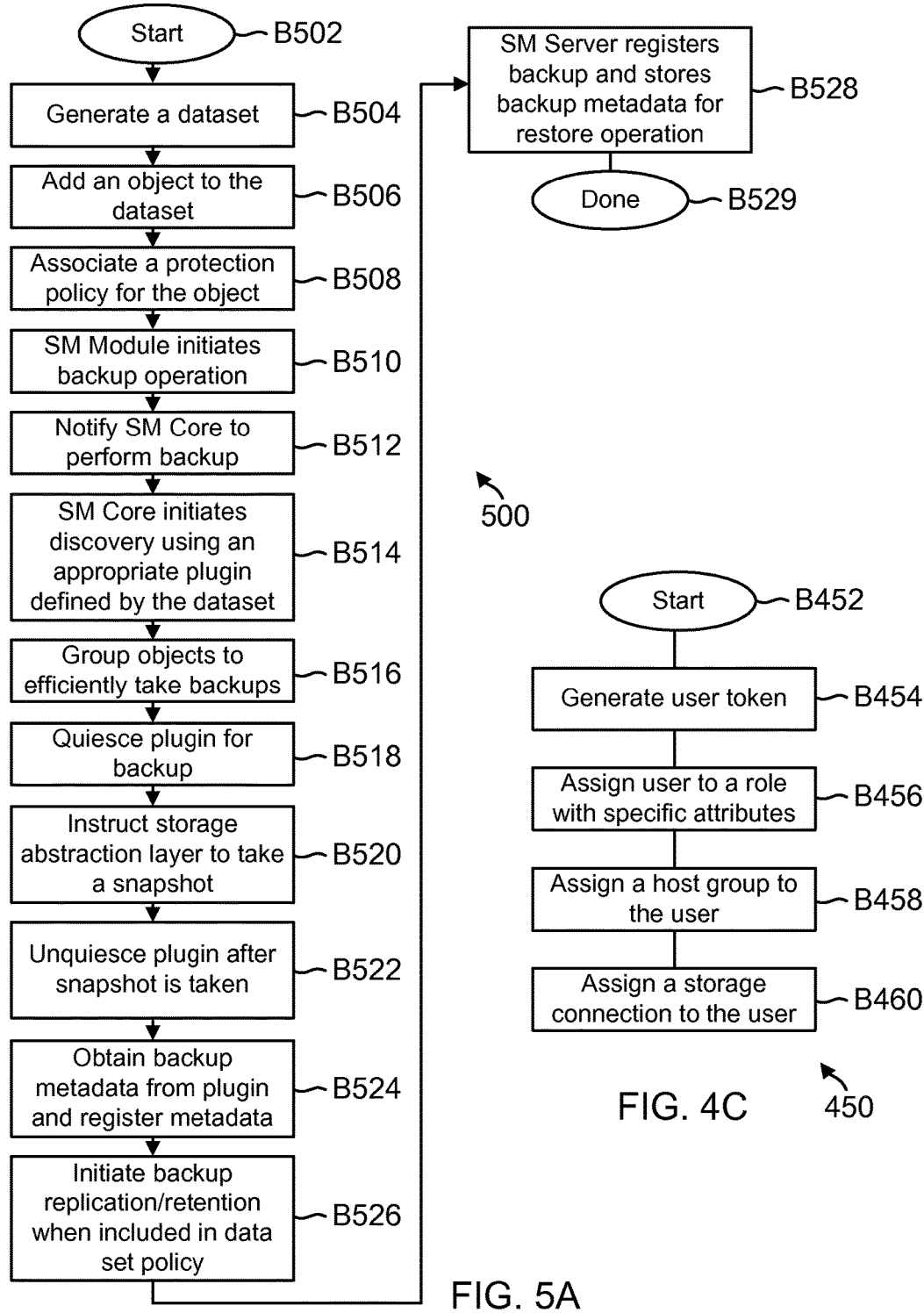

Hosts System View hosts 804C 804D 804E 804F 804G
Hosts DISK SHARE VOLUME IGROUP ISCSI SESSION
804A   804B +Add Host | ▫Remove Host

| Host | Host status | OS | Cluster node | Port |
|---|---|---|---|---|
| Snapstarsql02.SnapStarAD01.... | Unknown | Windows | Non Cluster Node | 8145 |
| WIN-QJM1PHKIIL0.SnapStarA... | Unknown | Windows | Non Cluster Node | 8143 |

Plug-ins 804H
+Add Plug-ins | ▷Start | ▫Stop

| Plug-in | Service | Plug-in status | Installed version | Latest version |
|---|---|---|---|---|

(search)

There is no match for your search or data not available.

- Dashboard
- Hosts 804
- Inventory
- Datasets
- Policies
- Jobs
- Reports
- Administration
- Settings

FIG. 8B

Inventory View

| | | | | | | | |
|---|---|---|---|---|---|---|---|
| Host All ▼ | | Resource Type Database ▼ | | SQL Server Instance All ▼ | | | |
| Datasets 806A | 806B | 806C | 806D | 806E | 806K 806L | 806M | 806N |
| +Add to Dataset ↻Backup Now ↻Restore... ↻Refresh ↻Delete Backup | | | | | (search) | | |
| 806F | | 806G | 806H | 806I | 806J | | Last |
| | | | | | | Last | backup |
| Name | SQL Server | Owner | System database | Selectable Dataset | Policy | backup date | Status |
| model | | snapstarsl02 | snapstarsl02.SnapStarAD01.stl.netapp.com | True | | | |
| msdb | | snapstarsl02 | snapstarsl02.SnapStarAD01.stl.netapp.com | True | | | |
| tempdb | | snapstarsl02 | snapstarsl02.SnapStarAD01.stl.netapp.com | True | | | |
| Test01 | | snapstarsl02 | snapstarsl02.SnapStarAD01.stl.netapp.com | False | | | |
| Test02 | | snapstarsl02 | snapstarsl02.SnapStarAD01.stl.netapp.com | False | True | | |
| AdventureWorks2012 | | snapstarsl02 | snapstarsl02.SnapStarAD01.stl.netapp.com | False | True | | |
| AdventureWorks2012 | | snapstarsl02 | snapstarsl02.SnapStarAD01.stl.netapp.com | False | True | | |
| Test03 | | snapstarsl02 | snapstarsl02.SnapStarAD01.stl.netapp.com | False | True | | |
| Total 9 databases | | | | | | | |

Dashboard
Hosts
Inventory 806
Datasets
Policies
Jobs
Reports
Administration
Settings

FIG. 8C

Reports Pane

- Dashboard
- Hosts
- Inventory
- Jobs
- Reports
- Datasets
- Policies
- Storage
- Settings reports
BACKUP    PLUGIN 814B

OnCommand SnapManager Server Plugin Report

Overview 814F
Plugin:                              SQL
Total backups:                       4
Old backups:                         1
Databases with failed backups:       6
Unprotected databases:               3
Databases with unarchived backups:   3

Protection Status 814G

☐ Failed
☐ Protected
☐ Unprotected 2
6
4

Unprotected databases 814H

| Name     | Host      | Type         |
|----------|-----------|--------------|
| TestDb6  | TestHost2 | SQL Database |
| TestDb10 | TestHost3 | SQL Database |
| TestDb11 | TestHost3 | SQL Database |

Databases with failed backups 814I

| Name    | Host      | Type         |
|---------|-----------|--------------|
| TestDb0 | TestHost1 | SQL Database |
| TestDb1 | TestHost1 | SQL Database |
| TestDb2 | TestHost1 | SQL Database |
| TestDb3 | TestHost2 | SQL Database |
| TestDb4 | TestHost2 | SQL Database |
| TestDb6 | TestHost2 | SQL Database |

Database with unarchived backups

Plugin Type: SQL
Day Count: 7
Dataset:
Host:

Preview

| Administration Pane | | | | | | |
|---|---|---|---|---|---|---|
| | administration | 816E 816F | | | | |
| ▦ Dashboard | ROLES RESOURCES DOWNLOADS | | | | | |
| ⊞ Hosts | Manage roles, users and permissions. | | | | | |
| ▤ Inventory | Roles  816A 816B 816C 816D | | | | | |
| ▥ Datasets | ✚ New  ✎ Modify  ⊕ Assign User  🗑 Delete | | | | search | |
| ◉ Policies | ◆ Role Name | ▲ Type | | | ◆ Description | |
| ▦ Jobs | ◆ | ▲ | | | ◆ | |
| ▦ Reports | Snap* Admin | Administrator | | | Overall administrator of Snap* system | |
| ⊕ Administration | Tenant Admin | Tenant Admin | | | Tenant Admin and related operations | |
| ⤫ Storage | Backup Admin | Backup Admin | | | Backup and related operations | |
| ❀ Dashboard | Total 6 Roles | | | | | |
| | Role Details for Snap* Admin | | | | | |
| | Permissions  Users | | | | | |
| | ✎ Modify | | | | search | |
| 816 | ◆ Name | ▲ Allow create | ◆ Allow read | ◆ Allow update | ◆ Allow delete | |
| | ▲ | ◆ | ◆ | ◆ | ◆ | |
| | DataSet | ✓ | ✓ | ✓ | ✓ | |
| | Policy | ✓ | ✓ | ✓ | ✓ | |
| | Backup | ✓ | ✗ | ✗ | ✗ | |
| | Restore | ✓ | ✓ | ✓ | ✓ | |
| | Host | ✓ | ✓ | ✓ | ✓ | |
| | StorageConnection | ✓ | ✓ | ✓ | ✓ | |
| | Total 6 permissions | | | | | |

FIG. 8S

METHODS AND SYSTEMS FOR CLONE MANAGEMENT

CROSS-REFERENCE TO RELATED APPLICATION

This patent application claims priority under 35 USC § 119 (e) to U.S. Provisional Patent Application Entitled "Centralized Management Center For Managing Services" Ser. No. 62/098,601 filed on Dec. 31, 2014, the disclosure of which is incorporated herein by reference in its entirety.

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to storage systems and more particularly to, centralized management of storage services for a plurality of applications in different operating environments.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively by different applications, for example, electronic mail (email) servers, database applications, virtual machines executed within virtual machine environments (for example, a hypervisor operating environment) and others to store data, protect the data using backups and cloning. Different applications executed at various computing system types have varying requirements for storing information, protecting it by backups and then using restore procedures to restore such backups. The different applications may use different parameters for role based access control to access storage services, storage space or stored data containers (for example, files, directories, structured or unstructured data). Managing stored application objects and providing storage services, for example, backups, restore, cloning and other services in such an environment is a challenge. Continuous efforts are being made to better manage storage services.

SUMMARY

In one aspect, a machine implemented method is provided. The method includes providing an inventory listing of a plurality of application objects of an application from among a plurality of applications on a display device by a management device that interfaces with a plurality of application plugins executed by one or more computing devices interfacing with the plurality of applications for managing backup, restore and cloning operations involving objects that are stored on behalf of the plurality of applications by a storage system; and generating a clone dataset object for an application object selected from among the plurality of application objects of the application, where the clone dataset object format is the same regardless of any application object type maintained by the plurality of applications.

The method further includes selecting a clone lifecycle option for the clone dataset object for managing lifecycle of a clone of a backup of the selected application object, where clone lifecycle involves taking the clone of the backup of the selected application object, deleting the clone and refreshing the clone; associating the clone dataset object with a policy object identifying clone lifecycle preferences, where the policy object format for the plurality of applications and associated application objects is the same; and executing operations associated with the clone lifecycle based on the clone dataset and the policy object, where the management device manages clone lifecycle operations interfacing with the application plugin.

In another aspect, a non-transitory, machine readable storage medium having stored thereon instructions for performing a method is provided. The machine executable code which when executed by at least one machine, causes the machine to: provide an inventory view listing of a plurality of application objects of an application from among a plurality of applications on a display device by a management device that interfaces with a plurality of application plugins executed by one or more computing devices interfacing with the plurality of applications for managing backup, restore and cloning operations involving objects that are stored on behalf of the plurality of applications by a storage system; and generate a clone dataset object for an application object selected from among the plurality of application objects of the application, where the clone dataset object format is the same regardless of any application object type maintained by the plurality of applications.

The machine executable code further causes the machine to select a clone lifecycle option for the clone dataset object for managing lifecycle of a clone of a backup of the selected application object, where clone lifecycle involves taking the clone of the backup of the selected application object, deleting the clone and refreshing the clone; associate the clone dataset object with a policy object identifying clone lifecycle preferences, where the policy object format for the plurality of applications and associated application objects is the same; and execute operations associated with the clone lifecycle based on the clone dataset and the policy object, where the management device manages clone lifecycle operations interfacing with the application plugin.

In yet another aspect, a system having a memory with machine readable medium comprising machine executable code having stored thereon instructions is provided. The processor module of a management device is coupled to the memory to execute the machine executable code to: provide an inventory listing of a plurality of application objects of an application from among a plurality of applications on a display device by the management device that interfaces with a plurality of application plugins executed by one or more computing devices that interface with the plurality of applications for managing backup, restore and cloning operations involving objects that are stored on behalf of the plurality of applications by a storage system; and generate a clone dataset object for an application object selected from among the plurality of application objects of the application, where the clone dataset object format is the same regardless of any application object type maintained by the plurality of applications.

The machine executable code further selects a clone lifecycle option for the clone dataset object for managing lifecycle of a clone of a backup of the selected application object, where clone lifecycle involves taking the clone of the backup of the selected application object, deleting the clone and refreshing the clone; associates the clone dataset object with a policy object identifying clone lifecycle preferences, where the policy object format for the plurality of applications and associated application objects is the same; and executes operations associated with the clone lifecycle based on the clone dataset and the policy object, where the management device manages clone lifecycle operations interfacing with the application plugin.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 4A shows a role based access control (RBAC) format that is used by SMS to provide storage services, according to one aspect of the present disclosure;

FIG. 4B shows a detailed example of the RBAC format used by the SMS, according to one aspect of the present disclosure;

FIG. 4C shows a process flow for configuring RBAC parameters by SMS, according to one aspect of the present disclosure;

FIG. 5A shows a process flow for creating a dataset and then executing a backup workflow, according to one aspect of the present disclosure;

FIG. 8B shows an example of host system view, according to one aspect of the present disclosure;

FIG. 8C shows an example of an inventory view, according to one aspect of the present disclosure;

FIG. 8R shows another example of a reports pane provided by the SMS, according to one aspect of the present disclosure;

FIG. 8S shows an example of an administration GUI screenshot provided by the SMS, according to one aspect of the present disclosure;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
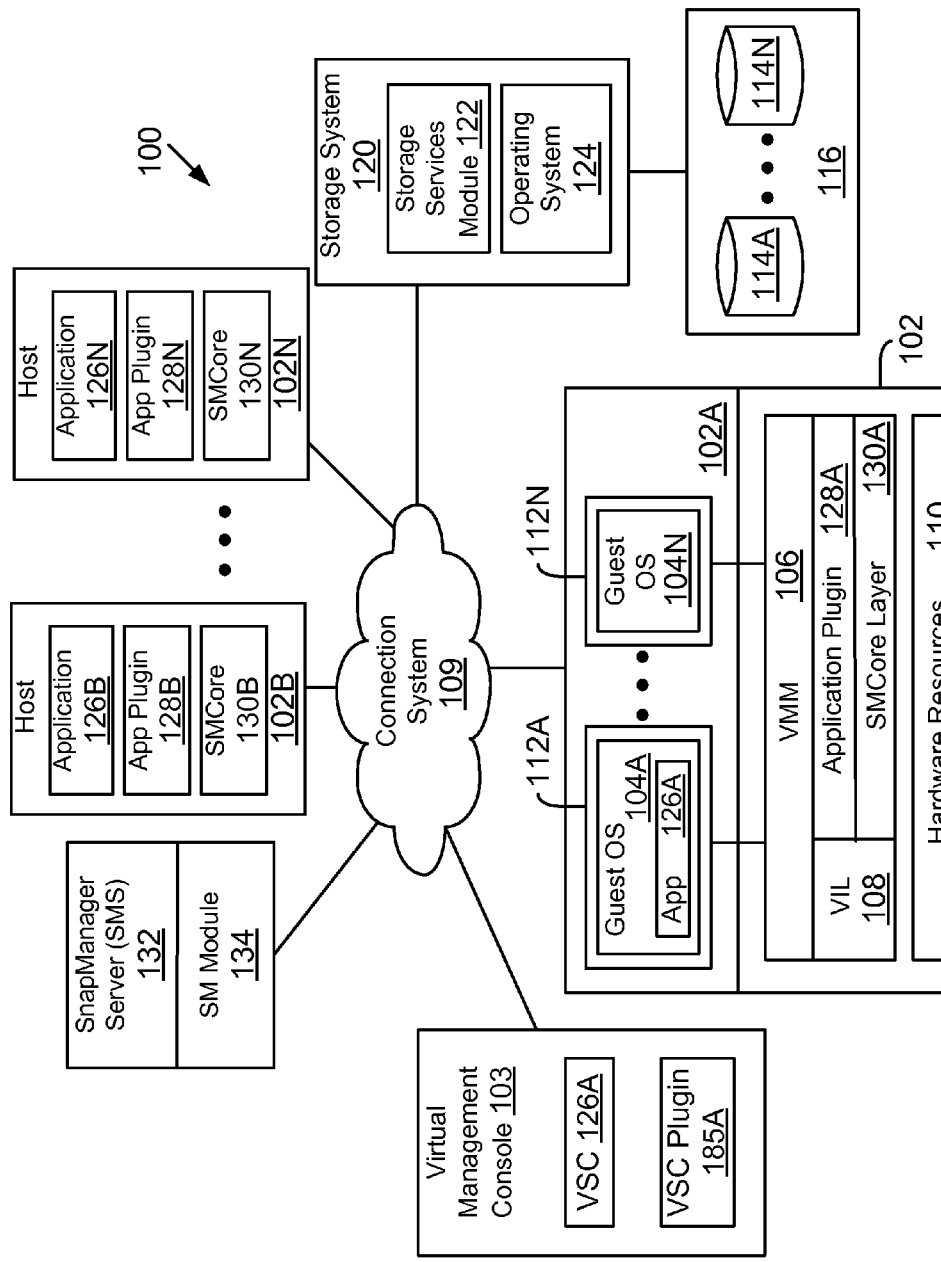
FIG. 1A shows an example of an operating environment for the various aspects disclosed herein.

System 100: FIG. 1A shows an example of a system 100, where the various adaptive aspects disclosed herein may be implemented. In one aspect, system 100 includes at least a host computing system 102 (shown as host systems 102A-102N and may also be referred to as a host platform 102 or simply as server 102) communicably coupled to a storage system 120 executing a storage operating system 124 via a connection system 109 such as a local area network (LAN), wide area network (WAN), the Internet and others. As described herein, the term "communicably coupled" may refer to a direct connection, a network connection, or other connections to enable communication between computing and network devices.

System 100 also includes a centralized snap manager server (also referred to as "SMS" or SM Server) 132 that executes instructions for a snap manager module ("SM module") 134 for coordinating storage services related operations (for example, backups, restore, cloning and other operations) for different applications and plugins, as described below in more detail. Although SMS 132 is shown as a stand-alone module, it may be implemented with other applications, for example, within a virtual machine environment, as described below.

It is also noteworthy that SMS 132 is referred to as a snap manager server as an example, and may be referred to or described using different terminology (for example, a central snap server, a central storage services provider and other descriptive terms). The various aspects described herein are of course not limited by how SMS 132 is categorized or the terminology used to describe its innovative functionality, described below in more detail. Furthermore, SMS 132 and the SM module 134 may be referred to interchangeably throughout this specification.

Host systems 102 may execute a plurality of applications 126A-126N, for example, an email server (Exchange server), a database application (for example, SQL database application, Oracle database application and others) and others. These applications may be executed in different operating environments, for example, a virtual machine environment (described below), Windows, Solaris, Unix and others. The applications may use storage system 120 to store information at storage devices 114.

To protect information associated with each application, a plugin module (shown as application plugin 128A-128N) are provided. The term protect means to backup an application and/or backup associated information (including configuration information, data (files, directories, structured or unstructured data) and others (may jointly be referred to as data containers)).

Each host system also executes a snap manager core (also referred to as SMcore) layer 130A-130N (may be referred to as SMcore layer 130 or SMcore layers 130) that interfaces with SMS 132 and the various application plugins for managing backups, restore, cloning and other operations, as described below in detail.

In one aspect, the storage system 120 has access to a set of mass storage devices 114A-114N (may be referred to as storage devices 114) within at least one storage subsystem 116. The storage devices 114 may include writable storage device media such as magnetic disks, video tape, optical, DVD, magnetic tape, non-volatile memory devices for example, self-encrypting drives, flash memory devices and any other similar media adapted to store structured or non-structured data. The storage devices 114 may be organized as one or more groups of Redundant Array of Independent (or Inexpensive) Disks (RAID). The various aspects disclosed are not limited to any particular storage device or storage device configuration.

The storage system 120 provides a set of storage volumes to the host systems 102 via connection system 109. The storage operating system 124 can present or export data stored at storage devices 114 as a volume (or logical unit number (LUN)). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all of the storage space in multiple storage devices, a RAID group, or any other suitable set of storage space. An aggregate is typically managed by a storage operating system 124 and identified by a unique identifier (not shown). It is noteworthy that the term "disk" as used herein is intended to mean any storage device/space and not to limit the adaptive aspects to any particular type of storage device, for example, hard disks.

The storage system 120 may be used to store and manage information at storage devices 114 based on a request generated by an application executed by a host system or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

In a typical mode of operation, one or more input/output (I/O) commands, such as an NFS or CIFS request, is sent over connection system 109 to the storage system 120. Storage system 120 receives the request, issues one or more I/O commands to storage devices 114 to read or write the data on behalf of the client system, and issues an NFS or CIFS response containing the requested data over the network 109 to the respective client system.

Although storage system 120 is shown as a stand-alone system, i.e. a non-cluster based system, in another aspect, storage system 120 may have a distributed architecture; for example, a cluster based system that may include a separate N-("network") blade and D-(disk) blade. Briefly, the N-blade is used to communicate with host platforms 102, while the D-blade is used to communicate with the storage devices 114. The N-blade and D-blade may communicate with each other using an internal protocol.

Alternatively, storage system 120 may have an integrated architecture, where the network and data components are included within a single chassis. The storage system 120 further may be coupled through a switching fabric to other similar storage systems (not shown) which have their own local storage subsystems. In this way, all of the storage subsystems can form a single storage pool, to which any client of any of the storage servers has access.

Storage system 120 also executes or includes a storage services module 122 that coordinates storage volume backups, cloning, restore and replication for different hosts and different applications. Although storage services module 122 is shown as a single block, it may include various modules to taking backups, cloning restore operations, replicating backups from one location to another and so forth. As described below, backups and other operations may be performed using SMS 132 and snap manager module ("SM module) 134. As an example, taking backups may include taking snapshots, i.e. a point-in-time copy of a storage volume. The point-in-time copy captures all the information in a storage volume. The snapshot may be used to restore a storage volume at any given time.

Storage system 120 also protects snapshots by replicating snapshots stored at a first storage system (may be referred to as primary storage) and replicating it to a secondary storage source. Different technologies, including the SnapVault and SnapMirror technologies of NetApp Inc. (without derogation of any trademark rights of NetApp Inc.) may be used to protect storage volumes.

SnapVault is primarily intended for disk-to-disk backups. SnapVault leverages NetApp Snapshot technology to back up and restore systems at a block level. SnapVault identifies and copies only the changed blocks of a system to secondary storage. SnapMirror takes a mirror copy of a storage volume and stores it at a remote location/disaster recovery site. SnapMirror can occur either at volume level or at a Qtree level. The various techniques described herein are not limited to any specific replication/protection technology.

One or more of the host systems (for example, 102A) may execute a virtual machine environment where a physical resource is time-shared among a plurality of independently operating processor executable virtual machines (also referred to as VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A provides a processor executable virtual machine environment executing a plurality of VMs 112A-112N. VMs 112A-112N that execute a plurality of guest OS 104A-104N (may also be referred to as guest OS 104) that share hardware resources 110. As described above, hardware resources 110 may include CPU, memory, I/O devices, storage or any other hardware resource.

In one aspect, host platform 102A may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host platform 102A.

In one aspect, VMM 106 is executed by host platform 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide virtualization environments, for example, VMware Corporation, Microsoft Corporation and others. The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the SMcore layer 130A that are described below in detail.

To manage virtual and physical resources, system 100 may include a virtual center management console (may be referred to as VCenter (provided by Microsoft Corporation) or VSphere (provided by VMWare Inc.) (without derogation of any third party trademark rights) 103. The management console may execute a management application 126A (referred to as virtual storage console (VSC)) for enabling monitoring of host configuration, provisioning of data stores, application cloning as well as backup and recovery services. VSC 126A is used to manage the storage used by the various VMs. A VSC plugin 185A interfaces between the VSC and other components, as described below in detail. The term VSC plugin and hypervisor plugin are used interchangeably. As an example, the VSC plugin 185A may be executed within VMM, for example, as 128A.

Figure 1B:
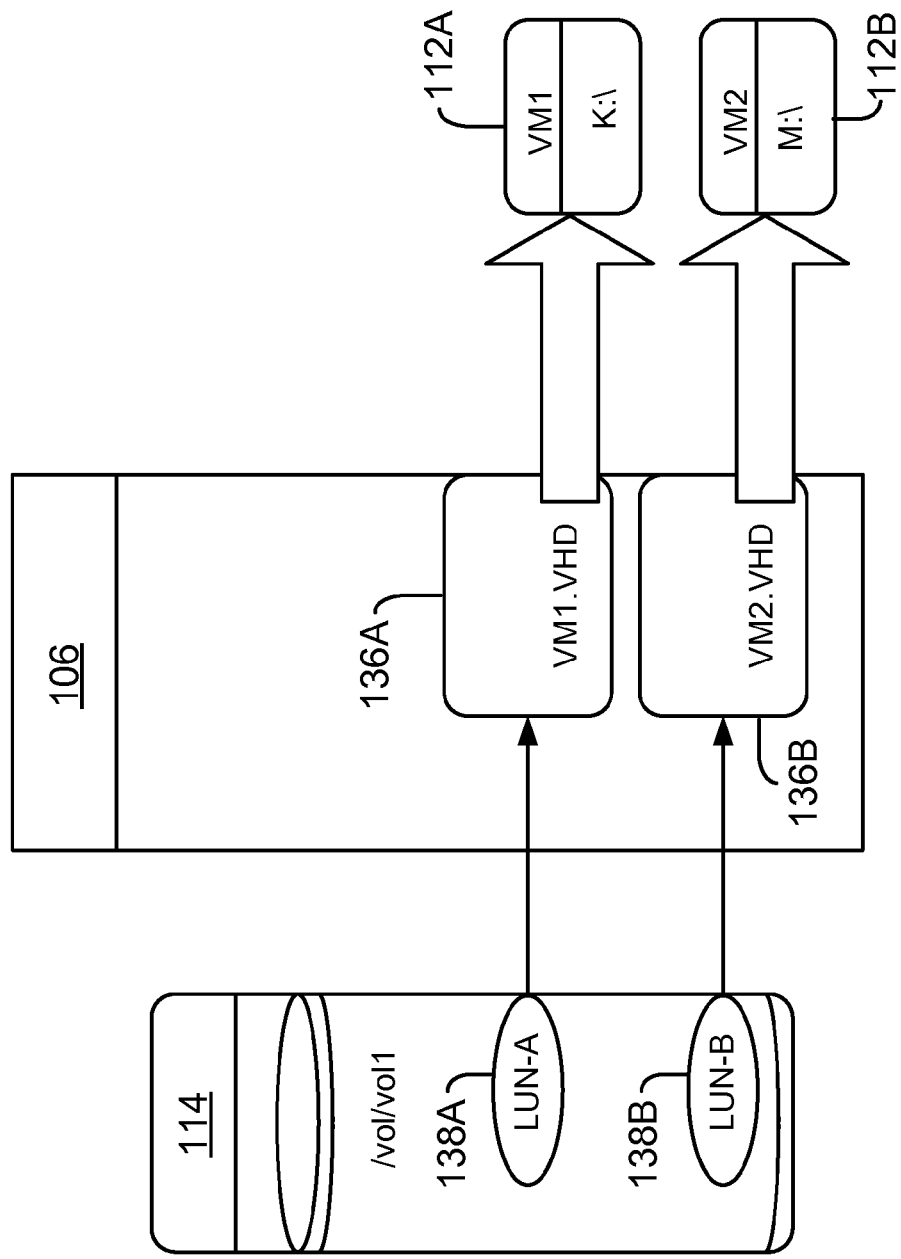
FIG. 1B shows an example of presenting storage space to a virtual machine, according to one aspect.

Virtual Storage: Before describing the details of the various aspects of the present disclosure, the following provides an example of presenting logical storage space to one or more VMs with respect to FIG. 1B. Storage system 120 typically presents storage space at storage device 114 as a LUN to VMM 106. For example, LUN-A 138A and LUN-B 138B at storage device 114 for volume "vol1" are presented to VMM 106 that hosts a plurality of VMs 112A (VM1)-112B (VM2).

A file system for example, a NTFS file system (used in a Windows® operating system environment) is created (for example, by the storage system interface 195, FIG. 1D) on the LUNs and one or more virtual hard drive (VHD) files are also generated for each LUN. The user is presented with a storage drive within a virtual machine. For example, the VHD file VM1.VHD 136A is created on LUN-A 138A and then presented as drive K:\ to VM1 112A. A user using VM1 112A uses K:\ to access storage space for reading and writing information. Similarly, VM2.VHD 136B is created on LUN-B 138B and appears as M:\ drive for VM2 112B. A user using VM2 112B uses M:\ drive to store information.

In some instances, a file system for the LUNs is not created by the storage system interface 195 and instead the LUNs are presented directly to the VM as a storage drive. In such a case, the file system may be created by the guest OS. The storage drives in such an instance may be referred to as "pass through" disks. The terms VHD and pass through disks as used herein for presenting a virtual storage drive to a user via a VM are used interchangeably throughout this specification.

Figure 1C:
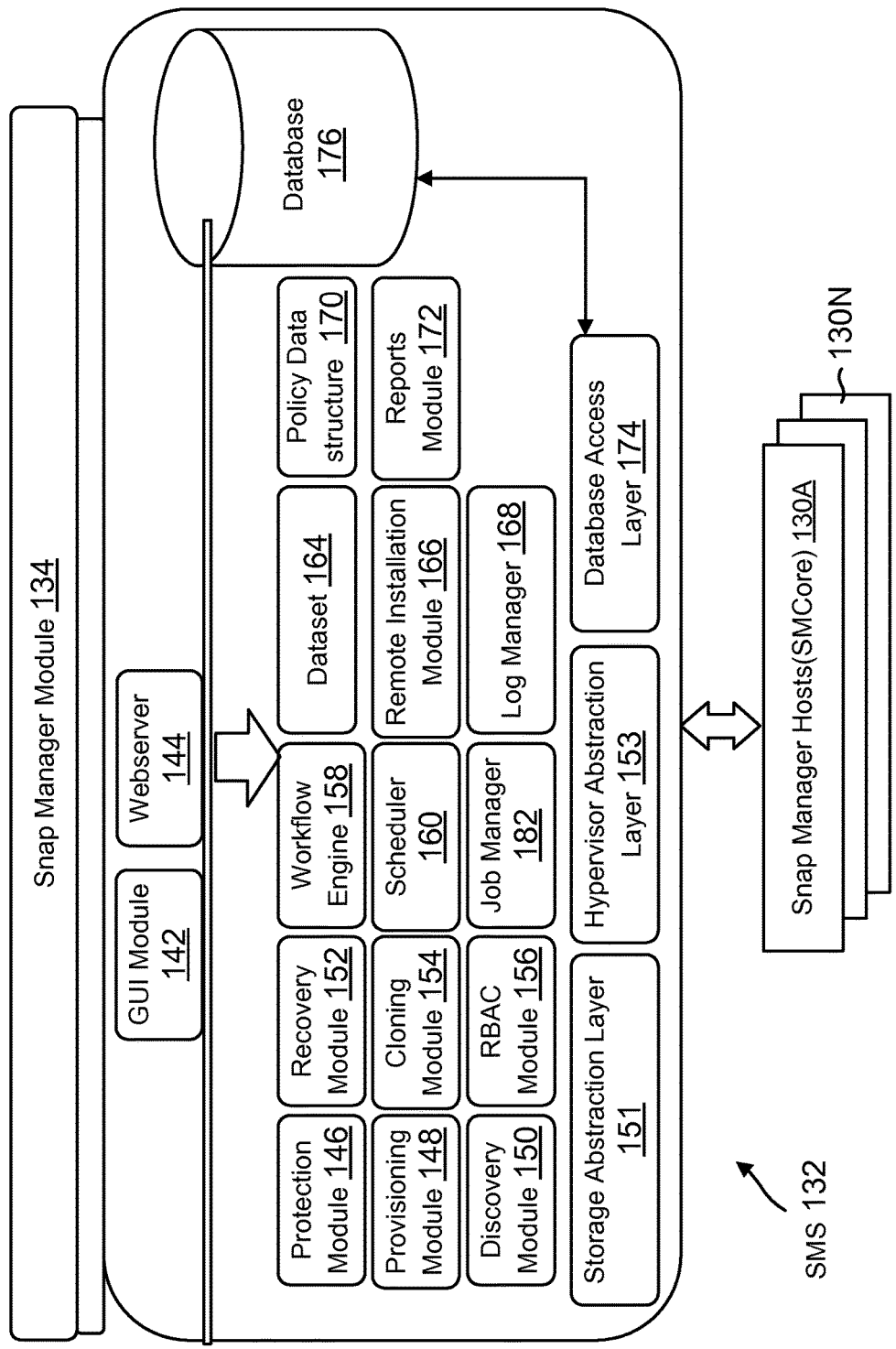
FIG. 1C shows a block diagram of a snap manager (SM) module used by a centralized snap manager server ("SMS"), according to one aspect of the present disclosure.

SMS 132: FIG. 1C shows a block-level diagram of SMS 132 having a SM module 134, according to one aspect. The SM module 134 may be executed by a stand-alone system or may interface or is integrated with another management console/application to manage and interface with multiple instances of SMcore layers 130A-130N, as described below in detail. SM module 134 may also be implemented as an application within a VM environment.

The SM module 134 includes a graphical user interface (GUI) module 142 that presents a GUI at a display device, for example, a monitor, a smart phone, tablet or any other display device type. The GUIs may be used by different users to interface with SMS 132 and its components. Examples of various GUIs are provided in FIGS. 8A-8T and described below in detail. It is noteworthy that the various aspects described herein are not limited to any specific GUI type because a command line interface (CLI) may also be used to implement the adaptive aspects described herein.

The SM module 134 may also include a web server 144 for enabling Internet based communication. As an example, web server 144 may be implemented as an Internet Information Services (IIS) for a Windows® Server web server (without derogation of any third party trademark rights). The web server 144 interfaces with a workflow engine 158 that coordinates and manages various tasks that are performed by the different components of SM module 134 as described below in detail.

In one aspect, the workflow engine 158 coordinates dataset 164 creation, policy allocation and manage a database 176 that is described below in detail. The workflow engine 158 will also communicate with various SMcore layers 130A-130N for host system related operations, as described below.

In one aspect, the SM module 134 also includes a protection module 146, a provisioning module 148, a discovery module 150, a recovery module 152, a cloning module 154, a role based access control (RBAC) module 156, a storage abstraction layer (may also be referred to as "SAL") 151, a hypervisor abstraction layer (may also be referred to as "HAL") 153, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows SM module 134 to handle storage services for different applications/host systems, as described below in detail.

The log manager 168 collects logs from SMcore layers and the various plugins. The logs can then be presented to a user via a GUI. The logs may be for event management and audit for various SMS 132 operations. The logs may be collected for a job based on a job identifier, as described below.

The protection module 146 is used to enforce a policy for a particular storage services related job (for example, a backup operation). The protection module maintains a protection policy for a plurality of objects (or protection group) that are to be backed up and provides protection service for backing up the protection group objects. Based on an application object, a call is made to an appropriate plugin for providing the appropriate protection service, as described below in detail.

In one aspect, protection module 146 maintains protection group objects for abstract representation of a container of application objects where protection of application objects is defined by policy objects. The protection group objects map to dataset objects 164, as described below in detail.

The provisioning module 148 allows a user to configure and provision a LUN/volume (used interchangeably) that may be used to store information. The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate. It is noteworthy that the provisioning module 146 may be a part of another management application, including VSC 126A.

The discovery module 150 interfaces with the SMcore layers 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects, as described below in detail.

In one aspect, the discovery module 150 initiates a discovery operation with the SMcore layers. An application programming interface (API) presented by the SMS 132 determines if a SMcore layer is installed at a host. If the SMcore is installed, then the SMcore discovers the various plugins at that host. If the SMcore layer is not installed, then the SMcore layer is installed by the remote installation module 166 and the appropriate plugins are installed as well.

To discover application resources, a user is authenticated by SMS 132, as described below. A user token is generated and the same token is then used across multiple hosts to discover application plugin resources as described below in detail.

The cloning module 154 is used to clone storage volumes that are maintained by the storage system 120. The cloning module 154 is also used for managing the life cycle of a clone, as described below in detail. The term clone as used herein is a duplicate copy of a snapshot. The term clone life cycle management means generating a clone, refreshing a clone and deleting a clone based on user defined policies and requirements. Refreshing a clone means deleting an existing clone, generating a new snapshot and then creating the clone again.

RBAC module 156 stores information regarding different clients/entities that are given access to storage. For example, a particular business unit may be allowed to read certain storage volumes and may not be allowed to backup, clone, replicate or delete any storage volumes. RBAC module 156 manages the various roles and access type for different applications that may be executed in different host systems/computing environments, as described below in detail.

In one aspect, RBAC module 156 includes an authentication and authorization module (see 402 and 406, FIG. 4A). User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the SMS 132 decrypts the token, validates the token and regenerates the hash value. The hash value is compared with the stored hash value in database 176.

In one aspect, the authorization module of the RBAC module 156 creates custom roles (for example, a SMS administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

In one aspect, once a user is authenticated, the RBAC module 156 performs the following tasks: obtains user information from the token, checks the role that is assigned to the user; checks the permissions associated with the role and then either allows user access or sends an error message if authorization fails.

Figure 1D:
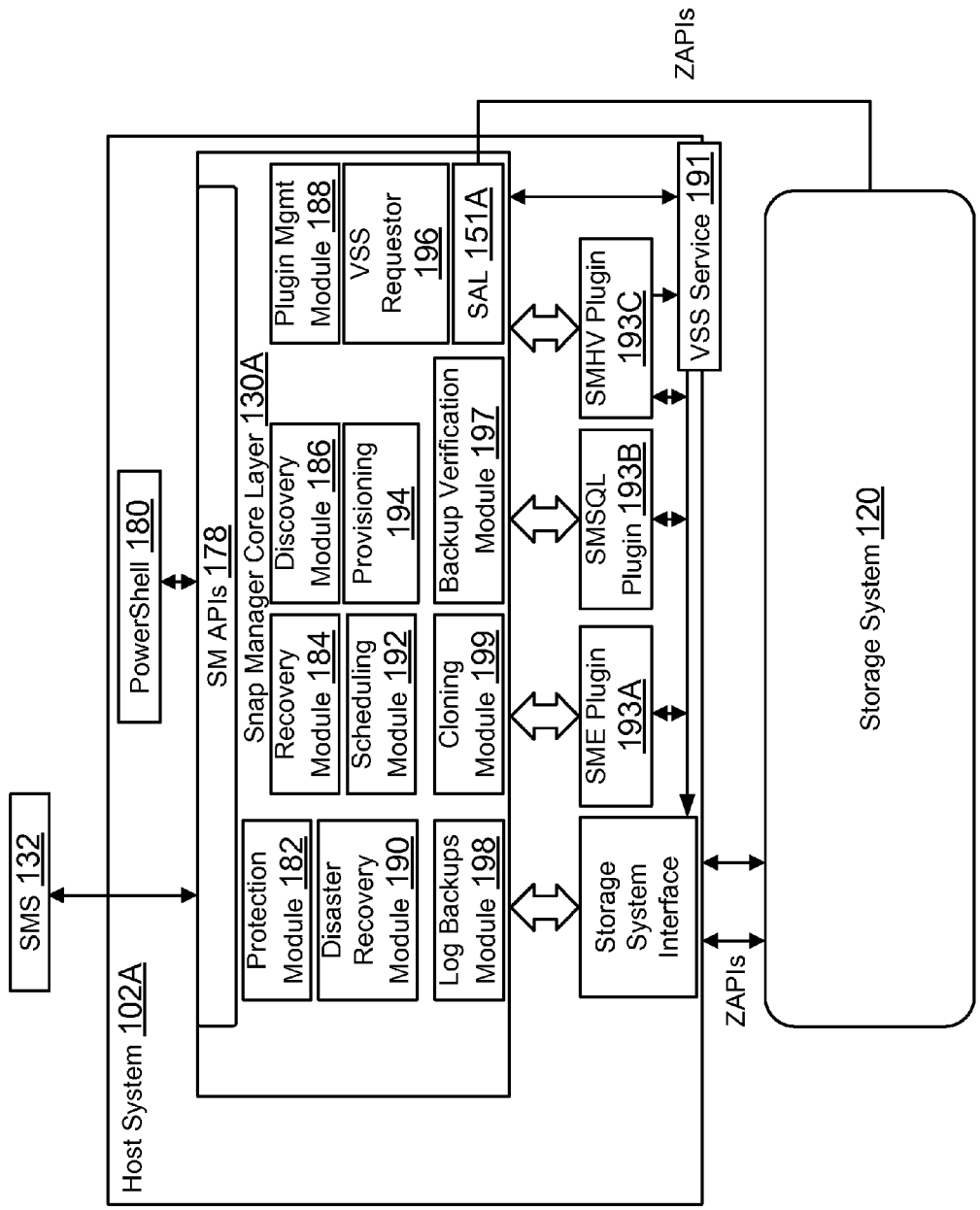
FIG. 1D shows a block diagram of a snap manager core (SMcore) layer used by a computing system (or host system) for interfacing with SMS and other components' of FIG. 1A, according to one aspect of the present disclosure.

In one aspect, storage 120 credentials are assigned to a particular user and maintained by both SMS 132 and SAL 151A (FIG. 1D). SAL 151A uses user credentials based on the user token generated by the RBAC module 156.

In one aspect, SMS 132 ensures that a logged in user token flows to an application for discovery, backup, restore and cloning operations. When a logged in user does not have permission for an operation at the application level, then the application plugin reports that to SMS 132. The resources may then be locked and the user is notified. Details of using RBAC module 156 are provided below.

All the tasks conducted by the SM module 134 are organized and monitored by the job manager 182. The job schedules are managed by the scheduler 160. When a new job arrives, the job manager 182 stores the job information in a database (for example, 176) with other existing jobs. The job manager 182 creates sub-tasks for executing the appropriate work flows. The sub-tasks depend on the nature of the job (for example, backup, restore, cloning or others). The job manager 182 updates the status of each task to provide real-time updates via a GUI, as described below in detail.

The remote installation module 166 downloads an appropriate plugin for an application that is executed by a host system. Details regarding the functionality of the remote installation module 166 are provided below.

In one aspect, the policy data structure 170 is used to store polices for different stored objects (for example, databases, data structures, VMs, storage volumes and others). The policy information is configurable and may be changed by a user. In one aspect, the policy data structure 170 format is the same across different applications. This enables SM module 134 to manage storage services across different platforms with different requirements and operating parameters, as described below in detail. The policy data structure 170 includes various policy objects to store various policies each with a set of attributes that can be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats. An example of different report types are provided below in detail.

In one aspect, the SM module 134 maintains the dataset 164 for different applications and application objects. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

Dataset 164 is described below in detail with respect to FIG. 2E. In one aspect, dataset 164 represents a container of application objects where protection attributes may be defined in terms of backup policy, replication profiles and retention policies that are all described below in detail. Dataset 164 is a basic unit that is used to manage backup operations. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status to users. As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 151 stores information regarding the various storage resources that are used and available for different hosts. SAL 151 maintains a "storage footprint" for different storage resources (for example, storage systems including storage devices) used by different applications as described below in detail.

In one aspect, HAL 153 is used to communicate with another plugin (for example, the VSC plugin 185A) that is used to collect information related to storage used by different virtual machines, as described below in detail.

SMcore layer 130: FIG. 1D shows an example of the SMcore layer 130A APIs (178) that can interface with SMS 132, according to one aspect. The SMcore layer 130A includes a protection module 182, a recovery module 184, a discovery module 186, a plugin management module 188, a disaster recovery module 190, a scheduling module 192, a provisioning module 194, a VSS (volume snapshot services) requestor 196, a log backup module 198, a cloning module 199, a backup verification module 197 and SAL 151A.

SAL 151A may be used to communicate with the storage system 120. SAL 151A maintains a storage footprint for each application. SAL 151A interfaces with each plugin to obtain storage resources that are managed by storage system 120 and made available to different applications 126 (FIG. 1A). Details of using SAL 151A are provided below. In one aspect, SAL 151A uses ZAPIs (Zephyr Application Programming Interface) to send and receive data from storage system 120.

In another aspect, the SMcore layer 130A interfaces with storage system 120 via a storage system interface 195. An example of storage system interface is SnapDrive provided by NetApp Inc. (with derogation of any trademark rights of NetApp Inc.).

The SMcore layer 130A interfaces with different types of plugins, for example, a snap manager for exchange (SME) plugin 193A, a snap manager for SQL (SMSQL) plugin 193B, a snap manager for hypervisor (SMHV) plugin 193C (for example, plugin 128A and VSC plugin 185A) and others. The term plugin as used herein means a hardware processor executable layer that is customized to interface with specific applications. For example, the SME plugin 193A is aware of Exchange format and behavior and provides Exchange specific information to a module of the SMcore layer 130A. Similarly, the SQL plugin understands a SQL database application and its objects and provides that information to the core layer 130A.

The SMHV plugin 193C is able to interface with the hypervisor layer and provides information regarding virtual disks, virtual machines that use the virtual disks and the underlying storage information used by the virtual disks.

In one aspect, the discovery module 186 manages discovery of plugins and the resources that are used by each plugin. A consistent format is used for maintaining plugin information. For example, a standard schema is used to manage plugin information. The schema includes a unique plugin identifier (PluginID), a plugin name, a plugin version, a plugin install path, a description, a vendor name that provided the plugin, date a plugin was created and modified and a URL. The schema in conjunction with the object format (referred to as SMobject) described below allows discovery module 186 to obtain plugin information and provide it to SMS 132. To discover resources, the SMS 132 interfaces with the SMcore 130. The discovery module 186 of the core communicates with the respective plugin and obtains plugin information, as described below in detail The protection module 182 is used for applying policy for backup operations at a host system level. The recovery module 184 allows the SMcore layer 130A to recover or restore a stored object from a snapshot copy. The plugin management module 188 is used to interface with SM module 134 to receive the proper plugins. For example, if a host system only uses Exchange, then the host system may need the SME plugin 193A. The plugin management module 188 provides the application information to the SM module 134 so that the appropriate plugin can be provided.

The disaster recovery layer 190 coordinates disaster recovery with SM module 134 and the storage system 120, when there is a disaster and a snapshot needs to be recovered from a remote, secondary site where information is replicated.

The scheduling module 192 is used for coordinating backup, restore and cloning related operation schedules, as described below in detail.

The provisioning module 194 is used to provision storage via a GUI. The provisioning module 194 provides information to the SM module 134 that presents the GUI to a user. In another aspect, the GUI may be presented by host system 102A and the provisioning module 194 provides provisioned information to the SM module 134.

The VSS requestor module 196 (shown as VSS requestor) requests snapshots in a Windows Operating system environment. The VSS requestor 196 then interfaces with VSS service 191 that interfaces with the storage system 120 to execute the snapshot operations.

The backup verification module 197 verifies a backup or replication operation. Since different applications may have different requirements, the backup verification module 197 facilitates the verification for different applications, as described below in detail.

The cloning module 199 that assists in cloning a snapshot and a log backup module 198 that assists in backing up logs. As an example, a database application may maintain a log to track changes to a database and the log backup module 198 assists in backing up those logs.

Figure 1E:
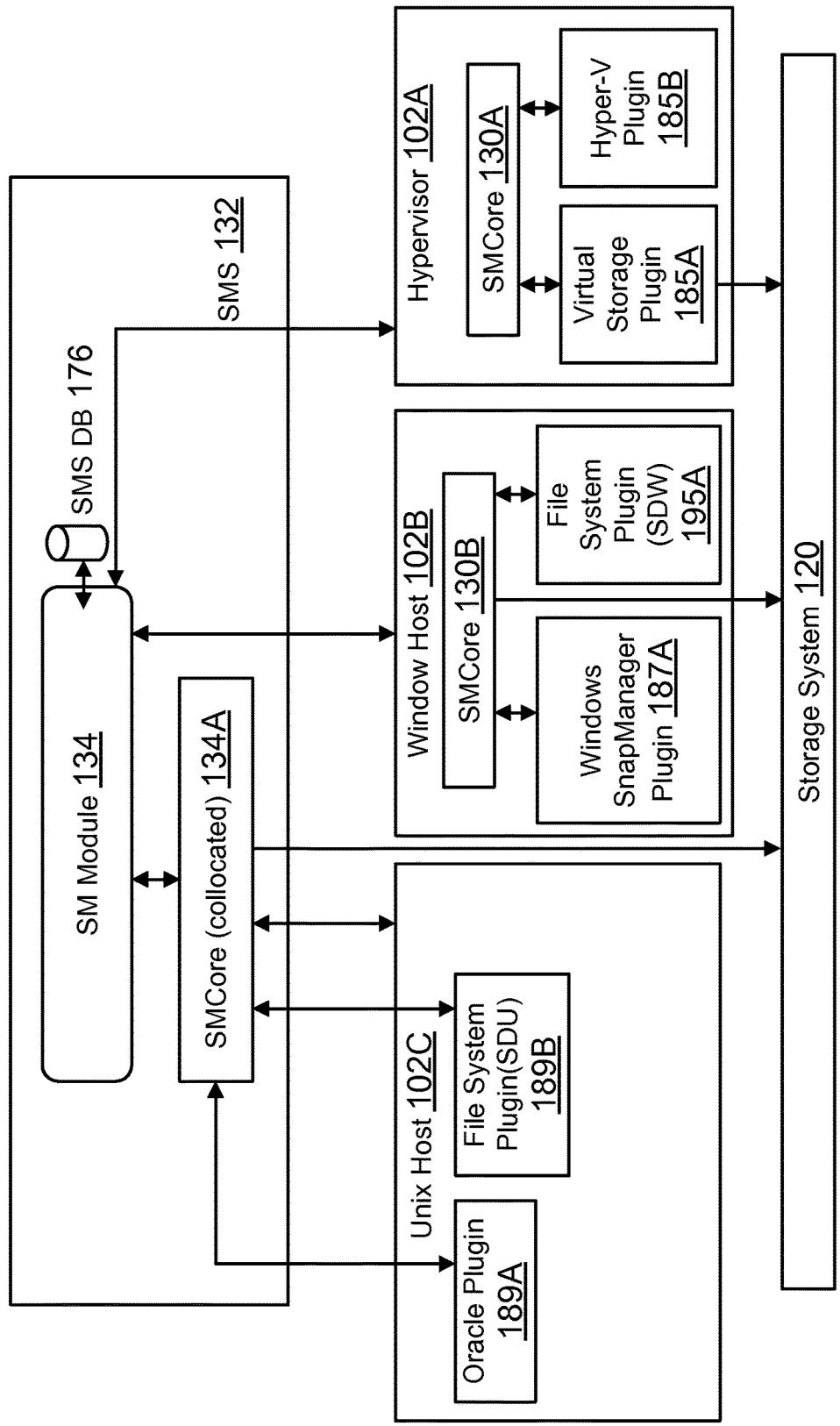
FIG. 1E shows an example of different host systems interfacing with the SMS of the present disclosure.

FIG. 1E shows an example of SMS 132 with the SM module 134 having a collocated SMcore layer 134A for interfacing with different plugins. For example, a Windows based host system 102B with SMcore layer 130B interfaces with the SMS 132. The Windows host 102B includes a Windows Snap manager plugin 187A and a file system plugin 195A. The Windows Snap manager plugin 187A interfaces with Windows based operating systems or applications for providing storage services through SMS 132. The file system plugin 195A is provided for a Windows based file system used for managing data objects in a Windows operating environment. Plugin 195A interfaces with the storage system interface 195 to communicate with the storage system 120.

The hypervisor (or host) 102A includes a virtual storage plugin 185A and a hyper-v plugin 185B (similar to 193C, FIG. 1C). The hyper-V plugin is used in a Hyper-V virtual environment. The virtual storage plugin 185A interfaces with the storage system 120 to obtain storage information associated with virtual storage that is presented to virtual machines. The hyper-V plugin 185B is used to interface with the Hyper-V layer executed within host 102A. This allows the SMcore layer 130A to develop a storage footprint involving virtual and physical storage in a virtual machine environment.

A UNIX host 102C includes a plugin 189A that understands an Oracle database (without derogation of any third party trademark rights) and a file system plugin 189B that understands the UNIX file system. The plugins interface with the SMS 132 for protecting databases in a UNIX environment. For example, plugin 189B interfaces with the storage system interface 195 to communicate with the storage system 120.

Figures 1F, 2B:
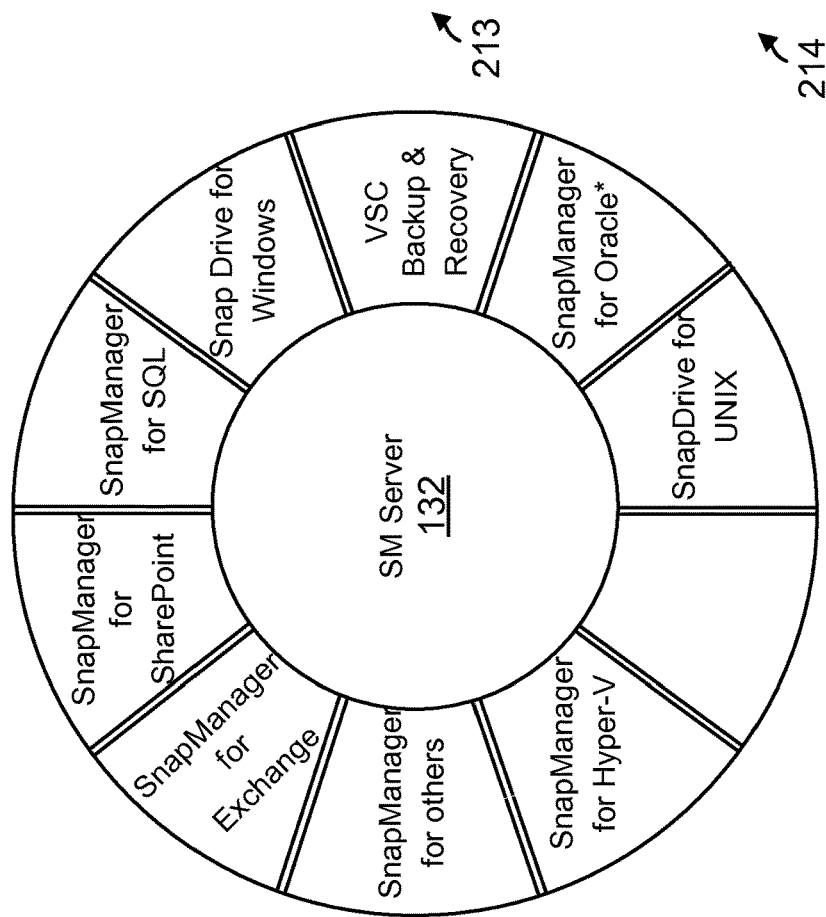
FIG. 1F shows an illustration of SMS interfacing with different plugins for different applications, according to one aspect of the present disclosure.
FIG. 2B shows an example of an object format used by SMS to store information regarding different applications, according to one aspect of the disclosure.

FIG. 1F shows an example for providing plugins for different applications, including Exchange, Sharepoint, SQL, Windows, VSC, Oracle, Unix and Hyper-V using snapshot technology to protect information.

Figure 2A:
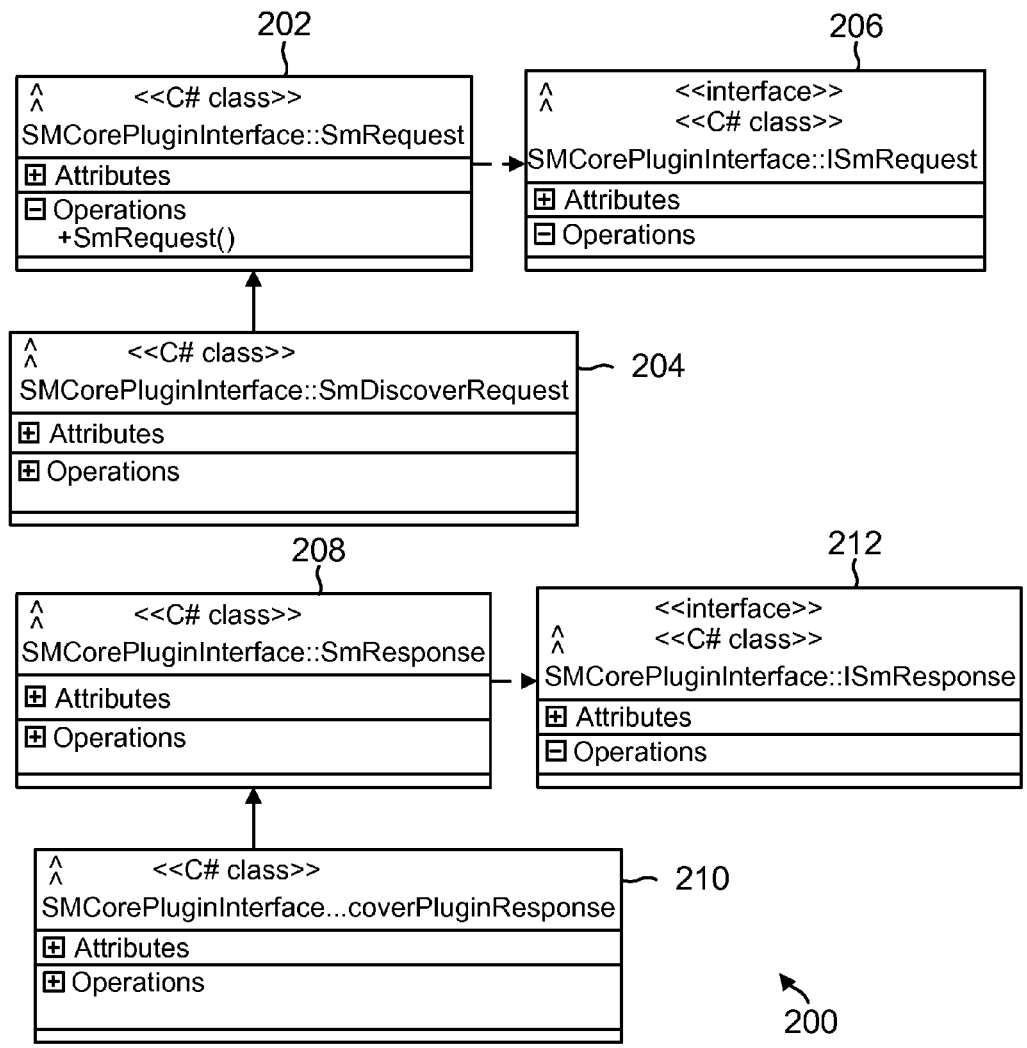
FIG. 2A shows an example of a request and response format for communication between the SMS and SMcore layers, according to one aspect of the present disclosure.

Format 200: FIG. 2A shows a platform and application independent format 200 used by the SM module 134 and the SMcore layers 130 for exchanging information and then storing the information in database 176, according to one aspect. In one aspect, regardless of which application data is being protected/managed, the system uses a request/response model format for obtaining and storing information regarding different applications using the various plugins. As an example, the objects used by format 200 comply with the REST (Representational State Transfer) API model.

Format 200 shows a base class 202 for a snap manager request. The base class object is defined by its attributes that are described below. The base class includes a payload that determines what operation needs to be performed. Object 204 is used to define the base class 202, which in this case is a discovery request. Based on object 202, an interface object 206 is defined that may be used for providing discovery information.

Each SM request object includes a job object for a particular request. The job object may be used to show the details of a specific job, regardless of what application and environment is using a particular storage service. For each response, there is associated a response object. This is shown as object 210, where the base class for the response is 208. The response interface, similar to request interface is shown as 212.

FIG. 2B shows an example of an object 213 (shown as SmObject) that may be used for a request or a response, according to one aspect. Object 213 is an abstract representation of an application object. Object 213 format allows SMcore modules to communicate and interface with other components in a format independent manner that does not depend on an application type. As an example, object 213 may be used for a response. Object 213 is based on details that are included within object 214 that in this example, may be an Oracle database object.

SM object 213 includes various attributes. For example, object 213 identifies a host system where the object or application may be running. The object has a unique identifier shown as object ID. Object 212 includes a "key value" pair for the object. The key value pair may be used by a plugin and may include any information.

The object 213 may also include a unique name and a field that defines an object type. For example, the object type may be a database object, an object that provides information regarding virtual machines and other object types. The operations segment of object 213 is populated by object 214.

In one aspect, object 214 may be used to represent any application type. This allows the SM module 134 to manage and protect information regarding different application types, as described below in detail.

Figure 2C:
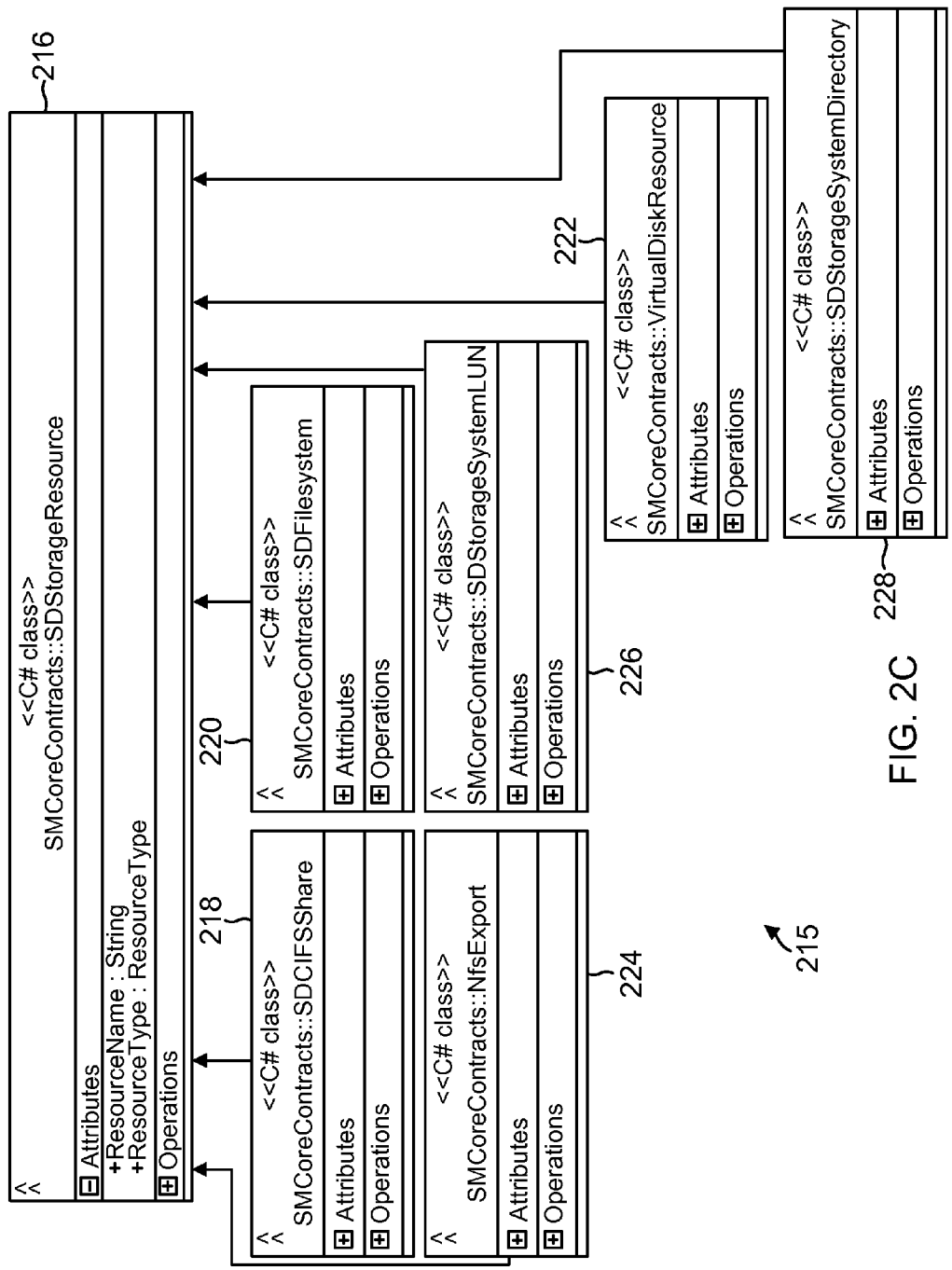
FIG. 2C shows a storage layout maintained by SMS to provide storage services, according to one aspect of the present disclosure.

Storage Footprint: FIG. 2C shows an example of storage footprint 215 that is maintained by SAL 151 at SM module 134 and/or SAL 151A, according to one aspect. SAL 151 obtains information from SAL 151A of each SMcore layer 130 that is aware of each host system operating environment. In one aspect, information regarding different storage devices/objects is maintained in a standard format. This enables SM module 134 at SMS 132 to manage storage services related to different storage device types and storage protocols, as described below in detail.

The storage footprint 215 may be stored as an integrated stored object 216 that includes storage information for different storage device/protocol types. For example, object 216 includes information regarding a CIFS share represented by object 218, a host file system that is backed up in a SAN storage represented by object 220, a virtual disk resource 222 that is deployed in a virtual machine environment, a NFS based storage represented by object 224, a storage system LUN represented by object 226, and a NFS and CIFS system level directory represented by object 228 that is represented by object 228. By managing storage resources that are used by disparate applications and environments, SM module 134 can efficiently manage storage services for such applications and environments, as described below in detail.

SAL 151 abstracts storage information and stores the storage information as object 215. This allows SM module 134 to replicate, clone and restore information regardless what storage system type, storage device type or file system protocol that is used for storing information.

In one aspect SAL 151 (and 151A) may be implemented as an API that is used for backups, restore, cloning and provisioning operations for different applications, without having the applications getting involved with the semantics of storage system 120. SAL 151 abstracts storage specific technology decisions, for example, whether to use snapshot or single instance storage (SIS clone) for backup and mounting, as described below in detail.

Figure 2D:
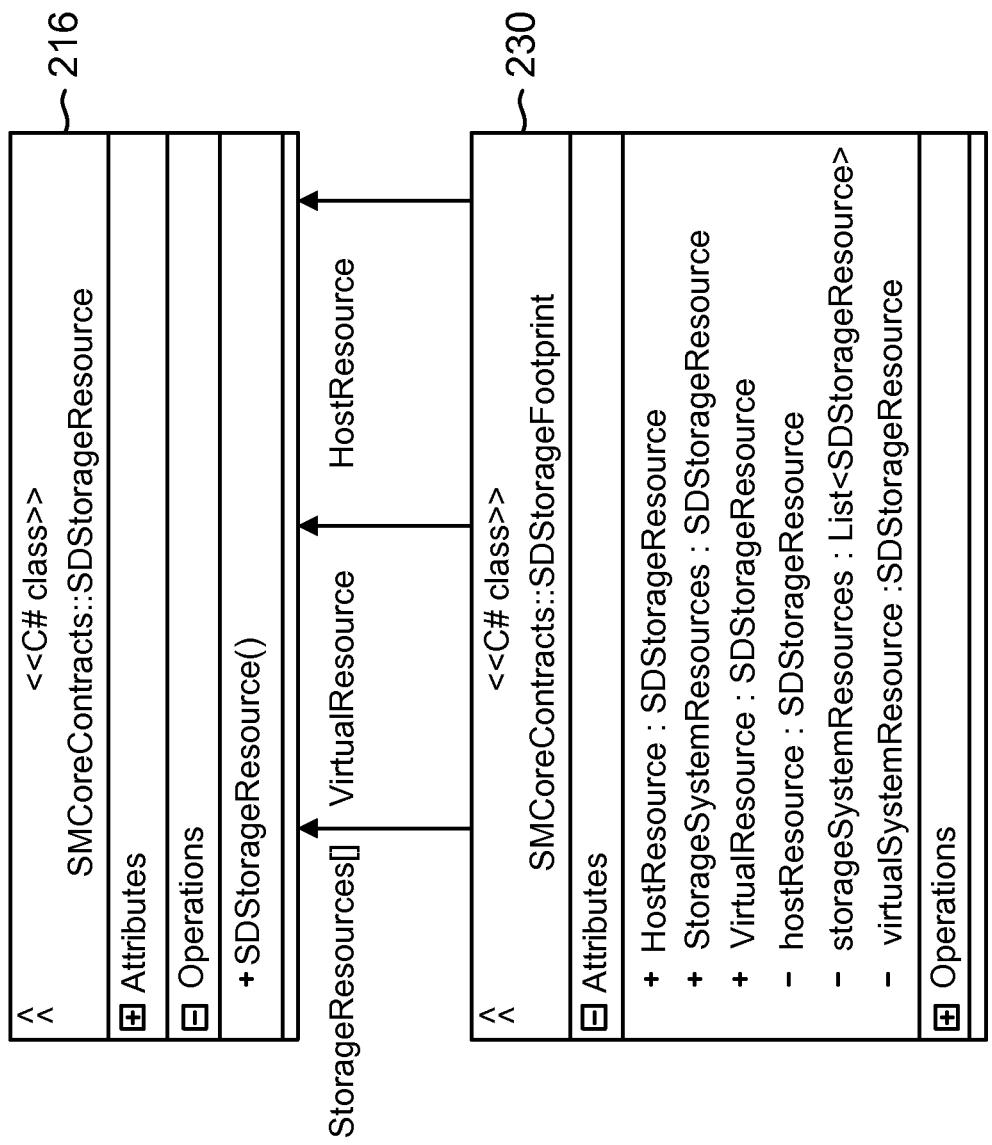
FIG. 2D shows an example of a storage resource object, according to one aspect of the present disclosure.

FIG. 2D shows an example of a storage footprint object 216. Object 216 is based an object 230 that provides information regarding host system storage resources, storage system resources, virtual machine environment storage resources and others. It is noteworthy that object 216 format is similar to the format 200 described above in detail.

In one aspect SAL 151 (and SAL 151A) are used for volume management, LUN management, initiator group ("igroup", where an igroup identifies a list of initiators (or adapter ports) that are allowed to access a LUN or a storage volume) management, snapshot management, mounting snapshots, clone management, replication management and other operations.

For volume management, SAL 151/151A may be used to retrieve volume information from storage system 120, provision a volume, create a volume clone, set a state for a volume and dismount a volume. For LUN management, SAL 151/151A facilitates creating a new LUN, delete a LUN, retrieving LUN information, mapping a LUN to an igroup, retrieving LUN mapping information, getting LUN attributes, setting LUN attributes, getting LUN details including LUN size, enabling LUN resizing, taking a LUN online or offline, getting a LUN path information, creating a target LUN, renaming a LUN and other information.

Igroup management, includes getting igroup information for a LUN/storage system, adding initiators to an igroup, binding an igroup to a port set, renaming an igroup and removing an igroup.

Snapshot management includes creation of a snapshot, removing a snapshot, restoring a snapshot, cloning a directory, performing a file based restore or volume based restore, getting a list of snapshots for a volume, renaming snapshots, mounting a LUN from a snapshot and dismounting a LUN from a snapshot.

Replication management includes setting SnapMirror/Vault information, getting replication status, setting policy rules for replications, removing a retention policy and other operations.

Dataset 248: FIG. 2E shows an example 248 (similar to 164, FIG. 1C) for maintaining a dataset, according to one aspect of the present disclosure. As mentioned above, a dataset is an abstract representation of a container for application specific objects for executing a storage services related operation, for example, a backup operation, a clone life cycle operation and others. Briefly, a dataset is an independent unit for defining and managing backup operations. A user can add resources from multiple hosts and applications that are managed by SM module 134 to a dataset.

The dataset may be used to define protection attributes as defined by a backup policy, a retention policy that defines for how long a backup is retained and replication profiles and others. Examples of protection attributes include, defining when a backup is taken, the type of backup (i.e. full backup or a selective backup of log files); update policy that defines when the backup is updated; retention count may be defined as older than a certain number of days and count based i.e. after a certain number of backups, backups are deleted. The attributes may also be used to define if there needs to be a specific verification for the backup, for example, one dictated by SQL and Exchange servers.

Figure 2E:
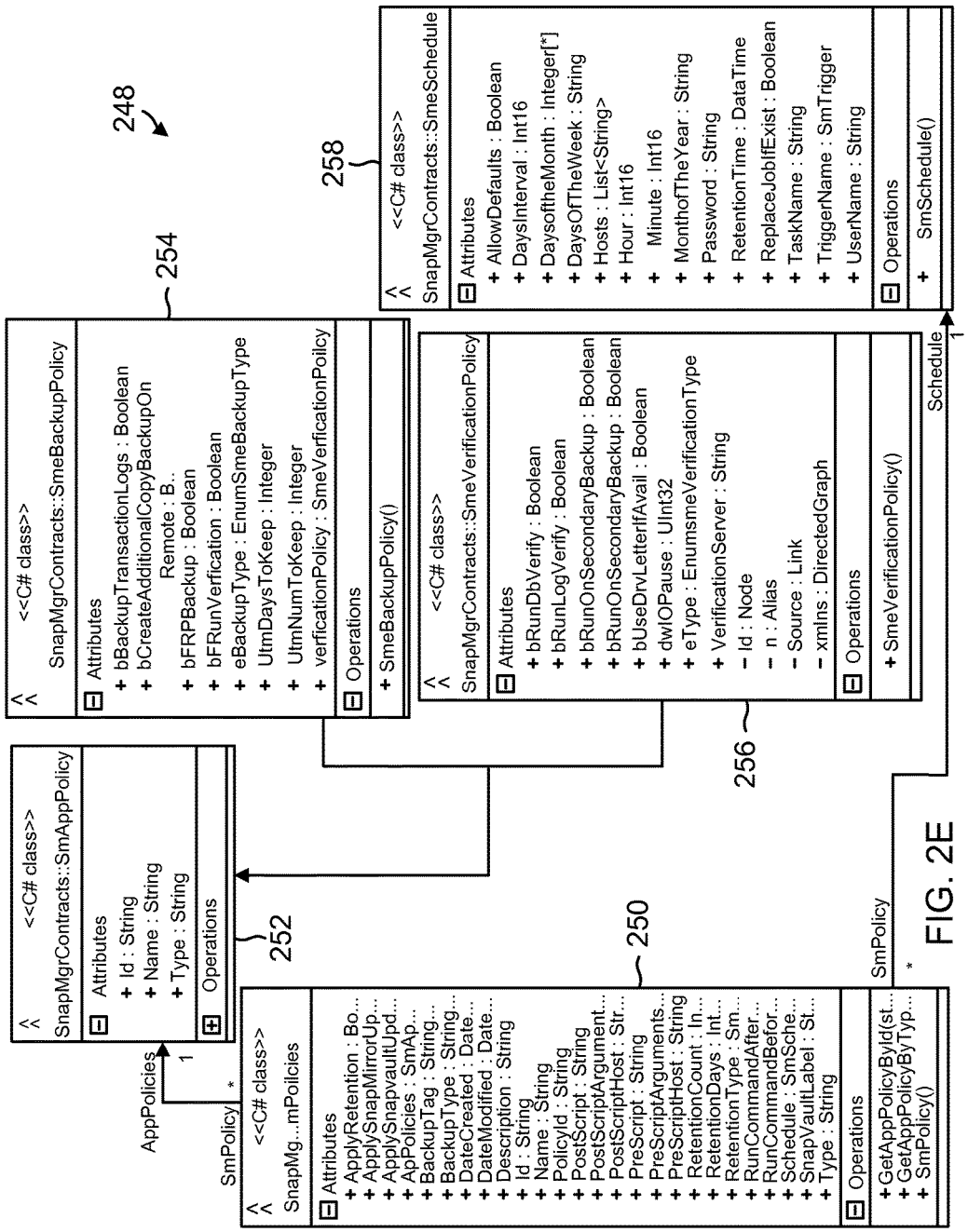
FIG. 2E shows an example of a dataset object maintained by the SMS for providing storage services, according to one aspect of the present disclosure.

In FIG. 2E, the high-level policy examples are shown as object 250. These policies may be applied for any application. The application level or specific policy is shown as object 252 that is based on objects 254 and 256. For example, object 254 defines the policy parameters for backing up an Exchange server. Object 256 defines the policy for verifying the backup. Object 258 defines the backup schedule that is maintained by the scheduler 160 of SM module 134. By managing storage services via a standard dataset format, SMS 132 is able to efficiently manage backup, clone, restore and other operations for different hosts, VMs, applications and plugins. Example of generating datasets is provided below in detail.

Figure 2F:
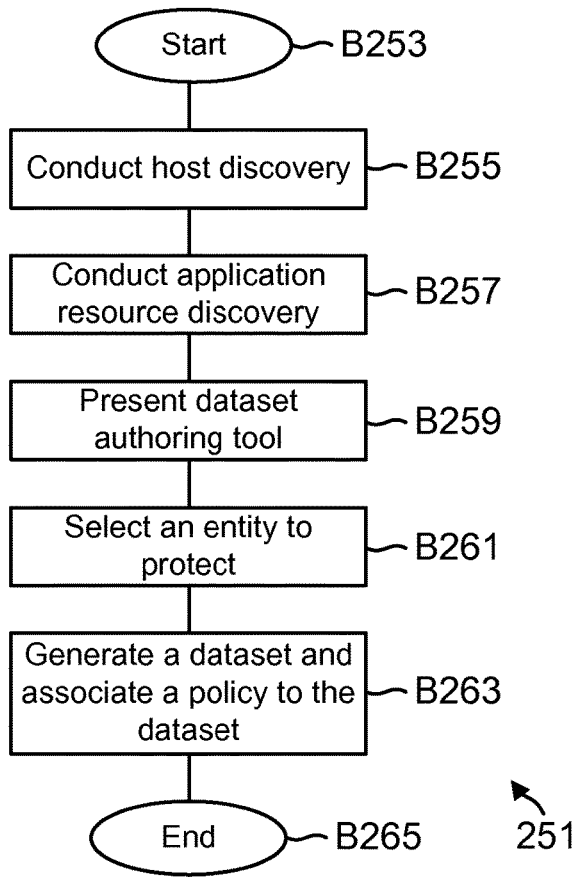
FIG. 2F shows a process flow for creating a dataset, according to one aspect of the present disclosure.

FIG. 2F shows a process 251 for generating a dataset, according to one aspect of the present disclosure. The process begins in block B253, when a host system is discovered. The host may be discovered by SMS 132 or added via a user interface. As an example, hosts within a subnet may be automatically discovered by sending a discovery packet. SMS 132 stores host information as part of database 176. Each host is uniquely identified and if the host is part of a group, then the host group is also uniquely identified. SMS 132 also stores a network access address (for example, the IP address) that is used to access the host, a port identifier used to connect with the host, a cluster node identifier, if the host is a part of a cluster, a description of the host, and the date it is created and modified. This schema is consistent for all host types.

The SMS 132 communicates with the host to determine if a SMcore layer 130 is installed. When the SMcore is already installed, then the appropriate SMcore layer 130 discovers the associated plugin. If the SMcore layer is not installed, then it is installed with one or more plugins.

In block B257, SMS 132 discovers the resources used by the plugins via SMcore layer 130. Details of the application resource discovery are provided below.

In block B259, the user is presented with a dataset authoring tool. An example of the authoring tool is provided in FIG. 8D, described below in detail. In block B261, the user selects an entity (for example, a database) that it wants to protect. The entity may be all the data associated with an application or a sub-set of the data.

In block B263, a dataset is generated and associated with a policy. As described above, the dataset includes core policy attributes (for example, 250, FIG. 2E) and application specific policy (for example, 254 and 256, FIG. 2E). The process then ends in block B265.

Figure 3A:
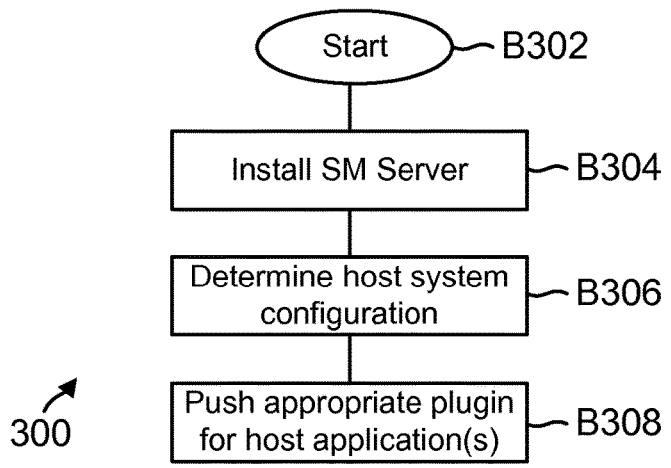
FIG. 3A shows an example of installing a plugin, according to one aspect of the present disclosure.

Plugin Installation: FIG. 3A shows a process 300 for installing a plugin, according to one aspect of the present disclosure. The process begins in block B302, when a host system is initialized and operational.

In block B304, the SMS 132 is installed. The SMS 132 may be installed as a virtual machine at a computing device within a virtual machine environment. In block B306, the SMS 132 first determines the host configuration. The host configuration information may be obtained from the SMcore 130, when the SMcore is installed at the host.

Based on the appropriate host configuration, in block B308, the appropriate plugin is pushed to the host system by the remote plugin installation module 166. Thereafter, the plugin is installed at the host system.

Figure 3B:
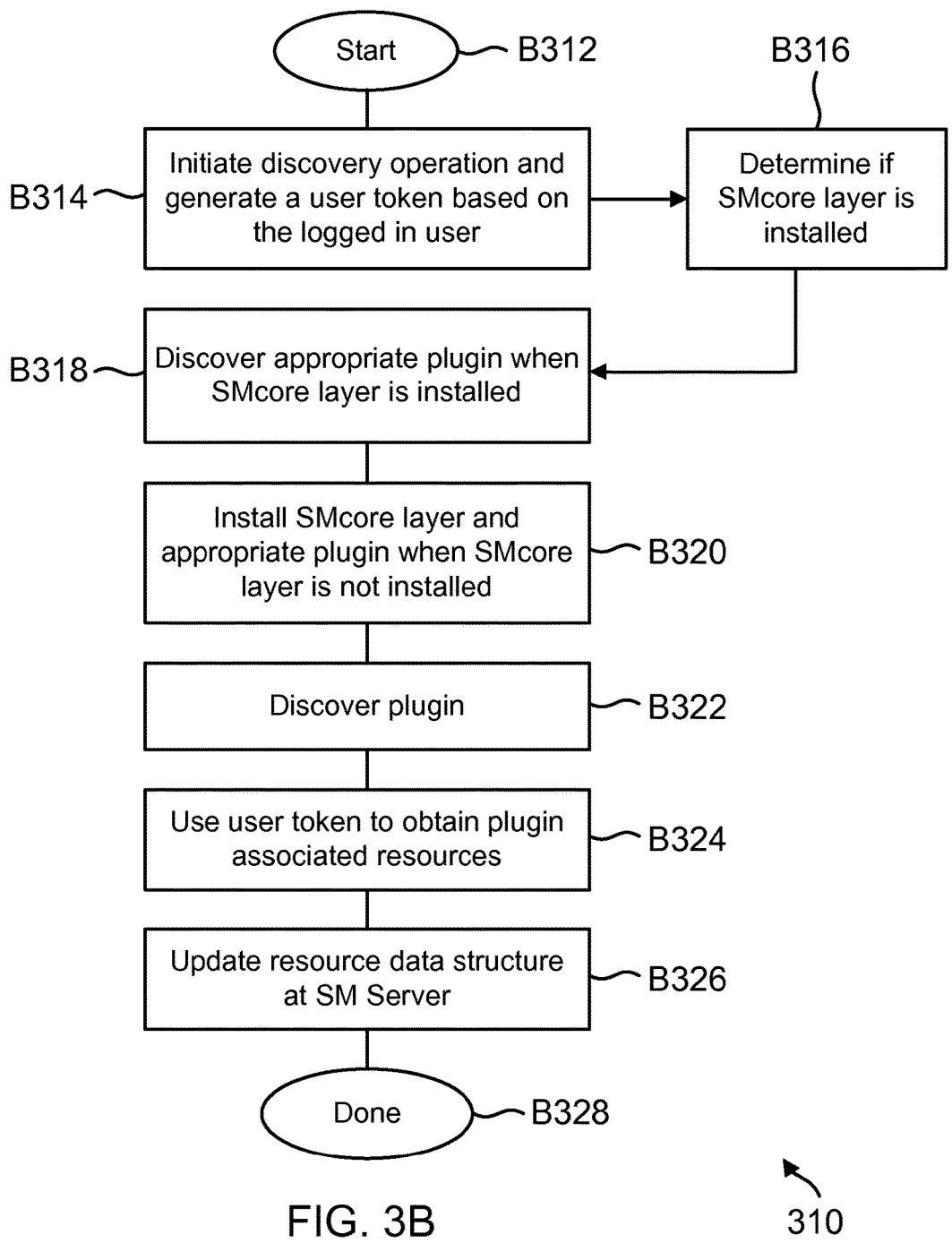
FIG. 3B shows a discovery process flow, according to one aspect of the present disclosure.

Resource Discovery: FIG. 3B shows a process 310 for determining host and application resources by SMS 132 from different applications, storage system 120 and other modules of system 100, according to one aspect. The discovery process uses the request/response format described above with respect to FIGS. 2A-2B such that discovery is not affected by individual application formats/requirements.

The discovery is initiated in block B314 by SMS 132 and based on a logged in user, a user token is generated. In one aspect, the token is a unique identifier for a specific user and for a specific discovery operation. The token is then used across different platforms for obtaining information. In one aspect, the RBAC module 156 performs authentication for the user and generates the token. The token may be encrypted and provided to the user. The RBAC module 156 stores a hash value for the token at database 176 for future authentication.

In block B316, SMS 132 determines if an instance of the SMcore layer 130 is installed at a host system it is communicating with. This may be determined by the discovery module 150 that sends out a discovery request. If a response is received by the discovery module 150, then SMS 132 assumes that the SMcore layer 130 is installed.

If the SMcore layer 130 is installed, then in block B318, the SMcore 130 discovers the appropriate plugin that is being used by the host system. The plugins are discovered by the SMcore layer 130 and provided to SM module 134. In one aspect, SMS 132 stores at least the following information regarding each plugin: a unique plugin identifier (PluginID, a plugin name, a plugin version, a plugin install path, a description, a vendor name that provided the plugin, date a plugin was created and modified, a URL, a host-plugin relationship, a host identifier associated with the plugin and the date the plugin information object was created.

If the SMcore layer is not installed, then in block B320, the SMcore layer 130 is installed at the host system. The appropriate plugin is also installed. The type of plugin will depend on the host system applications. For example, if the host is a Unix system managing an Oracle database, then the plugin is the Oracle plugin 189A. Similarly, for a Windows environment, the plugin is Windows Snap manager plugin 187A. For a virtual environment, plugins 185A and 185B are installed. The installed plugin are discovered in block B322.

In block B324, the user token is provided to the SMcore layer 130. The SMcore layer 130 then passes the token to the installed plugin(s). The plugins then pass the discovery request to the appropriate application. For example, if the request involves virtual machine storage resources, then the hypervisor plugin will request the storage resources from the hypervisor and the virtual storage plugin will request the resources from the storage system. This allows the SMcore 130 to obtain details regarding both the virtual and physical storage. The discovered resources are then provided to SMS 132 in block B326. Database 176 is then updated to store the discovered information. In one aspect, regardless of the application type, the data is stored in the format shown in FIG. 2C and described above.

Figure 3C:
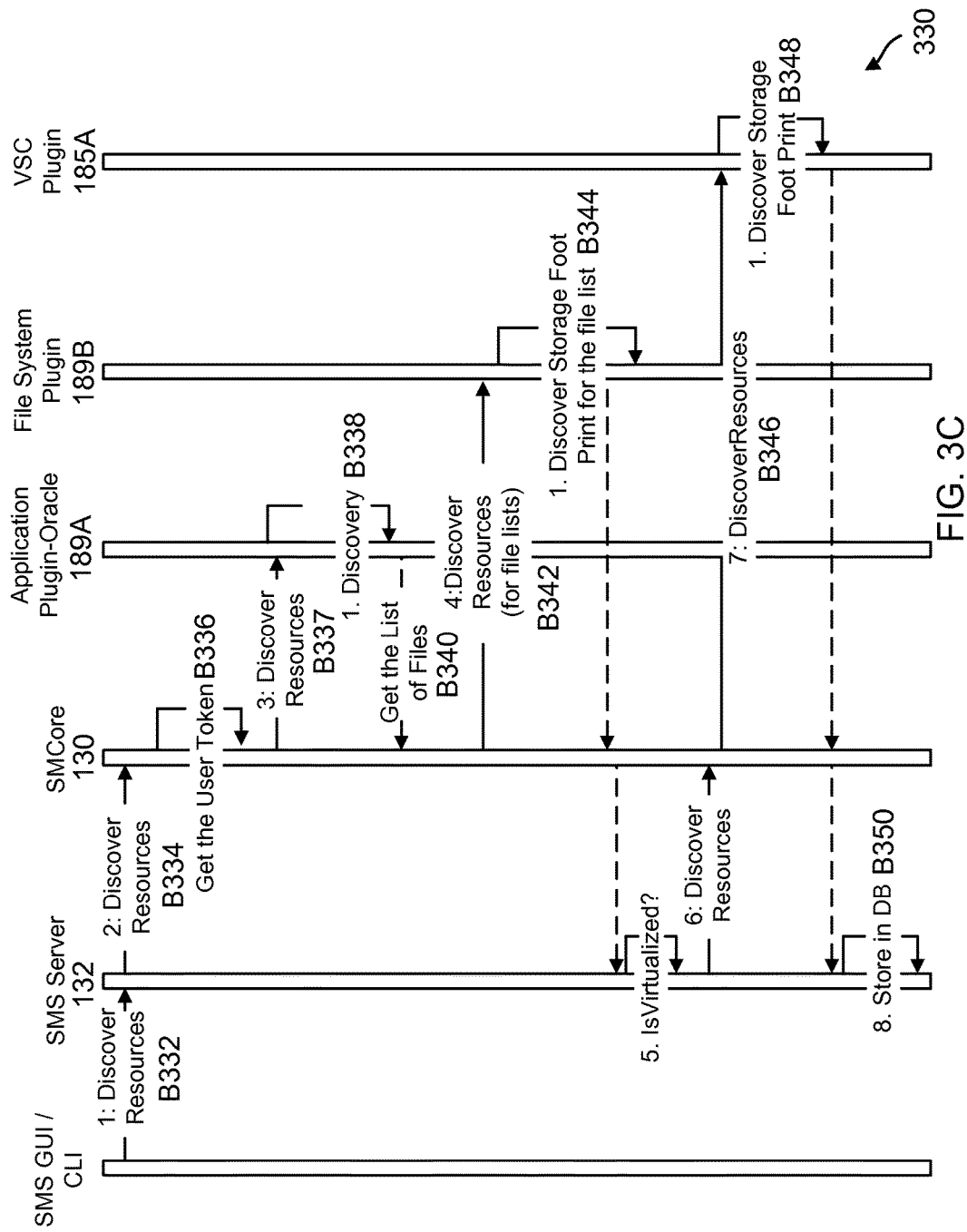
FIG. 3C shows a process for resource discovery involving different applications, plugins and the SMS, according to one aspect of the present disclosure.

FIG. 3C shows an example of a process 330 showing resource discovery involving different applications, plugins and the SMS, according to one aspect of the present disclosure. As an example, the process begins in block B332, when a discovery request is received by the SMS 132. The request may be generated from a GUI or a CLI. In block B334, the SMS 132 generates a unique user token for the discovery request. In block B336, the token with the discovery request is sent to the appropriate SMcore layer 130. The request format is the same regardless of what plugin or application is involved.

In blocks B337 and B342 the SMcore layer 130 sends a discovery request to the Oracle application plugin 189A and the file system plugin 189B, respectively, when storage is not virtualized. The application plugin 189A provides a list of files that need to be discovered in block B340. The file system plugin provides the storage footprint for the list of files in block B344.

When storage is virtualized, as determined in block B345, a discovery request is sent to the VSC plugin 185A (or any other hypervisor plugin that may be appropriate for the virtual environment). The plugin conducts discovery in block B348 to obtain both virtual storage and physical storage information and provides the same to SMS 132. In block B350, the storage information is then stored at database 176.

Figure 3D:
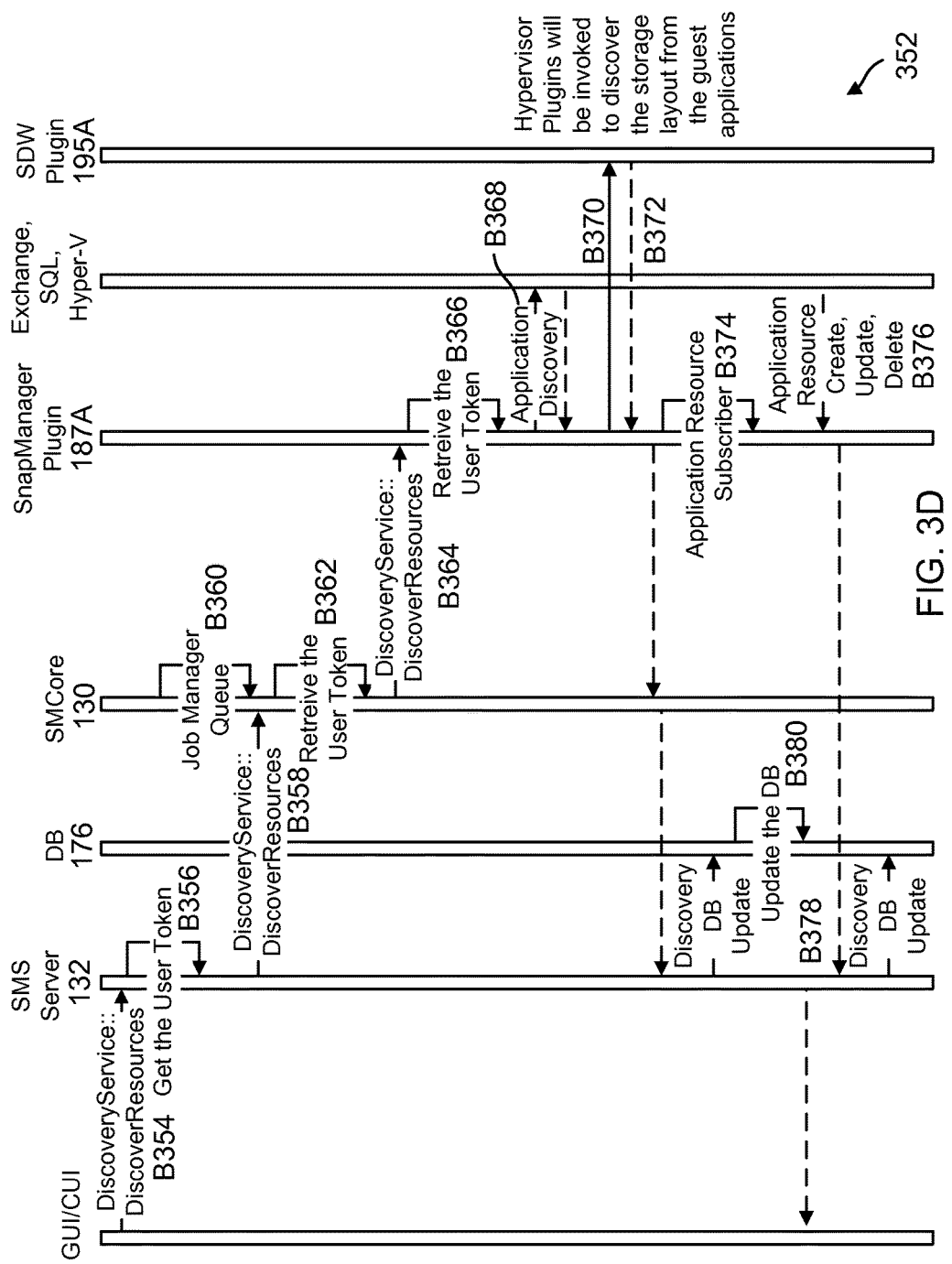
FIG. 3D shows an example of a process for discovery resources involving a Windows based host, according to one aspect of the present disclosure.

FIG. 3D shows an example of a process 352 for discovery resources in a Windows based host (for example, 102B (FIG. 1E)). The process flow 352 is similar to the process 330 described above with respect to FIG. 3C. A discovery request is received by SMS 132 in block B354. A user token is generated in block B356 and a discovery request is generated for the SMcore 130 in block B358. The SMcore 130 creates a job in block B360 and retrieves the user token in block B362 and thereafter, initiates a discovery request for the Snap Manager plugin 187A that retrieves the user token in block B366. The application based discovery is initiated in block B368, while storage resource discovery request is initiated in block B370. The storage resource information is obtained in block B372.

In blocks B374 and B376, the plugins update any modified state to the SMcore 130 that provides the information to the SMS 132. For example, if a new database is added to an existing SQL instance, then blocks B374/B376 allows the SMS 132 to reflect the status of the newly added database to a user via a GUI. Also if a database is deleted, or a database property is changed (e.g. a new file group is added) that is also reflected immediately in the SMS 132 database 176 and then the GUI. This is enabled because SMcore 130 subscribes to events for any inventory related changes that occur with respect to each plugin. Using this mechanism SMS 132 inventory information is automatically updated with real time changes happening on a remote application. Thereafter, a database update request is sent in block B378 and the database is updated in block B380.

Figure 3E:
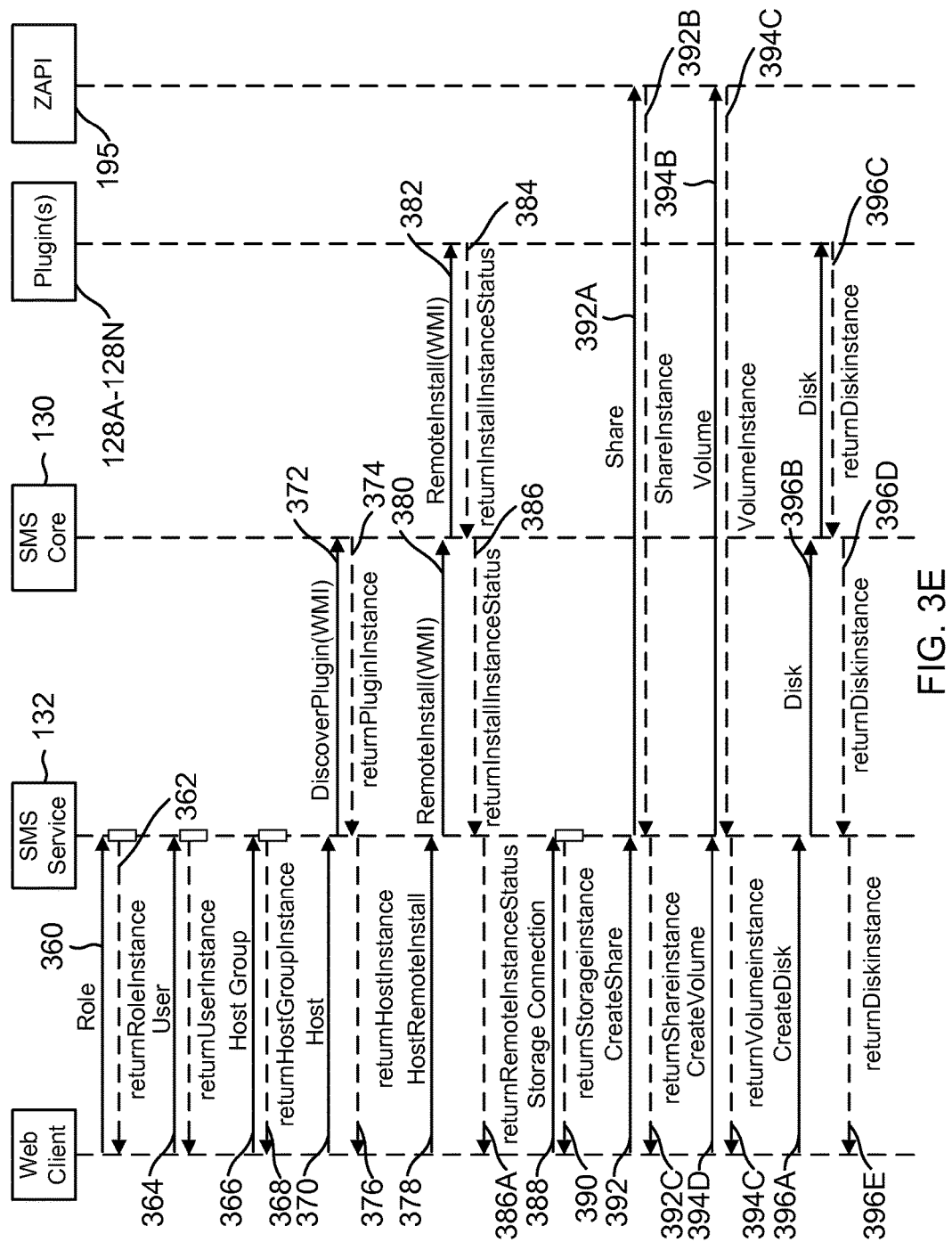
FIG. 3E shows an example of inventory management using SMS and other components, according to one aspect of the present disclosure.

FIG. 3E shows a generic example of host/inventory management using SMS 132, SMcore 130, plugins 128A-128N (see FIG. 1A) and ZAPI interface used by SAL 151A and the storage system interface 195, according to one aspect. The process begins in block 360 when a role is requested by a user. SMS 132 returns a role 362, based on user information stored at database 176. In block 364, the user connects with the role and SMS 132 returns a user instance.

In block 366, the user requests information regarding a host group. SMS 132 returns the information in block 368.

In block 370, host information is requested. A discovery process is triggered in block 372 and returned in block 374. In this example, a WMI (Windows Management Interface) plugin is used to obtain the information. The host information is then returned in block 376.

In block 378, remote install process is triggered. SMS 132 communicates with SMcore 130 in block 380. SMcore 130 then manages the plugin install process in block 382. The installation instance is provided to SMcore 130 in block 384 and returned to SMS 132 in block 386 and then returned to the user in block 386A.

A storage connection is established in blocks 388 and 390. As an example, a CIFS share is created in blocks 392, 392A, 392B, and 392C. A volume is created in blocks 394A, 394B, 394C and 394D. It is noteworthy that a volume may be created by other management application(s) (not shown). A storage disk is then created in blocks 396A-396E.

RBAC Architecture and Process Flows: In one aspect, SMS 132 is configured to manage RBAC requirements for various environments, including SQL, Oracle database, active directory, Open Lightweight Directory Access Protocol (LDAP), Windows operating environment and others. During SMS installation, a user is asked to enter SMS administrator credentials with relevant permissions. Once the user is able to login as an administrator, it can assign other users to different roles, as described below in detail.

Each role has a set of attributes and a storage connection is associated with one or more users. One or more hosts are also associated with the user. Each SMcore 130 (and SMS 132) implements a local cache of RBAC roles and connection mappings which are queried by SAL 151A for retrieving storage connection for a specific user, as described below in detail.

FIG. 4A shows a block diagram of an architecture 400 used by the RBAC module 156 (FIG. 1C) for managing roles and access within system 100, according to one aspect. Various service points within system 100 require proper authentication and authorization. For instance, SMS 132, the various plugins and storage system 120 need authentication/authorization for users to either access storage or be able to perform storage related services. The parameters for authentication/authorization maybe different when a storage service request is being processed from an application to the storage system's perspective. For example, the RBAC rules and semantics may be different for hosts' 102A-102C and storage system 120 (See FIG. 1E). A UNIX host 102C may have different authorization and authentication requirements vis-à-vis Windows host 102B or the Hypervisor 102A. Similarly, the storage system 120 may have different requirements for authenticating and authorizing access to storage space and stored data containers. The architecture 400 enables SMS 132 to manage authentication and authorization roles for the various layers described above.

The SMS RBAC module 156 includes an authentication module 402 and an authorization module 406, according to one aspect. The authentication module 402 provides authentication services to authenticate users. The authentication may be based on system 100 settings.

The authorization module 406 provides authorization based on a role defined for the user, a permission name associated with the role, an operation type specified for the role/user, as well as an object type that the user intends to access.

As part of authentication, authentication module 402 generates a unique token after a user name and a password is authenticated. The token may be based on the user name, current date time and a default validity, for example, for 24 hours. The token may be encrypted using AES (Advanced Encryption Standard) based encryption and then passed to the client. The client may then start communicating with different modules using the same token.

The RBAC module 156 maintains domain specific parameters 412A-412N for different domains, for example, active directory, open LDAP, and others. This allows RBAC module 156 to accommodate authentication for different domains.

The RBAC module 156 also interfaces with a storage RBAC module 408 via SAL 151. The storage RBAC module 408 maintains RBAC information as related to the storage devices and storage objects maintained by the storage systems.

The RBAC module 156 further interfaces with an application RBAC module 414. The application RBAC module 414 may interface with application specific RBAC modules, for example, hypervisor RBAC module 416, Windows RBAC module 418, database RBAC module 420 or any other application based RBAC module 422. The different applications may have different RBAC requirements and RBAC module 156 manages these different requirements as described below in detail.

FIG. 4B shows a format 424 used by RBAC module 156 to manage varying RBAC requirements. Format 424 maps user roles to storage connections, role name and a role identifier. The storage connection may be based on one or more virtual servers (VServers) credentials.

A user having credentials 432 is part of a group 428 that belongs to a specific domain 426. An example of a domain may be a SQL database domain, an Oracle database domain, a vCenter domain and others. The user credentials include storage connection credentials and the user specific token described above. In one aspect, user credentials 432 may be stored at a data structure by SMS 132 that keeps track of user to credential mapping for supporting RBAC requirements for different domains.

Each user is assigned a role 434 that provides certain privileges. Every user has one or more roles. For example, a user may be a backup administrator 434A, a backup operator 434B, a backup viewer 434C, a restore administrator 434D, and any other user defined role 434E because a user may create new roles, modify existing roles or delete roles based on user needs and the operating environment. Examples of these roles have been described above.

Each role is associated with certain permissions 436 that has certain attributes 438. The permission allows the user to execute certain operations (440) on an object 442. The permissions may allow a user to access, read, modify or delete specific objects or information pertaining to the various objects mentioned herein. Examples of objects 442 are shown as a host object 442A, a VM object 442B, a plugin 442C, a dataset 442D, resources (for example, storage resources 442E) and a policy object 442F.

The host object 442A may have configuration information regarding a host as well as stored data objects for a specific host. The VM object 442B may have configuration information regarding a VM, the resources used by the VM and data containers stored using the VM. Dataset 442D has been defined and described above. Resources 442E may include information regarding storage devices, network resources and others. Policy 442F has also been defined and described above in detail.

In one aspect, SMcore layer 130 implements a local RBAC cache to cache roles and storage connections for a specific user for a host system. This allows the SMcore layer 130 to determine user rights and permissions for backup restore, cloning and other storage services.

FIG. 4C shows a process flow 450 for using the RBAC module 156 and the architecture of FIG. 4A as well as the format of FIG. 4B, according to one aspect of the present disclosure. The process begins in block B452, when a user needs to be added to use SMS 132 features or any other time. The process blocks are executed using a GUI or a CLI.

In block B454, a user token is generated for accessing a stored object, for requesting a storage service related to the stored object or for any other reason. This may require user input. The RBAC module 156 keeps track of user credentials in a data structure (432) for supporting application specific RBAC and authentication schemes. This enables SMS 132 to map user and application specific credentials.

In one aspect, the user may use a username and a password to login to SMS 132. The user name can be an active directory user, a LDAP user, local Window machine user or any other type.

In block B456, the user is assigned one or more roles with specific attributes. The user may have administrative rights that enables the user to create roles. As described above, a role is a set of pre-defined operations a user can execute on an object. In one aspect, a role is a container with certain capabilities that are defined by role attributes. As an example, the attributes include "view dataset", edit dataset, create data set, delete data set, create storage connection and delete storage connection.

In block B458, the user is assigned to a host (or a host group), where a host group has more than one host system. In block B460, the user is assigned a storage connection. As an example, a storage connection may be through a virtual server to access a storage volume.

In one aspect, a standard format is used to manage storage connection information, which may be stored as a storage connection object in database 176. Regardless of who uses storage, the storage connection object is maintained in the same format. For example, the storage connection object format includes, an identifier of a storage device, name of the server managing the storage device, IP address of the server, a port identifier for accessing the server, password, role identifier for the storage connection, date the storage connection object was created and modified, when applicable.

In one aspect, the foregoing RBAC architecture and layout allows SMS server 132 to manage RBAC functionality across different platforms, applications and operating environments through a single pane, as described below in more detail with respect to FIGS. 8A-8T.

Backup Process Flows: In one aspect, SMS 132 and SMcore layers 130A-130N with the appropriate plugin(s) are used to backup information stored for any application type, using storage system 120. The backups are initiated by a backup schedule for one or more stored objects or on-demand based on user input. The SMS server 132 creates a backup job in a standard format so that backup job for every application can be tracked and reported to the user. Once the job is created, the SMS server 132 notifies the SMcore 130 of the host system that executes the application for the stored objects.

The SMcore 130 at the host then drives the backup process flow by first discovering the appropriate resources used by the application and the storage system 120. Details regarding the process flows are provided below.

FIG. 5A shows a process 500 for creating a dataset and then executing a storage service operation, for example, a backup operation using SMS 132, according to one aspect. The process begins in block B504, when a dataset is generated based on user input. An example of a dataset is shown in FIG. 2E and described above in detail.

In block B506, an application object is added to the dataset. The application object may be a database, a virtual machine, a data container or any other object type. A protection policy is applied to the dataset in block B508. The protection policy includes a retention schedule (i.e. for how long a snapshot or backup) copy of the application object is to be retained. A backup schedule that defines when and how often the object is to be backed. The protection policy also defines a backup type, for example, a full backup of a storage volume or a log backup. It is noteworthy the dataset is managed in the same format regardless of the object type, the application type and/or backup type.

In block B510, the SM module 134 at SMS 132 initiates a backup operation. The backup operation is based on the policy for one or more stored objects that are defined in the dataset. The job manager 182 generates a job object to track the backup operation. Thereafter, in block B512, the SMcore layer 130 associated with the host system for the stored object is requested to perform the backup operation. Because the SMS 132 and SMcore layer 130 use a standard request and response format to communicate as described above with respect to FIG. 2A, SMS 132 is able to initiate and manage backup operations for different host systems and applications.

In response to the backup request, in block B514, the SMcore layer 130 initiates a discovery operation for a backup operation. In one aspect, the discovery request is routed to an appropriate plugin depending on the object and the dataset. FIGS. 3C and 3D described above show examples of the discovery process. For example, if the object is a SQL database, then the discovery request is forwarded to the SM plugin 187A executed by the appropriate host identified by the dataset. For a UNIX host, the Oracle plugin 189A is used to discover the list of files for the database.

The storage footprint for the database is also obtained. The storage footprint may be obtained using SAL/SDW plugins for the Windows case. For a virtual environment, the Hypervisor plugin and/or the VSC plugin maybe used to obtain the storage footprint. Once the storage footprint is obtained, in block B516, the process groups the storage objects into multiple sets to take a backup. This reduces the number snapshots that the system has to take.

In block B518, the plugin for the backup operation is quiesced i.e. placed in a state where other operations are delayed until the backup operation is completed. SAL 151A is instructed to take a snapshot in block B520. Once the snapshot is taken by the storage system 120 using storage services module 122 (the details of which are not provided here), the SMcore 130 instructs the plugin to unquiesce in block B522. Thereafter, the SMcore 130 obtains the backup metadata in block B524. An example of backup metadata is shown in FIG. 5D, described below in detail. The backup metadata is stored by the SMS 132 for restore operations described below in detail. In block B526, the retention and replication policy for the backup is implemented. This will depend on the policy itself. In block B528, the SMS 132 registers the backup and stores the metadata for restore operations. Thereafter, the process ends in block B529.

Figure 5B:
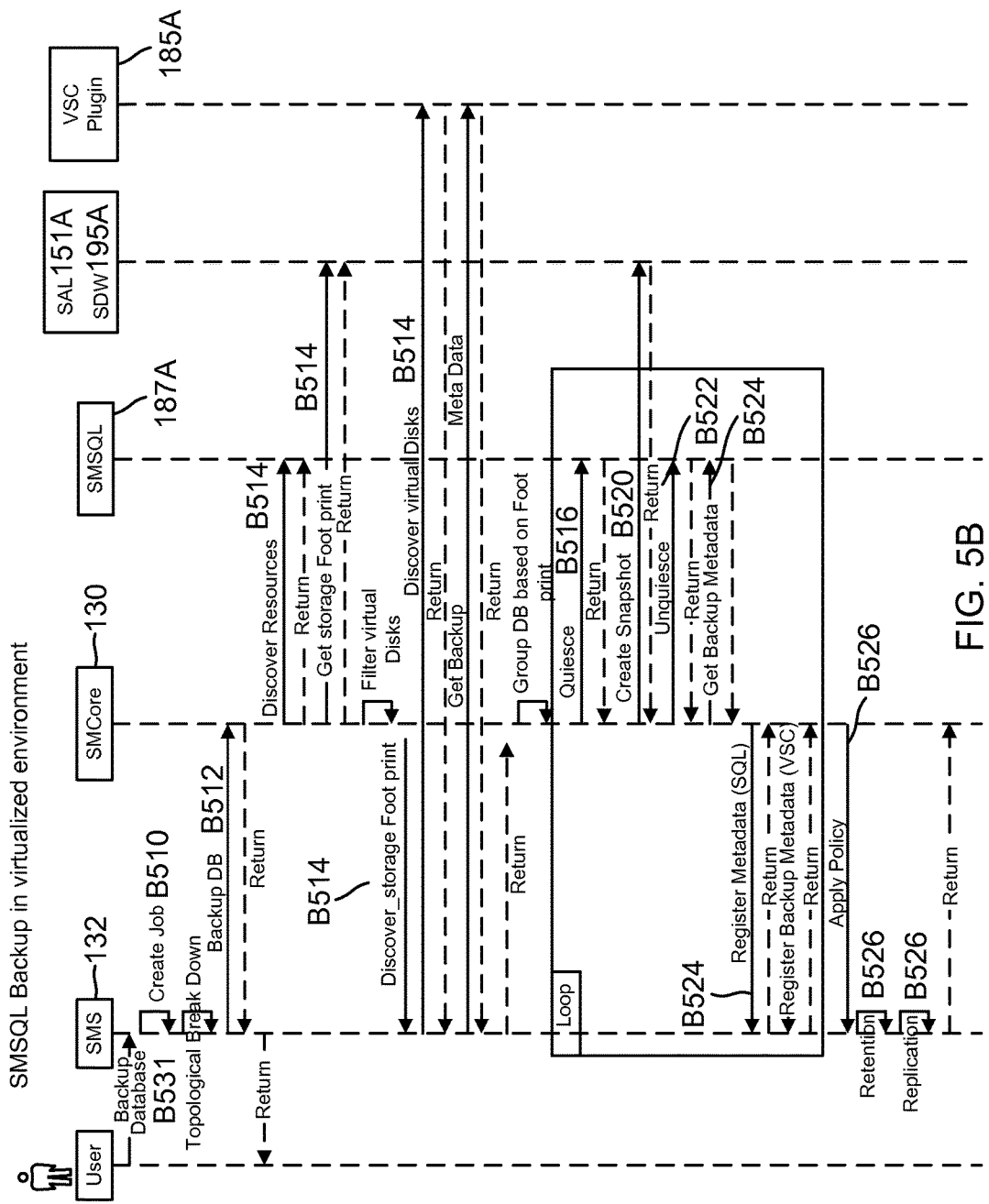
FIG. 5B shows a process flow for taking backups in the system of FIG. 1A, according to one aspect of the present disclosure.
Figure 5C:
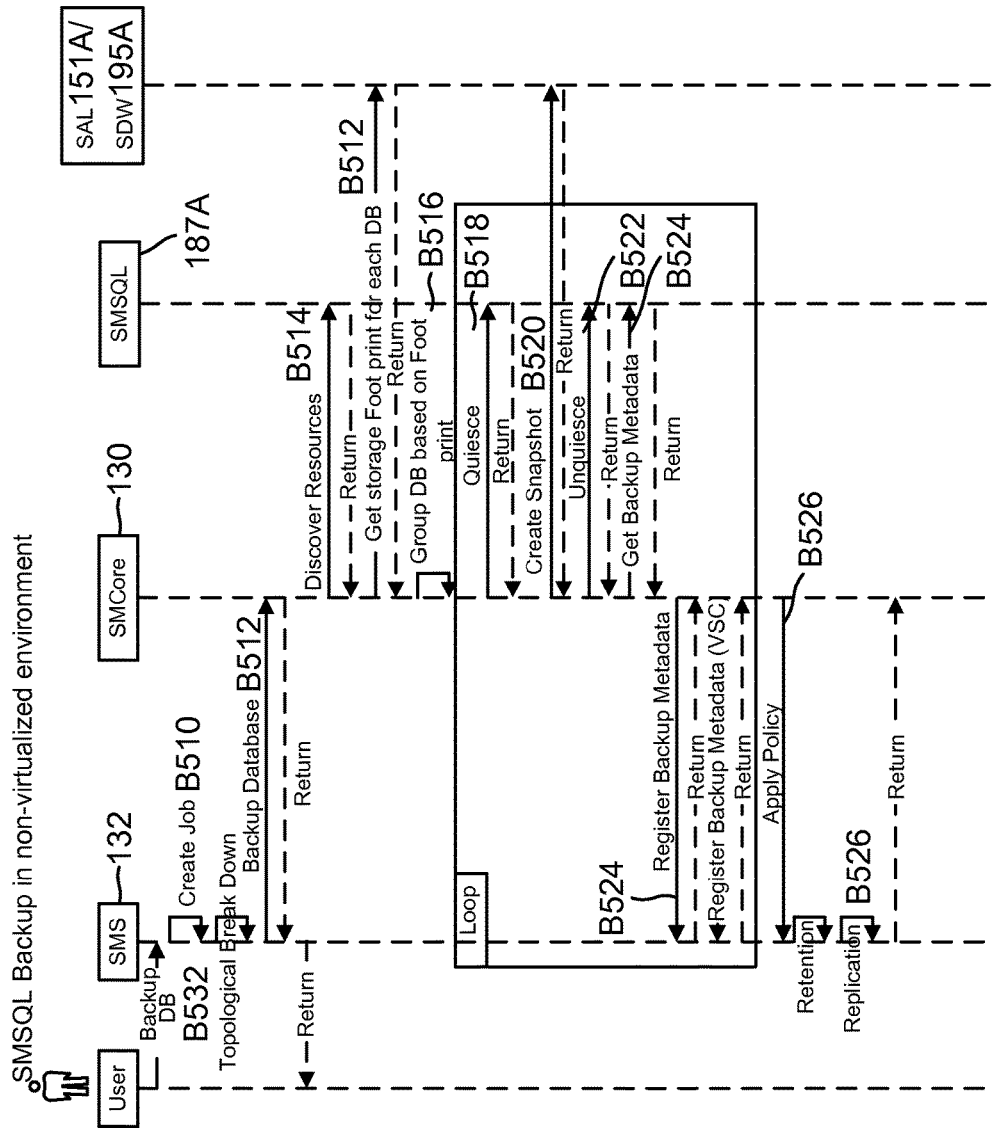
FIG. 5C shows portions of the process of FIG. 5B in a non-virtualized environment, according to one aspect of the present disclosure.
Figure 5D:
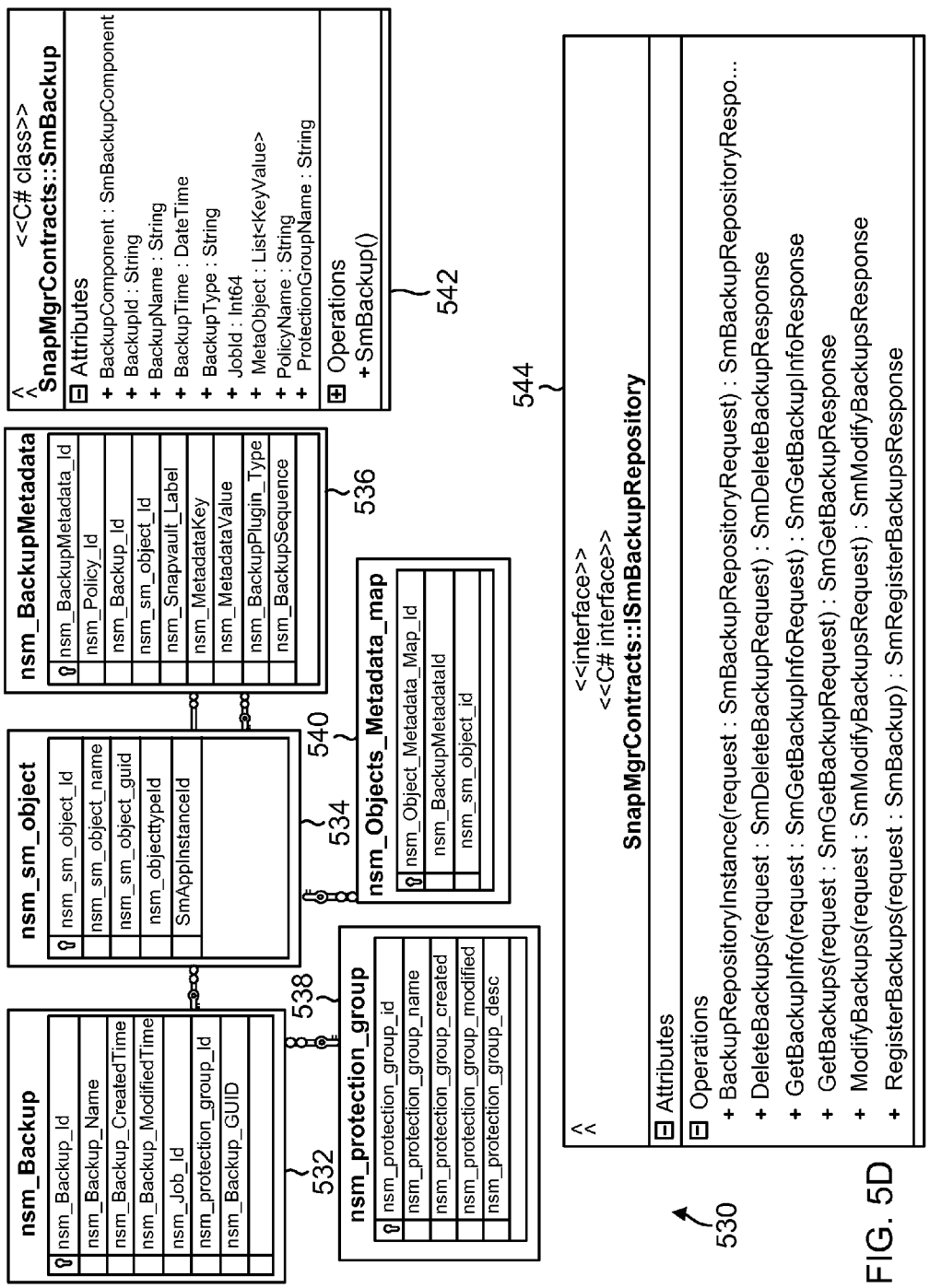
FIG. 5D shows a format for storing backup metadata by the SMS, according to one aspect of the present disclosure.

FIG. 5B shows an example of executing the process 500 from block B510 onwards in a virtualized environment where VMs are used or where applications within a VM environment is used. A backup request is received by SMS 132 (shown as B531). The backup job object is created by SMS 132 in block B510. The backup request to SMcore 130 is sent in block B512. The discovery takes place in block B514. The databases are grouped in block B516. The rest of the process blocks are self-explanatory, including blocks B528A/B528B for applying retention and replication policies FIG. 5C shows portions of process 500 (from block B510 onwards in a non-virtualized environment, after a request for a backup is received in block B531. The process blocks of FIG. 5C are similar to FIG. 5B, except the storage footprint also includes virtual disks and discovery of virtual disks.

FIG. 5D shows a format 530 for managing backup metadata for a plurality of applications, according to one aspect. In one aspect, SM module 134 maintains a same data structure format representing all application plugins. A common backup metadata interface is maintained for different plugins, as described below. If a plugin wants to extend the metadata, then SMS 132 allows addition of application specific tables and links. The common backup metadata interface is used to collect and store the metadata. Although different applications may have different backup metadata and metadata formats, the SM module 134 stores the metadata in a generic format, regardless of application type. This makes the overall process for managing the backups and the associated metadata efficient, as described below in detail.

FIG. 5D shows a main backup object 532 that is used to store a backup identifier (nsm_backup_id) and a backup name. The backup object 532 may also be used to store the time the backup was created and when it was last modified. A job identifier (job_id) identifies the job that was used to create the backup. A protection identifier (protect_group_id) defines the dataset to which the backup belongs. The protection group identifier is associated with a protection group object 236 that includes details regarding the protection group i.e. the protection group name, when it was created, modified and a description.

Object 532 is also associated with object 534 that is labelled as nsm_sm_object. Object 534 identifies the object that is being backed up. The object is uniquely identified by a name and an identifier, including a global unified identifier (GUID). Object 534 also indicates the object type, for example, a virtual machine, a database and others and includes an identifier for a snapshot instance. Object 534 is associated with object 540 that identifies what is being backed up. Object 540 also identifies a metadata map and a backup metadata.

Object 532 is also associated with a protection group object 538. The protection group object is identified by a protection group identifier, group name, description and the time the group was created and/or modified.

The backup metadata is shown in object 536 that provides the database schema for handling metadata. Object 536 represents the common aspects of backup metadata across multiple applications. Applications/application plugins may customize the metadata which allows SMcore modules to interact in a seamless manner, regardless of application type.

Object 536 provides a mechanism to attach and lookup attributes of backups along with specific metadata elements. Object 536 identifies backup metadata with an identifier. The metadata also identifies a policy and the backup for a data container. The object that is backed up is identified as nsm_sm_object_id. An application specific key value pair may be stored in object 536 as metadata key and metadata value. The plugin associated with the backup is identified by the backup plugin type. The backup sequence identifies the number of the backup when more than one backup exist.

The generic backup representation of FIG. 5D uses key value pairs so that different application requirements can be met efficiently. Thus backup metadata for different plugins can be extended using this approach.

An example of object 534 is shown as SMbackup object 542. Object 542 is designed to abstract all the backup information including resources that are backed up. Object 542 identifies the components that are backed up ("Backup Component"). The identifier for the backup and a backup name. The date of the backup and the backup type. The job identifier is shown as INt64. The metaobject is shown as the "keyvalue" that is customized for different applications. The policy name and the protection group names are also shown in object 542. If a plugin needs additional data or objects, then that can be added under "Operations" showing "Smbackup". A new class may be used to represent plugin specific detailed object information backed by using a plugin specific database schema.

FIG. 5D also shows an example of an interface 246 labelled as "ISMBackupRepository" that is used to obtain backup metadata. The interface may also be used to delete backups, get backups and register backups.

Figure 6A:
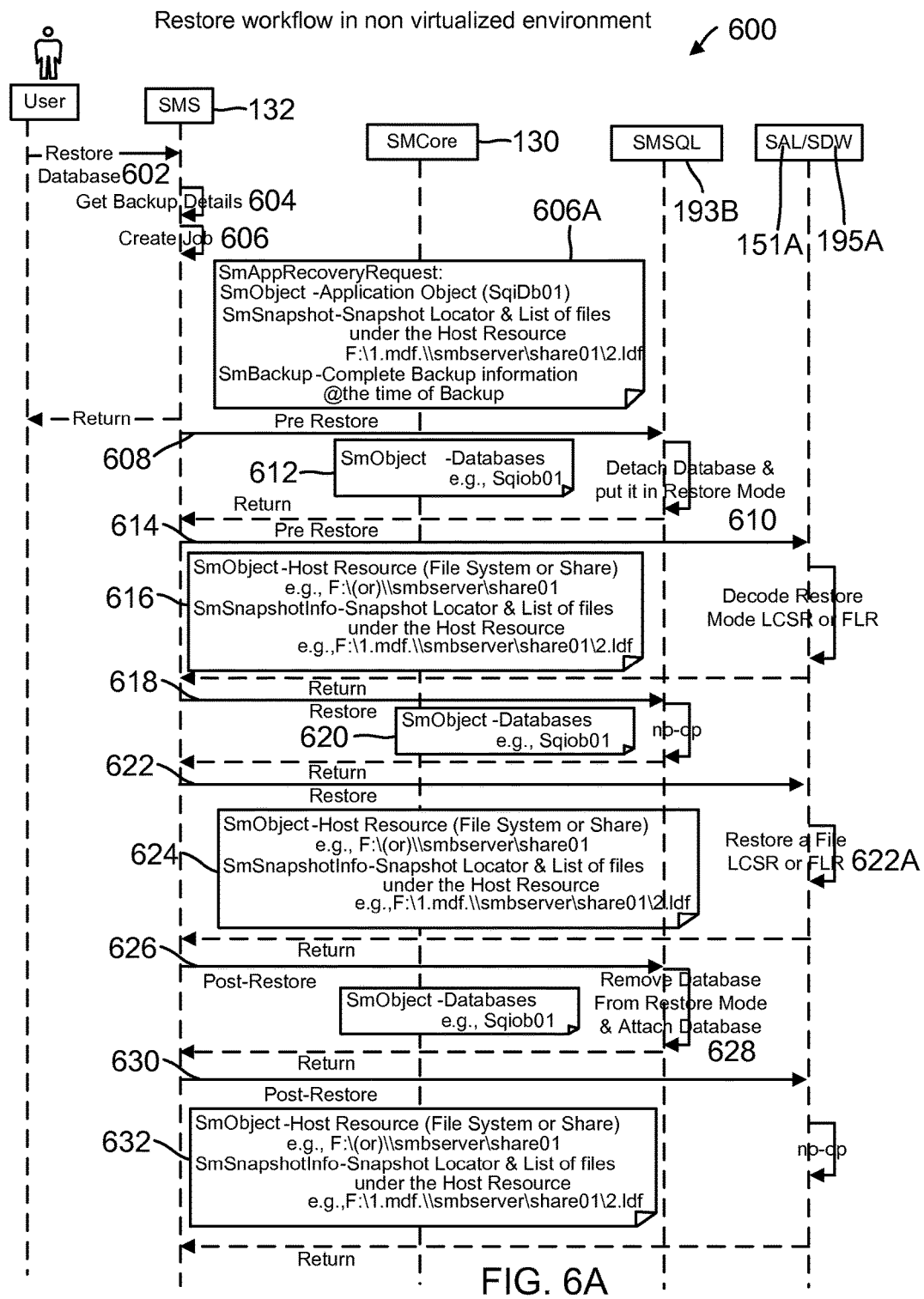
FIG. 6A shows a restore process flow in a non-virtualized environment by the SMS, according to one aspect of the present disclosure.

Restore Workflows: FIG. 6A shows an example of a process 600 for restoring a stored object that has been backed up. The stored object may be a SQL database in a Windows environment. Process 600 shows interactions between SMS 132, SMcore 130, SMSQL plugin 193B and SAL 151A/SDW plugin (shown as SDW) 195A (also referred to as file system plugin). The process begins when a request to restore a stored and backed up object (for example, a SQL database) is received in block 602. It is noteworthy that the same process may be used with a different stored object stored for a different application. The restore request may be received via a GUI or a CLI.

In response to the request, SMS 132 (i.e. the recovery module 152 of SM module 134) obtains the backup details from database 176 in process block 604. As described above, the backup metadata is stored in a same format regardless of object or application type and may be searched for using a key-value pair, for example, a backup ID and a host ID or other values.

The job manager 182 then creates a job and an application recovery request in process block 606. An example of the recovery request object is shown as 606A. The recovery request object identifies the Smobject as a SQL database and also includes information on the snapshot and the location information for the snapshot files. The recovery object also identifies the backup type.

In process block 608, a pre-restore request with object 612 is issued to SMcore 130 that issues the pre-restore request to plugin 193B that interfaces with the SQL application. Object 612 includes a list of database files that are being restored. The plugin 193B detaches the database that is being restored into a restore mode in process block 610.

In process block 614, the pre-restore request with object 616 is also sent to SAL 151A/SDW 195A that interfaces with the storage system interface 195 and the storage system 120. Object 616 provides the list of files that are to be restored. SAL 151A/SDW 195A decides if the request is for a single file or a complete LUN restore.

A restore request is sent to SMSQL plugin 193B with object 620 (similar to 612). A restore request is also sent to SAL 151A/SDW 195A via SMcore 130 with object 624 that is similar to 616. The storage system 120 restores the files and notifies SAL 151A/SDW 195A.

A post-restore process is triggered in process block 626. The plug-in 193B is requested by SMcore 130. In block 628, the plugin 193B removes the database from the restore mode and attaches the database so that it can be accessed.

In process block 630, a post-restore request is sent to SAL 151A/SDW 195A with object 632, similar to object 624. Thereafter, the process ends.

Figure 6B:
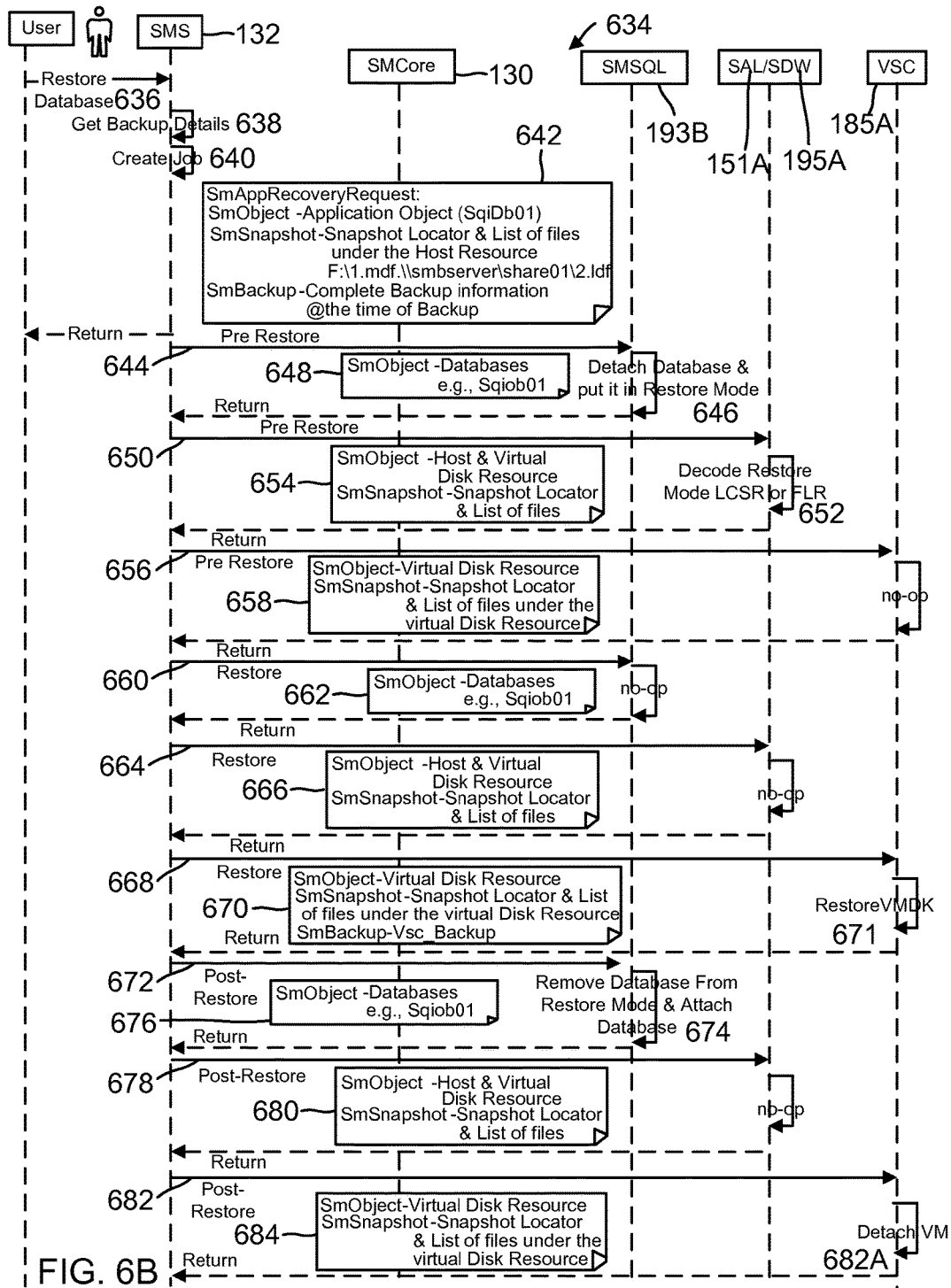
FIG. 6B shows a restore process flow in a virtualized environment by the SMS, according to one aspect of the present disclosure.

FIG. 6B shows a process 634 for restoring a complete VM based storage, according to one aspect of the present disclosure. Various FIG. 6B process blocks are similar to the process blocks of FIG. 6A, except in FIG. 6B, the virtual plugin 185A is also involved to obtain information regarding virtual disks and the association of the virtual disks to the actual storage managed by the storage system 120. The example of FIG. 6B is also for restoring a database that is being managed in a VM environment i.e. a SQL database in a VM environment (i.e. a virtualized SQL).

In process block 636, a restore request is received. The request may be received via a GUI and identifies a backup that needs to be recovered. The request may also identify the virtual machine where the SQL application may be running. The request is received by SMS 132 and then passed to the recovery module 152. The recovery module 152 uses backup identifier information from the request and obtains backup details from the stored backup metadata at database 176. An example of backup metadata is shown in FIG. 5D and described above. The job manager 182 then creates a restore job in block 640. An app recovery request object is created by SM module 134 and is shown as 642. Details of 642 are similar to 606A described above with respect to FIG. 6A.

In process block 644, a pre-restore request is sent to the SMcore layer 130 at a host system that manages the database that is being restored. The SMcore layer 130 presents the request to the SMSQL plugin 193B with object 648. In block 646, the plugin detaches the database mentioned in the recovery object 624 and 644 and places the database in a restore mode.

The pre-restore request is also sent to SAL 151A/SDW 195A in process block 650 with object 654. Object 654 provides the list of files that are to be restored and a snapshot locator i.e. where the snapshot is located from the storage system 120's perspective. The SAL 151A/SDW 195A determines the type of restore operation, similar to process block 616, described above with respect to FIG. 6A.

The pre-restore request is also provided to the VSC plugin 185A in block 656. The VSC plugin 185A is also provided with a list of virtual disks in object 658 that are used to store the database files.

In block 660, a restore request is first sent to the SQL plugin 193B with object 662 i.e. list of the database files. The restore request with list of storage system files (i.e. Snapshot locator and a list of application files in object 666) is also sent to SAL 151A/SDW plugin 195A in block 664.

In block 668, the restore request is sent to the VSC plugin 185A with object 670. Object 670 includes virtual disks and a VSC backup object that identifies the backup from the VSC's perspective. The VSC plugin 185A mounts the virtual disks in block 671. Thereafter, a post-restore request is sent via SMcore 130 to SQL plugin 193B in block 672 with a list of databases (see object 676). In block 674, the SQL plugin 193B removes the database from the restore mode and makes the database available for use.

The post-restore request is also sent to the SAL 151A/SDW plugin 195A in block 678 with object 680. In block 682, the post-restore request is also sent to the VSC plugin 185A with object 684, which is similar to 607. The VSC plugin 185A then detaches from the VM in block 682A and the process ends.

Figure 6C:
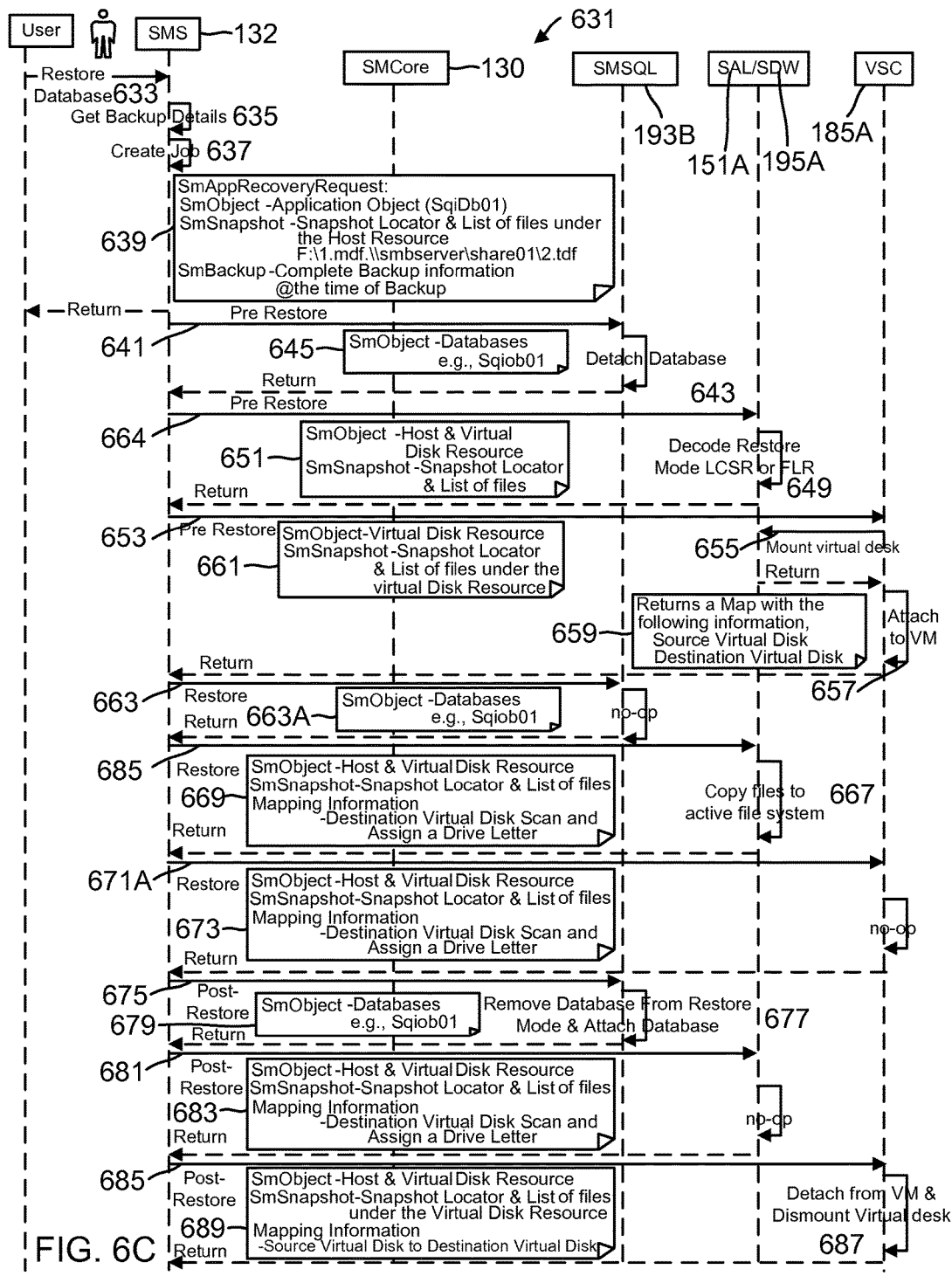
FIG. 6C shows a restore process flow in a virtualized environment by the SMS for a partial virtual disk, according to one aspect of the present disclosure.

FIG. 6C shows a process 631, similar to process 634, except the restore process is for a partial virtual disk (or VMDK), according to one aspect. The similar process blocks have been described above and for brevity sake the description is not being repeated. For example, block 633 is similar to 636, block 635 is similar to 638, block 637 is similar to 640 and object 639 is similar to 642.

Block 641 is similar to 644, object 645 is similar to 648 and block 643 is similar to 646. Block 647 is similar to 650, object 651 is similar to 654 and block 649 is similar to 652.

Block 653 is similar to block 656 ad object 661 is similar to object 658. In block 655, the VSC plugin 185A mounts the virtual disk that are affected by the restore operation and attaches itself to the VM. Object 659 is returned to SMS 132 with information regarding the source virtual disk and the destination virtual disk.

Block 663 is similar to 660 and object 663A is similar to object 662.

Block 665 is similar to block 664. Object 669 is similar to object 666 but also includes destination virtual disk and a drive letter. In block 667, the files that need to be restored are copied to the active file system.

In block 671A, a restore request is sent to VSC plugin 185A with object 673. Object 673 includes all the information of object 670 and also includes destination virtual disk and the assigned drive letter for the restored database.

Block 675 is similar to 672 and object 679 is similar to 676. Block 677 is similar to 674, while block 681 is similar to block 678. Object 683 is similar to object 673. Block 685 is similar to block 682, while block 687 is similar to block 682A. Object 689 is similar to object 684 and also includes a mapping of source virtual disk to the destination virtual disk where the database is restored.

Clone Life Cycle Management: In one aspect, SMS 132 provides a centralized tool for cloning backups and managing the life cycle of the clones. The term clone as used herein means a "flexclone" volume that is created based on a clone of snapshot of a flexible storage volume i.e. a storage volume whose size can be varied and managed by the storage system 120. When a flexclone volume is created it is associated with a parent storage volume and a base snapshot. The adaptive aspects described herein are not limited to a flexclone or a clone of a flexible volume.

FIGS. 7A-7F show various methods and systems for cloning and clone life cycle management, according to the adaptive aspects of the present disclosure. In one aspect, a user is able to select a backup using a GUI (as described below) and create a clone on-demand. Clone creation may also be triggered by a schedule or clone life cycle management. The same is available for a clone delete operation, as described below in detail.

A user may set a clone lifecycle for one or more data structures/databases using a GUI or a "cmdlet" (for example, a Powershell cmdlet used in the Windows environment (see 180, FIG. 1D)). A dataset is created and stored application objects (for example, databases are added to the dataset). An option to manage the clone life cycle is selected from the GUI. A wizard then creates a clone lifecycle dataset. A new policy is created (or an existing policy is used) and associated with the clone dataset. Thereafter, the clone life cycle can be initiated based on a preferred schedule.

In one aspect, SMS 132 enables clone lifecycle management for different stored objects that are maintained by different applications. Because SMS 132 maintains information regarding backups and datasets in an application/ platform independent format, it can centrally manage the life cycle for various clones for different applications, including VMs.

Figure 7A:
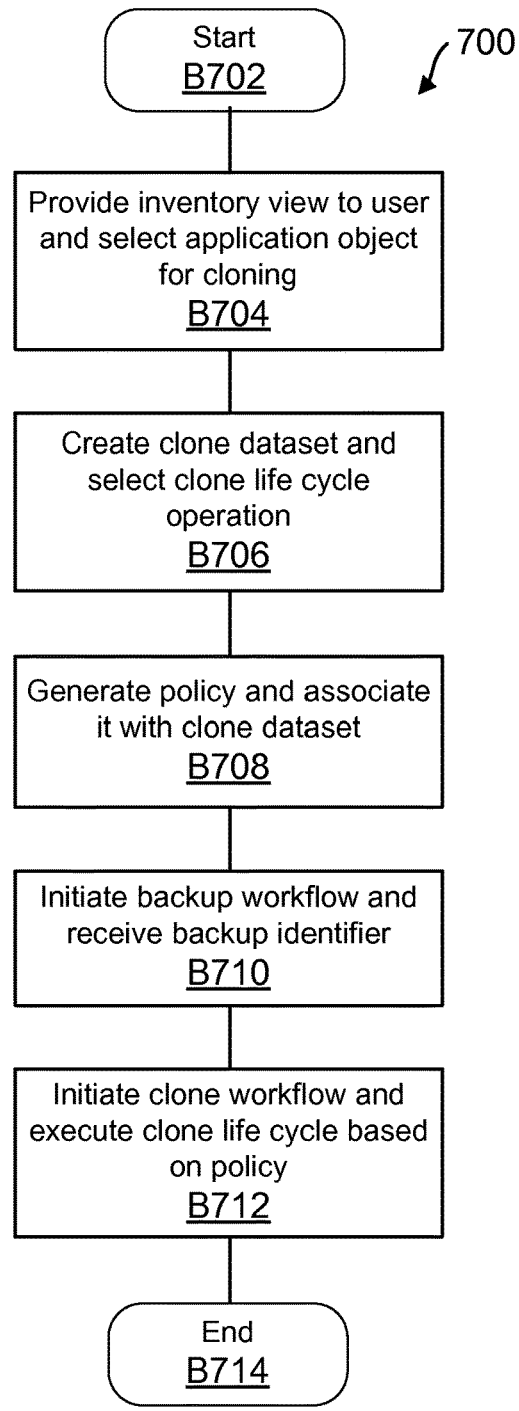
FIG. 7A shows a high level process flow for implementing clone life cycle management, according to one aspect of the present disclosure.

FIG. 7A shows a process 700 for managing the life cycle of a clone, according to one aspect. The process begins in block B702. In block B704, an inventory view is presented to a user via a GUI. The inventory view (for example, the view shown in FIG. 8C) may present stored application objects, for example, databases to the user. The application objects may vary from one application to another. The user selects stored objects for cloning. It is noteworthy that the user may select a live database for cloning. Multiple databases may be selected at the same time for cloning.

In block B706, a clone dataset is created for the clone and a clone life cycle option is selected for the clone dataset. The dataset includes what will be cloned (for example, a cloned instance name, parameter settings, mount point settings and others). An example of creating a dataset is provided above in detail.

Thereafter, in block B708, a clone policy is generated and associated with the clone dataset. An example of the clone policy is shown in screenshot 724 of FIG. 7B. It is noteworthy that different applications and plugins will have different configuration settings based on the applications and preferences for specific entities that are part of the dataset. The various settings are part of the dataset which makes it efficient to manage clone life cycles.

In block B710, a backup workflow is initiated. Examples of backup workflows have been described above with respect to FIGS. 5A-5C. Once the backup workflow is completed, the SMS 132 receives the backup identifier. Thereafter, a clone workflow is initiated in block B712. Based on the clone policy, the clone life cycle is also executed and the process ends in block B714.

Figure 7B:
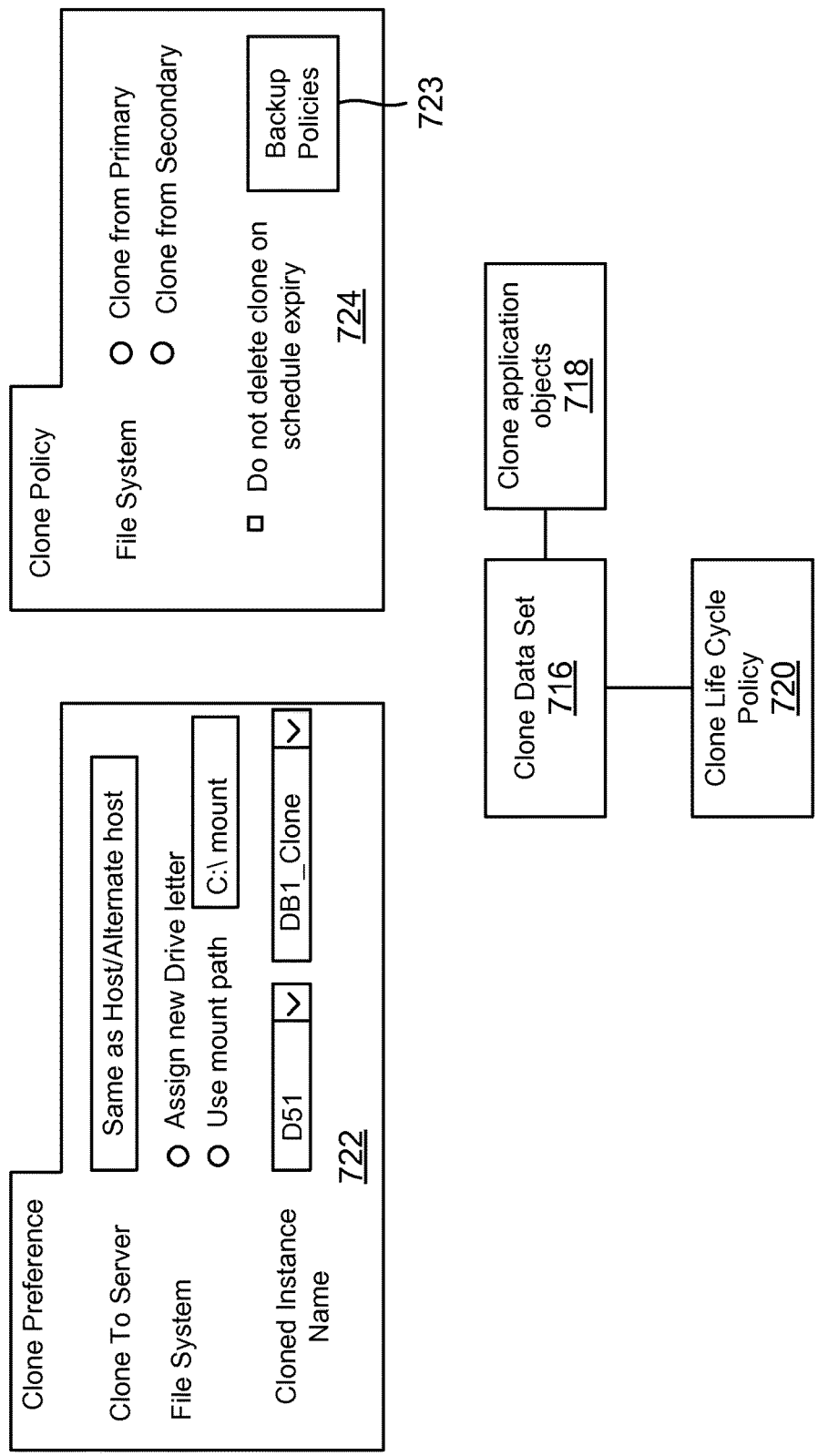
FIG. 7B shows an example of a clone object format used by the SMS, according to one aspect of the present disclosure.

FIG. 7B also shows an example of a clone dataset 716 that is associated with clone application objects 718 and stored at database 176. A clone policy object 720 is associated with the clone dataset 716. An example of the clone dataset with a clone preference 722 is also provided in FIG. 7B. An example of a clone policy 724 is also provided. In one aspect, the clone policy 724 is associated with a backup policy 723 that is described in more detail below. In another aspect, the backup policy is a part of the clone policy.

Figure 7C:
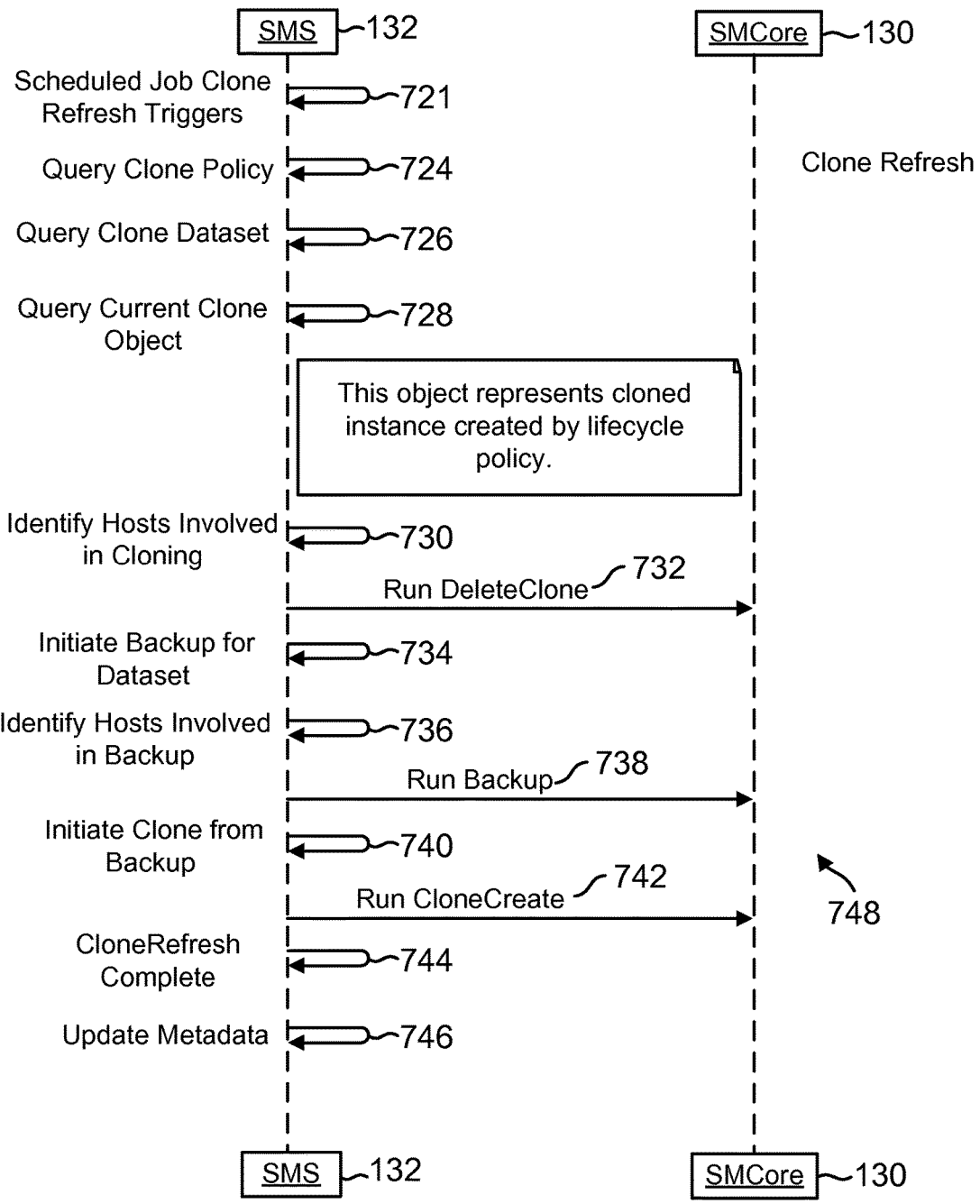
FIG. 7C shows a clone refresh process flow, according to one aspect of the present disclosure.

FIG. 7C shows an example of a process 748 to refresh a clone that is managed by SMS 132. The refresh process may be based on a schedule (721). When the refresh process is triggered, the cloning module 154 queries (724) the stored cloning policy in data structure 176. The dataset for the clone (726) and the latest clone object is queried as well (728). The hosts that are involved with the cloning is identified (730). Thereafter, the clone is deleted (730). The process for deleting the clone is described below with respect to FIG. 7F.

A backup for the dataset is then initiated (734) and the hosts that are identified in the backup are identified (736). Thereafter, the backup is run (738). The backup process has been described above with respect to FIGS. 5A-5C. The clone creation is initiated from the backup (740) and the clone is created (742). Thereafter the clone refresh process is completed (744) and the metadata associated with the refreshed clone is updated (746).

Figure 7D:
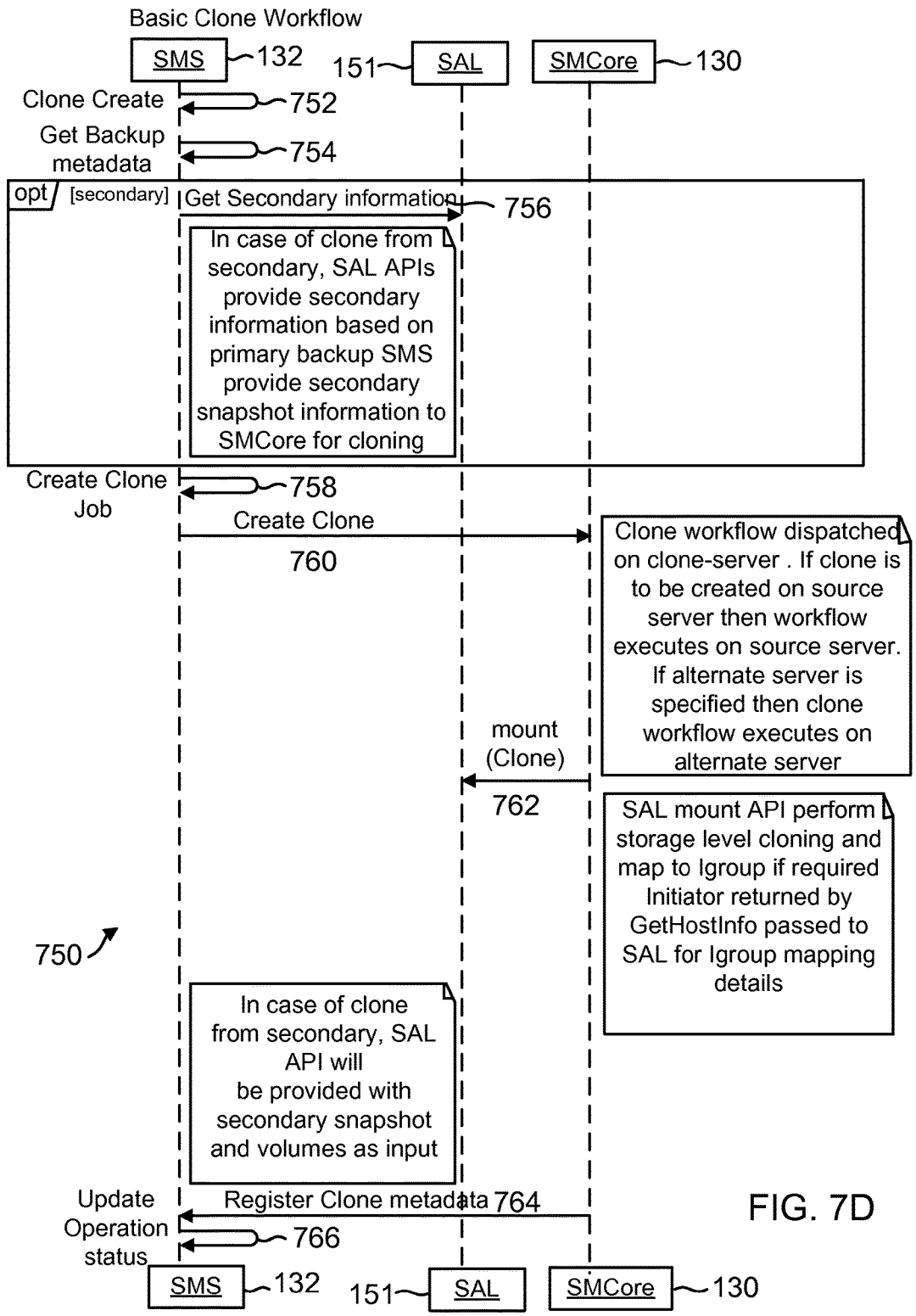
FIG. 7D shows a process flow for generating a clone, according to one aspect of the present disclosure.

FIG. 7D shows an example of a high-level cloning process flow 750 for cloning a snapshot of a stored object, including a storage volume, according to one aspect. The process begins during operation 752 and in operation 754, cloning module 154 of SMS 132 obtains the metadata regarding the backup that is being cloned. If the backup is from a secondary storage, then during operation 756, secondary backup information is obtained from SAL 151 that maintains all the storage resource information, as described above. A clone job is then created during operation 758. The job is uniquely identified and includes a backup identifier information.

The SMS 132 then requests clone creation to SMcore 130 during operation 760. The SMcore 130 co-ordinates the clone creation with storage system interface and the appropriate application plugins that are involved. It is noteworthy that at the storage system 120 level, the clone is created by the storage services module 122. The clone is mounted during operation 762. The metadata for the clone (similar to the backup metadata is registered during operation 764. The job status is updated during operation 766 and the process ends.

Figures 1, 7E:
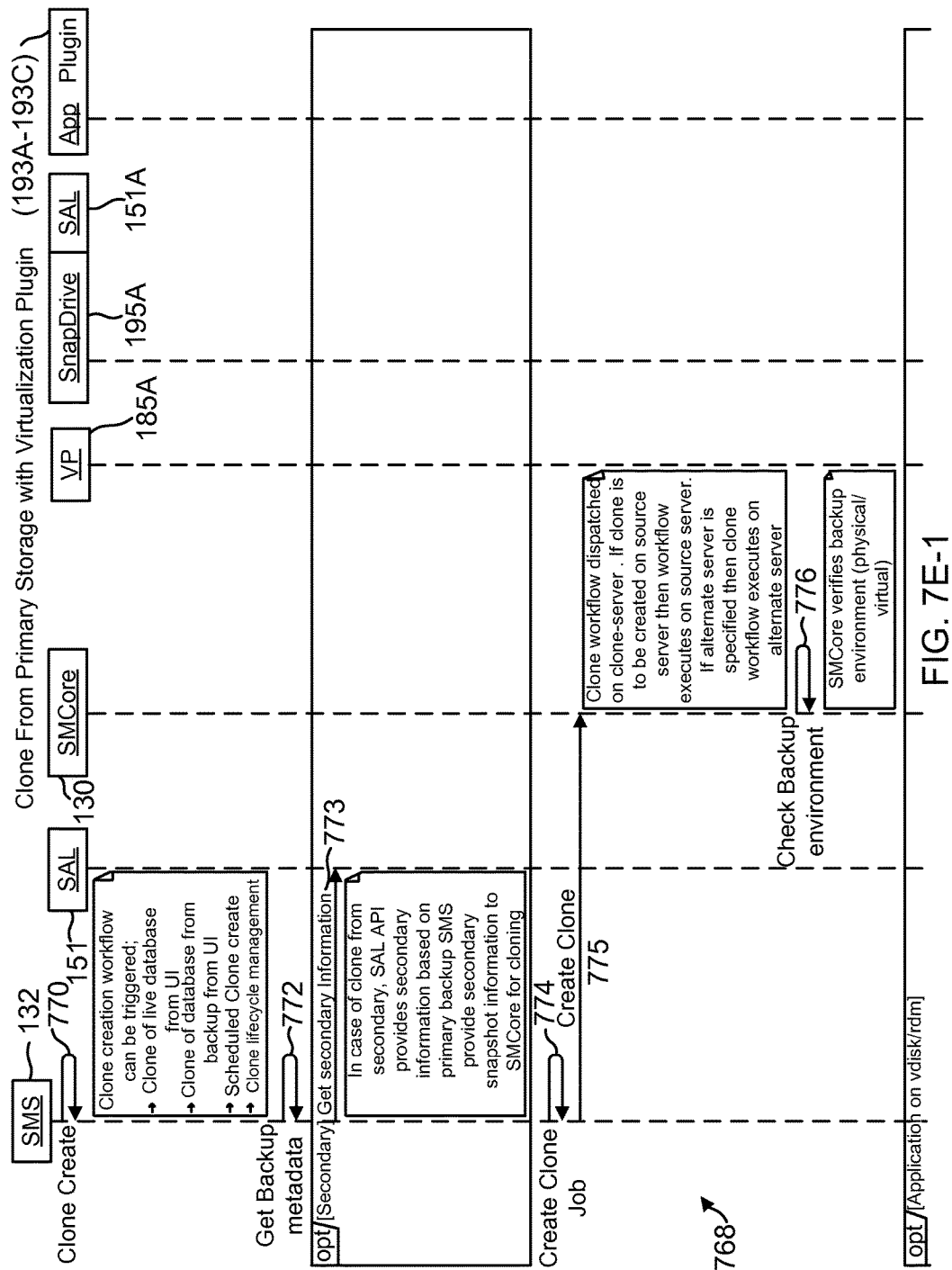
FIGS. 7E-1 to 7E-3 show a process flow for generating a clone from a primary storage using a virtualization plugin, according to one aspect of the present disclosure.
Figures 2, 7E:
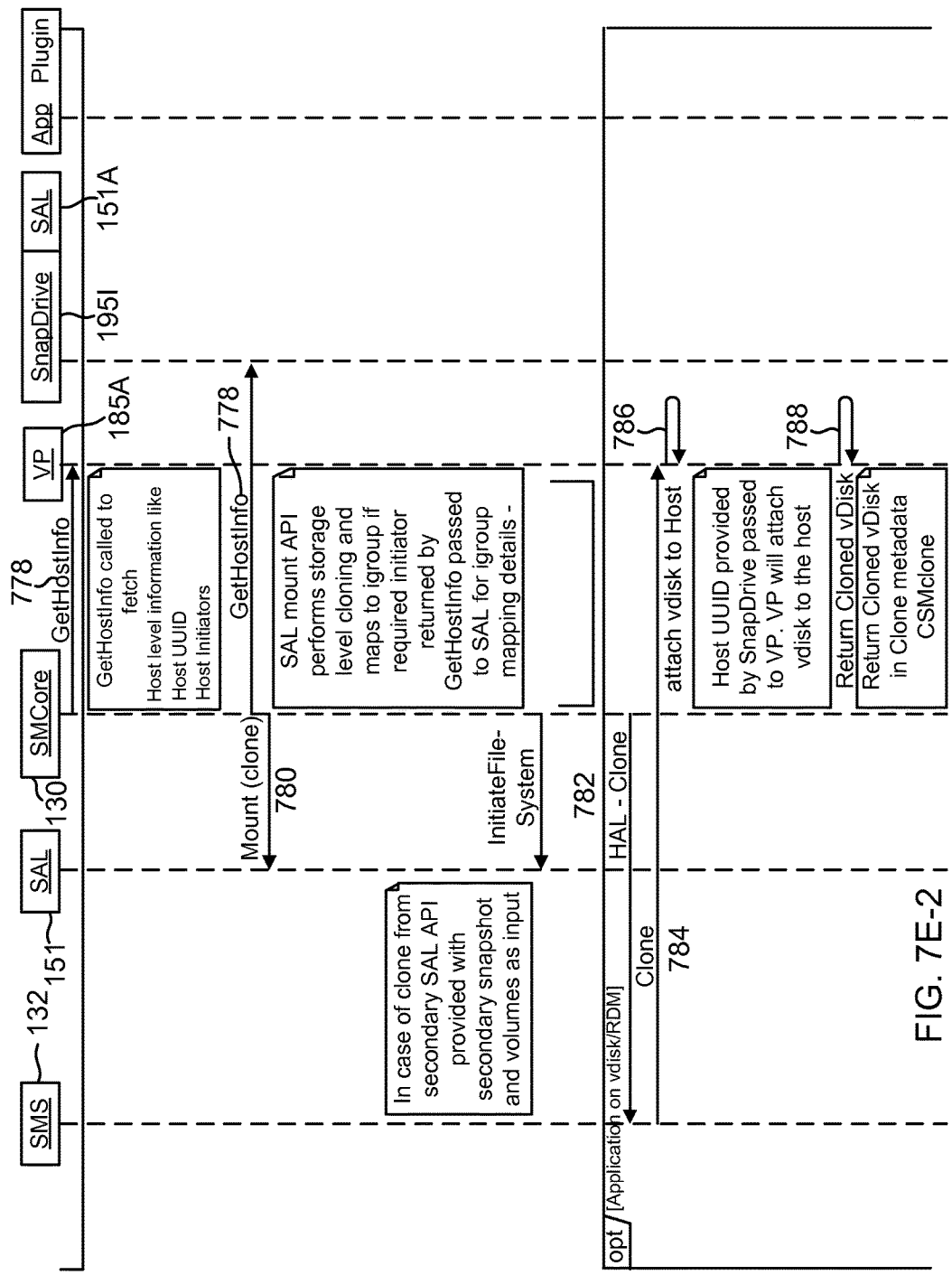
Figures 3, 7E:
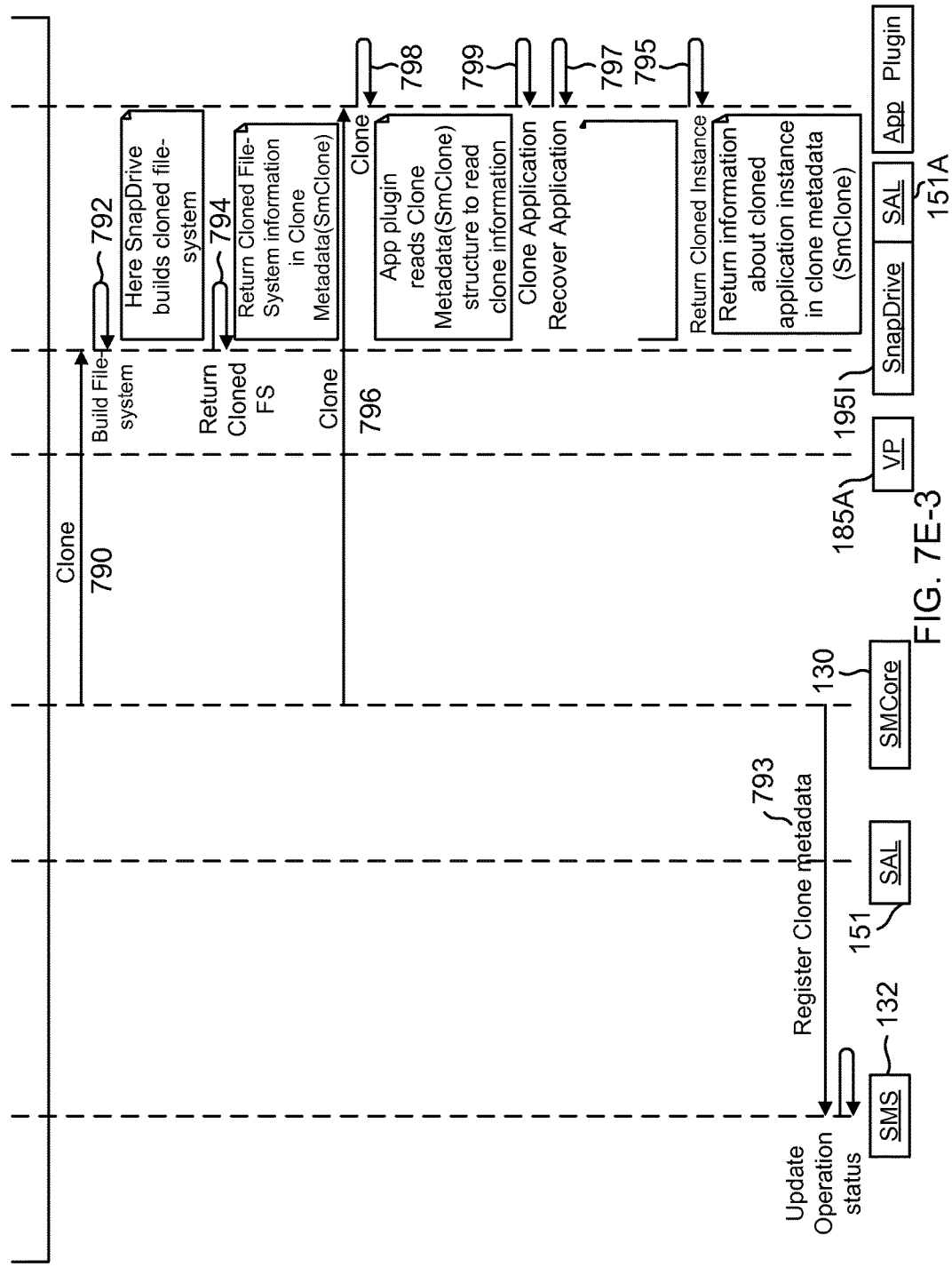

FIGS. 7E-1 to 7E-3 show an example of a clone workflow (or process flow) 768 when a virtualization plugin is used in a host system, according to one aspect. The process flow shows interaction between SMS 132, SAL 151, SMcore 130, SAL 151A, VP (virtual plugin) 185A, storage system interface (shown as SnapDrive) 195 (or the file system plugin 195A) and an application plugin (for example, 193A-193C). The cloning create operation 770 may be triggered for a live database, a clone of a database from a backup, as a scheduled operation or as part of clone lifecycle management. It is noteworthy that adaptive process is not limited to any particular reason for triggering the clone create operation.

SMS 132 obtains the backup metadata in operation 772. The backup metadata is stored as part of database 176 or any other data structure as described above in detail.

If cloning is based on secondary storage, then during operation 773, SMS 132 obtains the secondary storage information from SAL 151. SAL 151 provides secondary storage information based on a primary storage backup.

The job manager 182 then creates a clone job in operation 774. The job object stores the stored object identifier that is being cloned (for example, a database), the host system that manages the stored object and other information. This allows one to track the clone job via a GUI, as described below in detail.

During operation 776, the backup environment is verified by the SMcore 130 to ensure that the clone operation can be completed. During operation 778, host system information is obtained by the SMcore 130 from the virtual plugin 185A, as well as from the storage system interface 195 (or SAL 151A). The host information includes host identifiers (host UUID) and host initiator information. Thereafter, the file system is initialized during operation 782.

For a virtual environment, SMS 132 initiates a clone operation for the virtual plugin 185A shown as operation 784. The host identifier provided by the storage system interface is passed to the virtual plugin 185A and a vdisk is attached to the host in operation 786. The metadata for the clone is then returned during operation 788.

During operation 790, the clone operation begins when the file system is built during operation 792. In one aspect, the storage system interface (or SnapDrive) 195 builds the file system. The cloned metadata is returned to SMcore 130 during operation 794. The application plugin then reads the metadata and the application may be cloned during operation 798/799 and the application may be recovered during 797. The cloned instance is then returned during operation 795 to the SMcore 130.

Figure 7F:
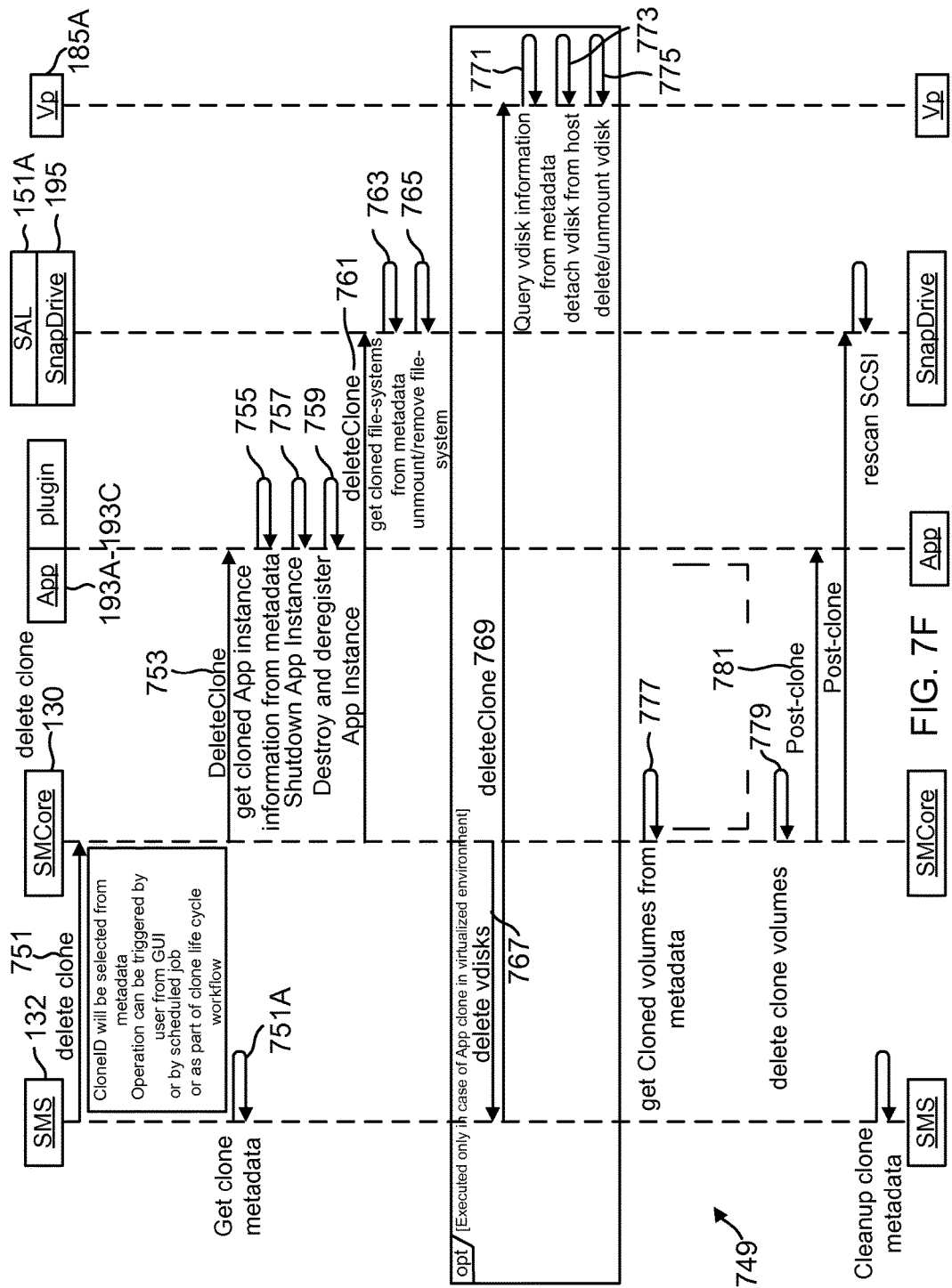
FIG. 7F shows a process flow for deleting a clone, according to one aspect of the present disclosure.

FIG. 7F shows a clone delete process flow 749, according to one aspect of the present disclosure. The clone delete operation involves SMS 132, SMcore 130, the application plugins, storage system interface 195 and virtual plugin 185A.

The process begins by cloning module 154 obtaining the clone metadata during operation 751A and then requesting SMcore 130 to delete the clone in operation 751. The delete operation may be triggered by a user via a GUI, by a scheduled job or as part of clone life cycle management. The clone metadata is similar to backup metadata described above in detail. The CloneId is selected from the metadata and provided to the SMcore 130.

The SMcore 130 that interfaces with various application plugins issues a delete clone command in block 753. The application that manages the clone obtains the cloned application instance information from the clone metadata during operation 755. The cloned application instance is then shut down during 757. The application instance is first deleted and de-registered by the host operating system in 759. The SMcore layer 130 then sends a delete clone request (761) to the storage system interface 195. Using the metadata, the storage system interface 195 obtains the file-system from the storage system 120. The file system is removed in operation 765.

In a virtualized environment, the SMcore 130 requests SMS 130 to delete vdisks (767). The SMS 132 then issues a delete clone request (769) to the virtual plugin 185A. The virtual plugin obtains the virtual disk information from the metadata (771), detaches the vdisk from the host (773) and delete or unmounts the vdisk so that it cannot be used (775).

The SMcore 130 obtains information regarding the cloned volumes and the cloned volumes are deleted (779). The SMcore 130 then issues a post-clone request (781) to the application plugin and the storage system interface 195. The clone metadata is then cleaned up and the process ends.

As described above, SMS 132, SAL 151, SAL 151A and other modules of SMcore 130 are able to efficiently clone backups for different applications from a single management application. Regardless of how the applications handle or manage data, because SMS 132 and SMcore 130 communicate in the manner described above, the system is able to handle cloning and clone life cycle management for a plurality of applications and application objects.

GUI Examples: In one aspect, GUI module 142 provides an integrated GUI as well as plugin specific GUIs. Backup, restore and cloning is managed from a single pane, regardless of allocation and/or plugin type that is being used at a host system. At a high level, the SMS 132 based GUI provides basic administration and settings for the host systems and the storage system, plugin lifecycle management, an inventory view of plugin objects, policy management across multiple plugins, dataset management, backup listing and management, restore operations, reporting and a job manager for displaying job details. It is noteworthy that the GUI provided by SMS 132 may also include plugin GUI enhancements, for example, plugin specific inventory views (for example, shares, databases and others), policy enhancements/additions, dataset enhancements from a plugin's perspective as well as backup and restore operation requirements.

Figure 8A:
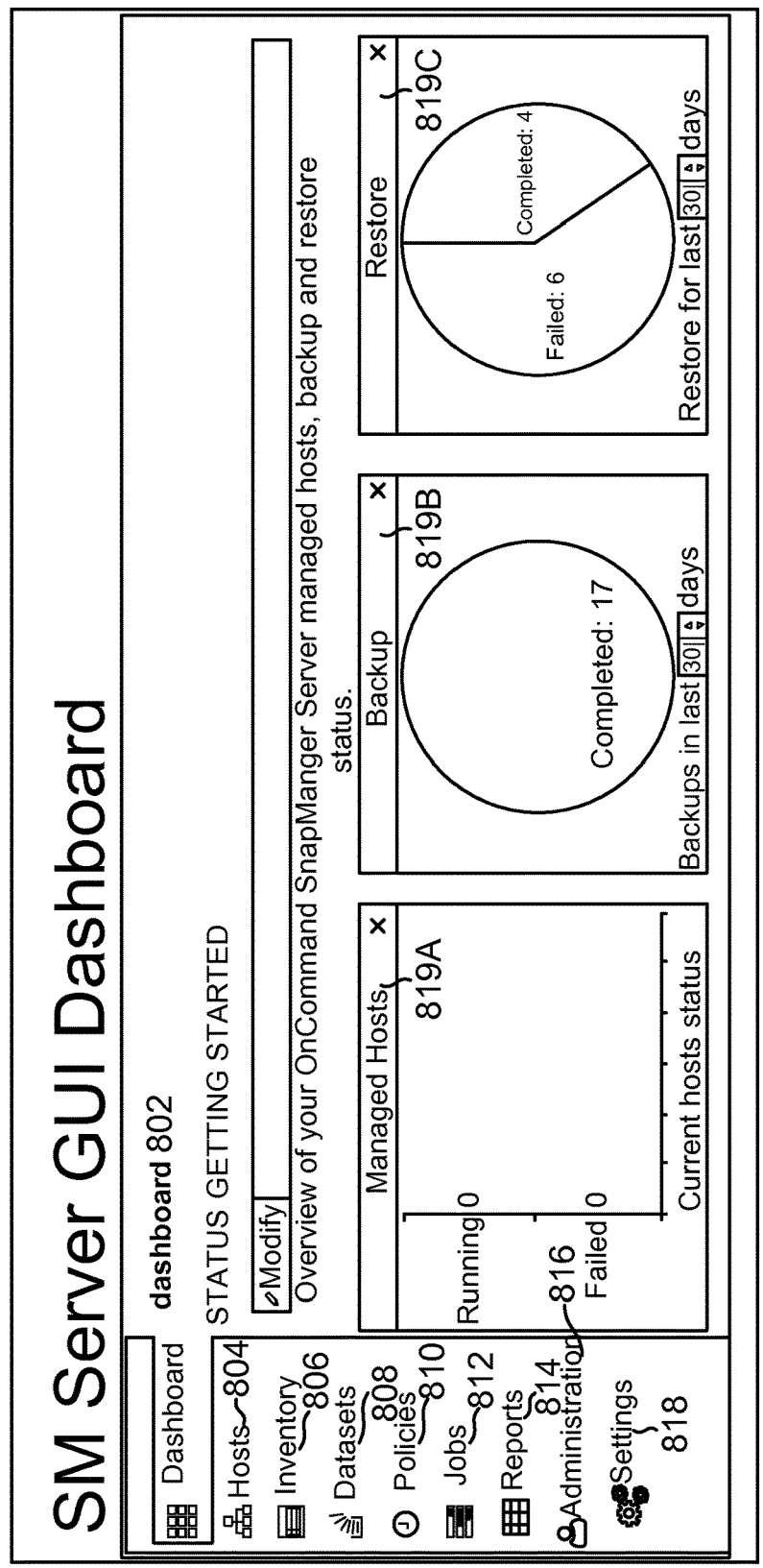
FIG. 8A shows an example of a GUI dashboard, according to one aspect of the present disclosure.
Figure 8D:
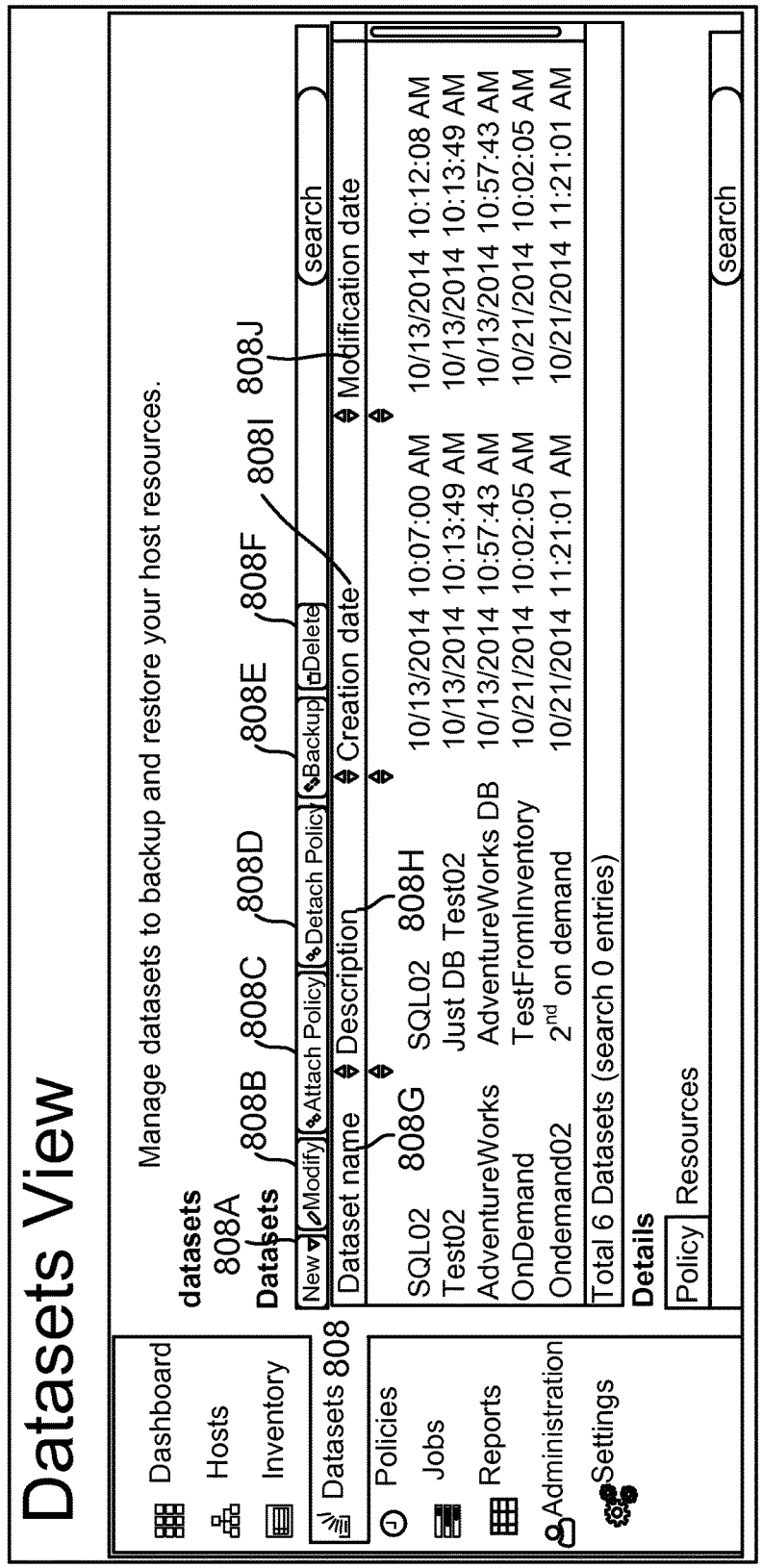
FIG. 8D shows an example of a dataset view provided by the SMS, according to one aspect of the present disclosure.
Figure 8E:
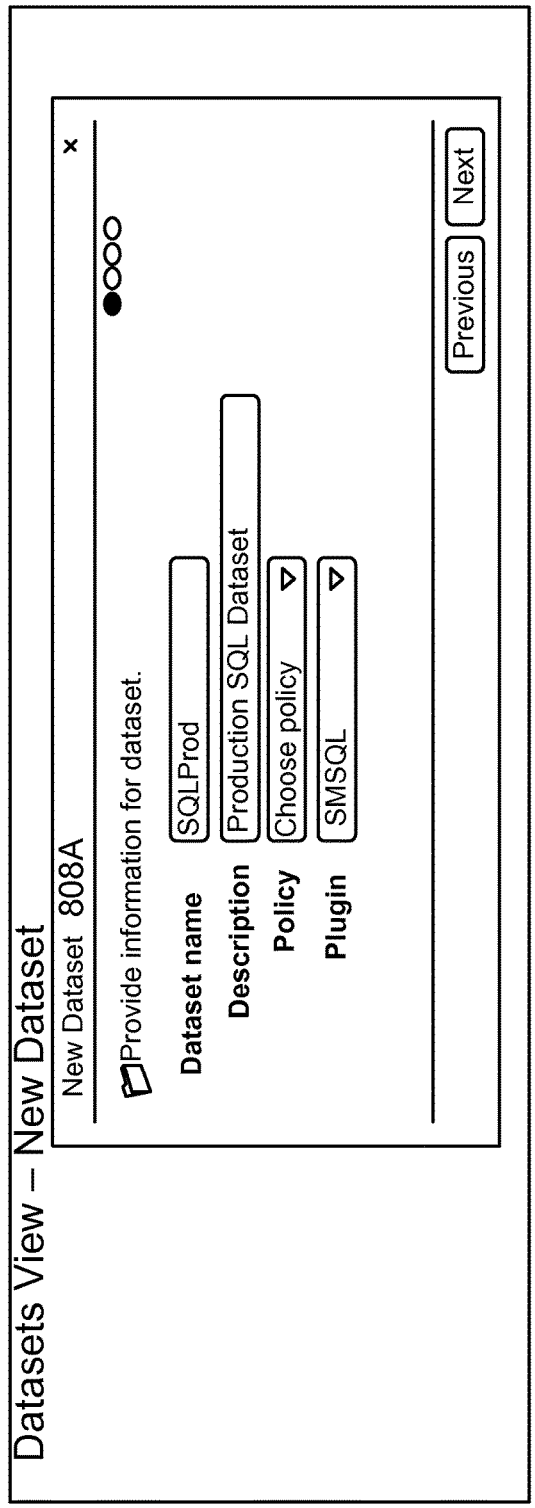
FIG. 8E shows an example of a GUI screenshot for adding a new dataset, according to one aspect of the present disclosure.
Figure 8F:
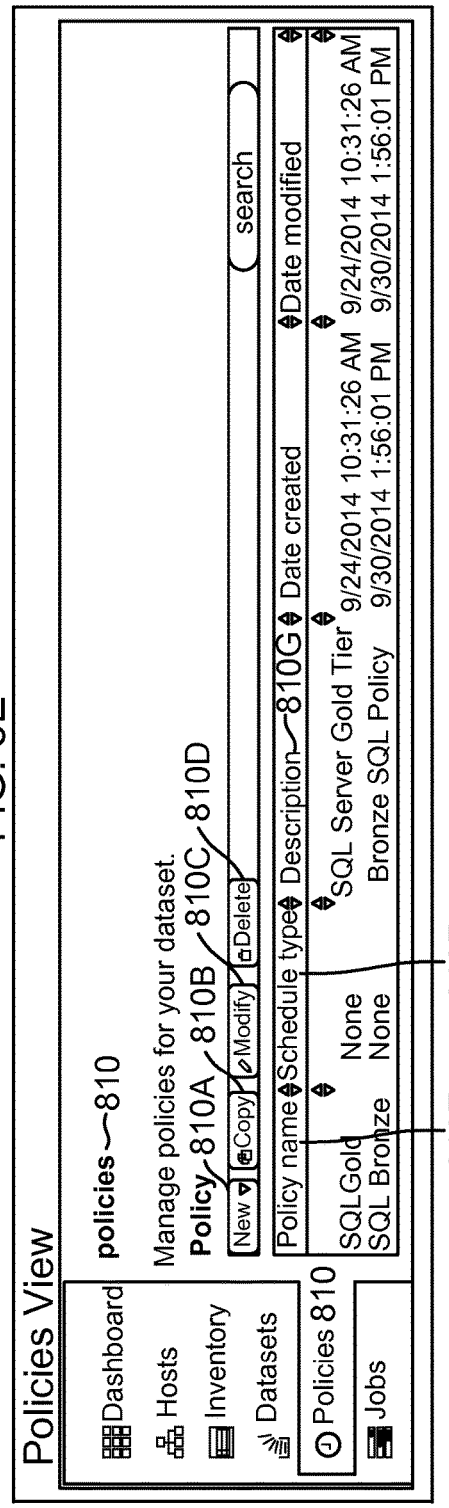
FIG. 8F shows an example of a GUI screenshot showing a policy object, according to one aspect of the present disclosure.
Figure 8G:
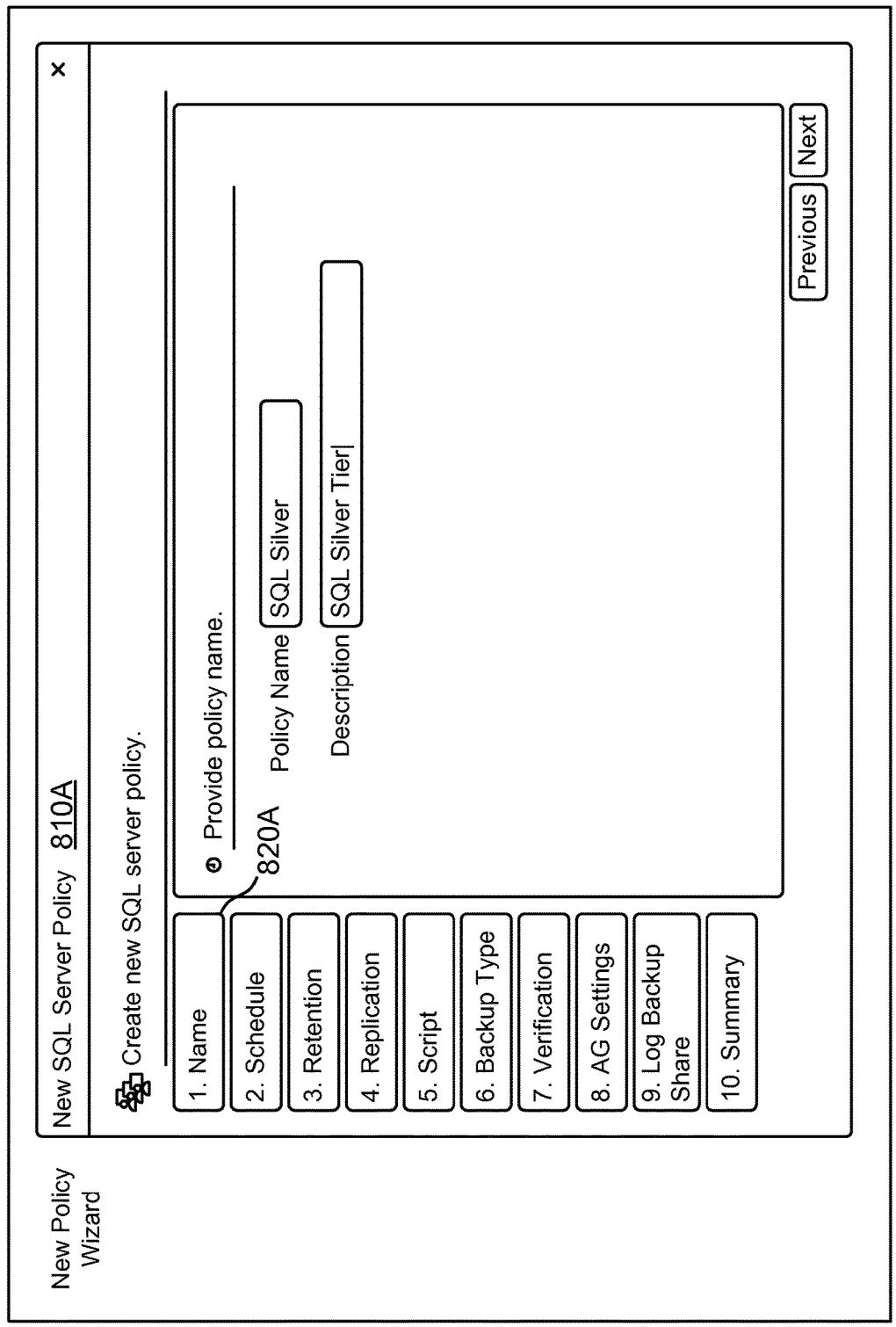
FIG. 8G shows an example of a GUI screenshot for adding a new policy object, according to one aspect of the present disclosure.
Figure 8H:
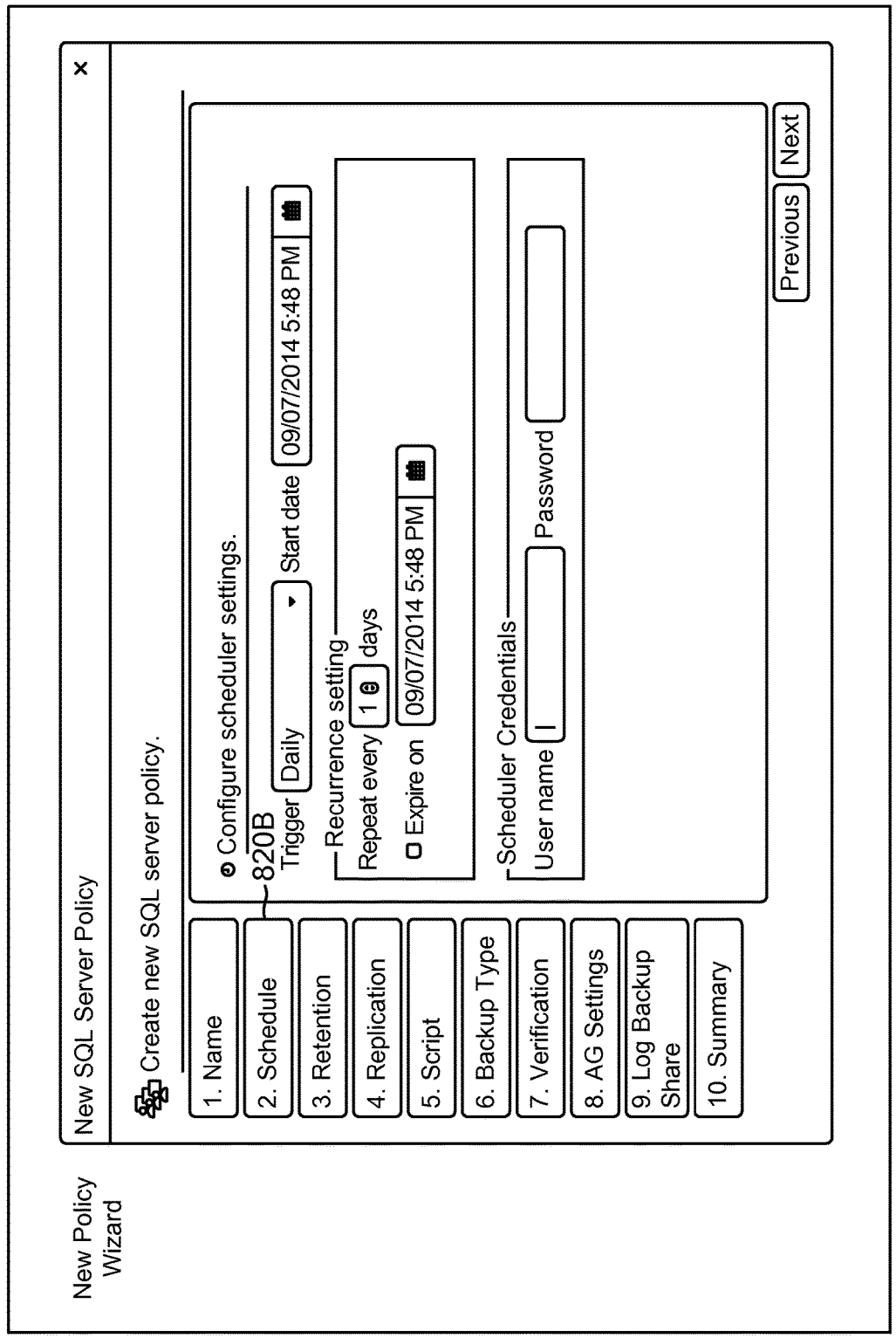
FIG. 8H shows an example of a GUI screenshot for adding a schedule for the new policy object of FIG. 8G, according to one aspect of the present disclosure.
Figure 8I:
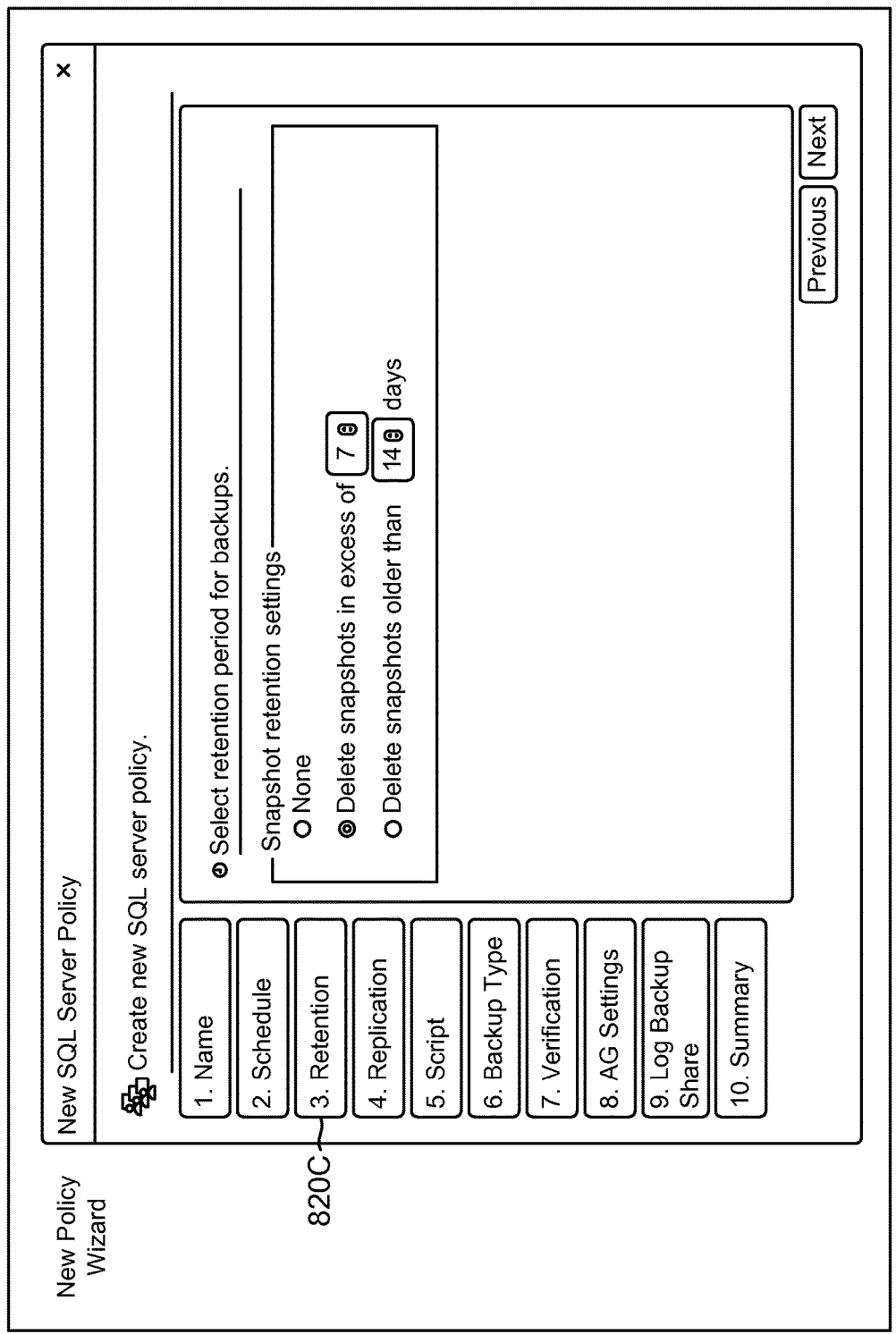
FIG. 8I shows an example of a GUI screenshot for adding a retention policy for the new policy object of FIG. 8G, according to one aspect of the present disclosure.
Figure 8J:
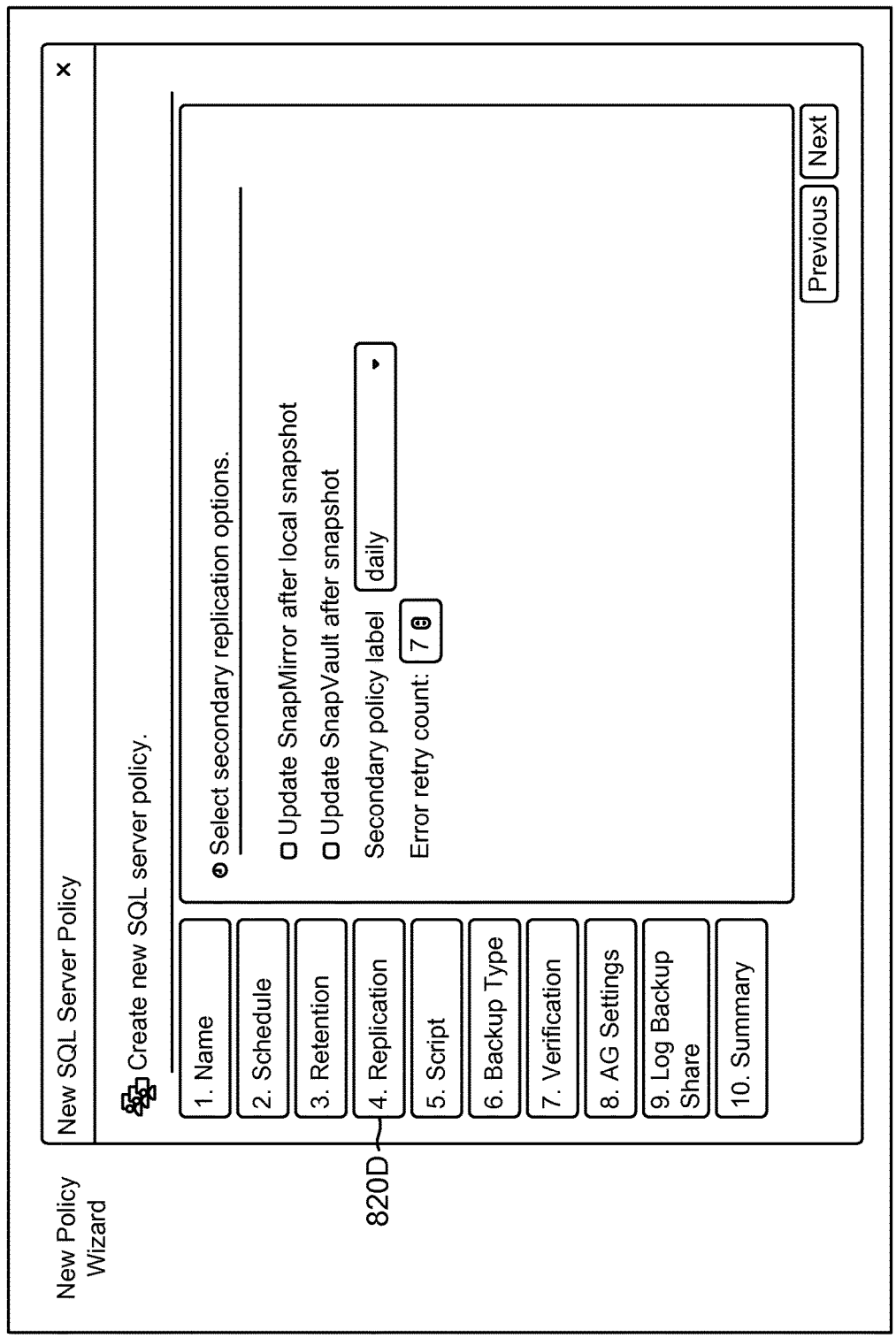
FIG. 8J shows an example of a GUI screenshot for adding a replication policy for the new policy object of FIG. 8G, according to one aspect of the present disclosure.
Figure 8K:
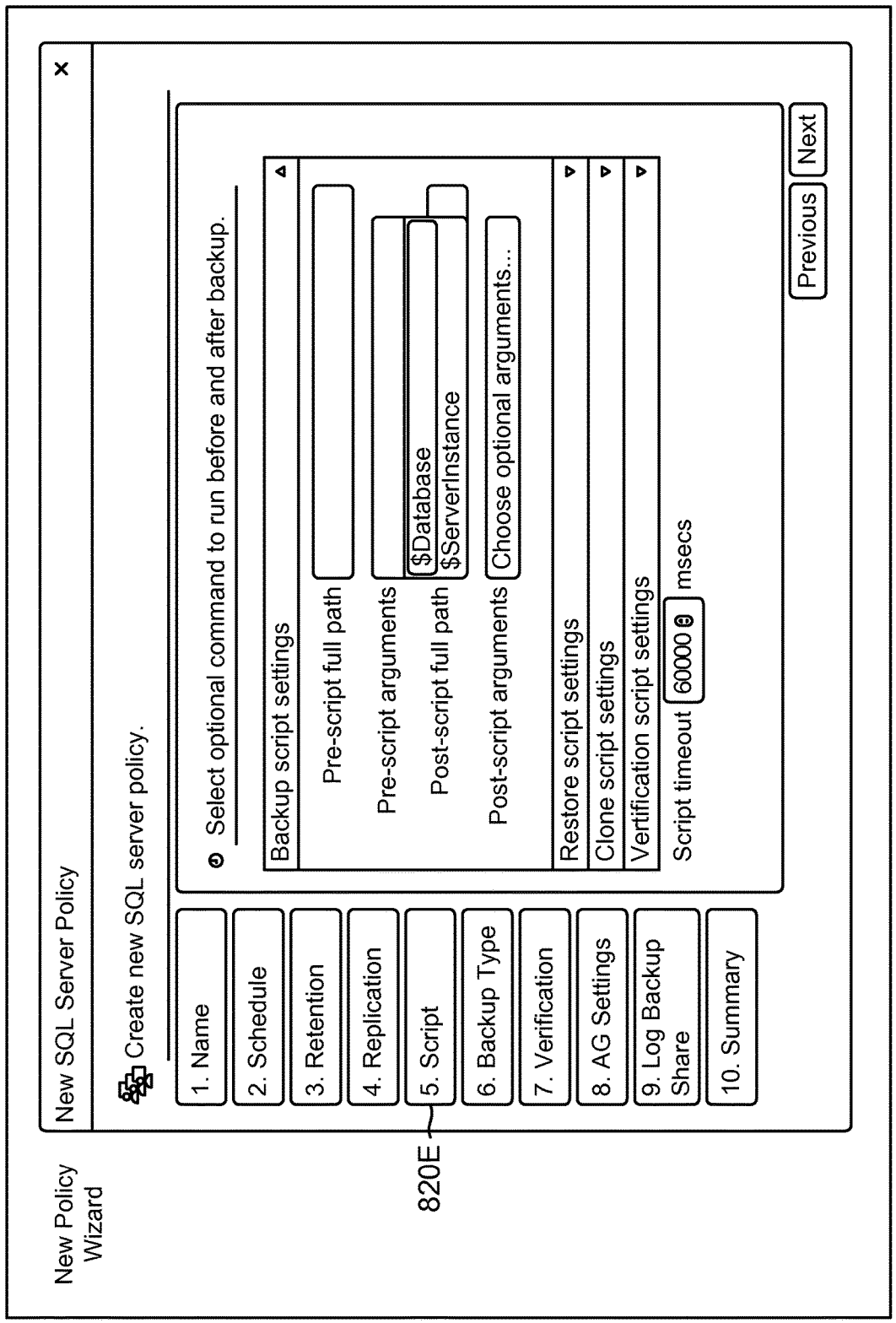
FIG. 8K shows an example of a GUI screenshot for adding a script for the new policy object of FIG. 8G, according to one aspect of the present disclosure.
Figure 8L:
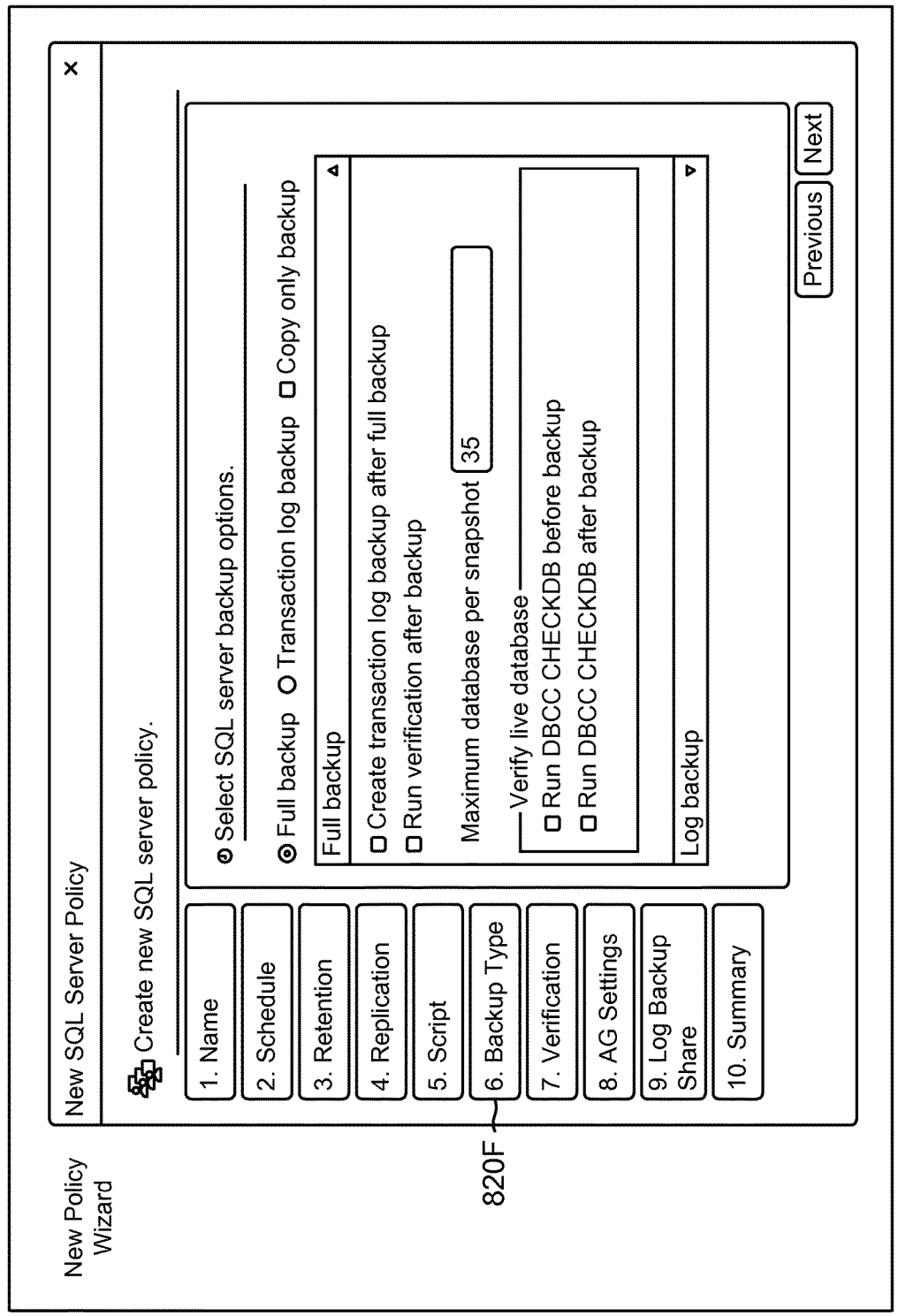
FIG. 8L shows an example of a GUI screenshot for adding a backup type for the new policy object of FIG. 8G, according to one aspect of the present disclosure.
Figure 8M:
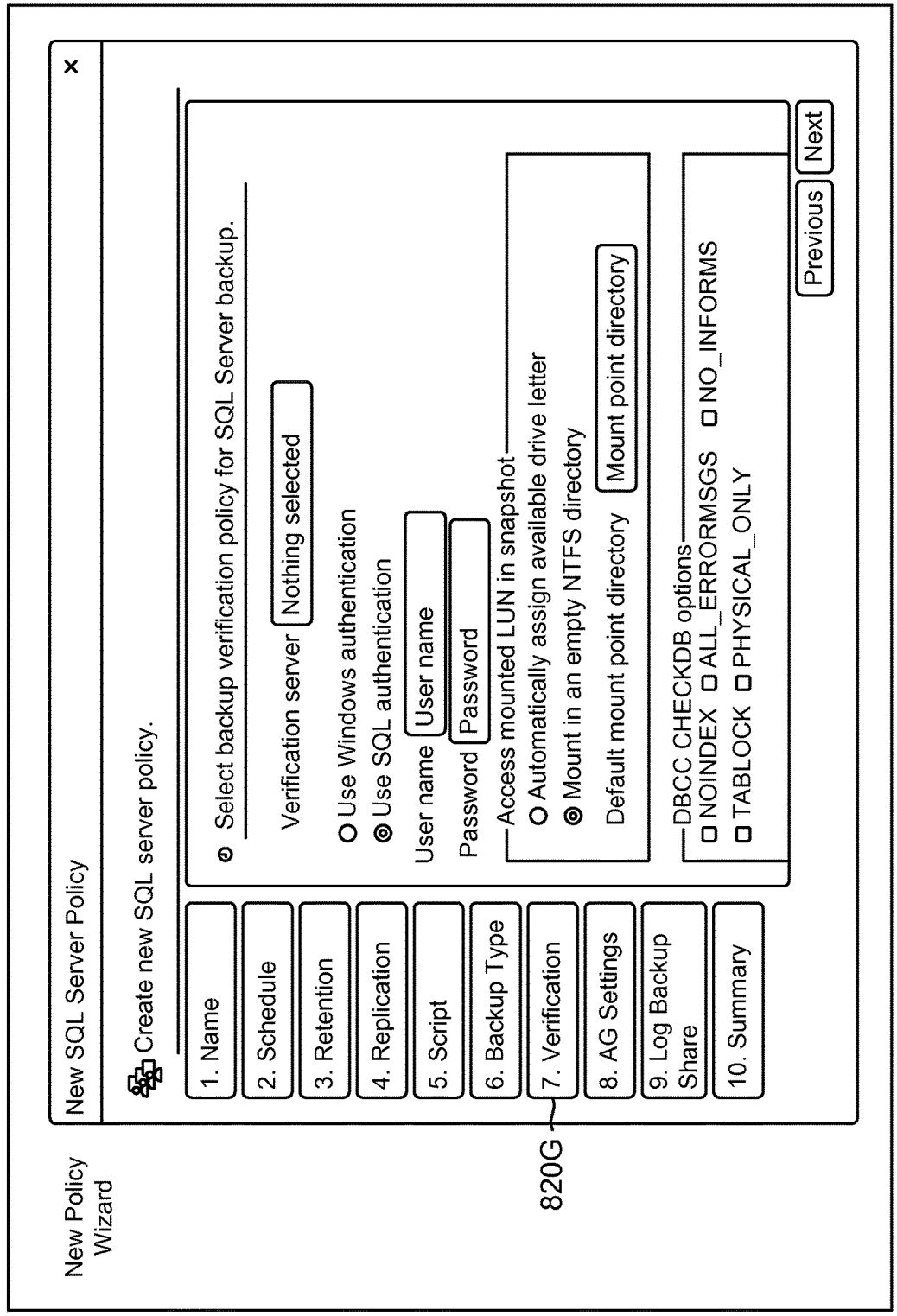
FIG. 8M shows an example of a GUI screenshot for adding a verification type for the new policy object of FIG. 8G, according to one aspect of the present disclosure.
Figure 8N:
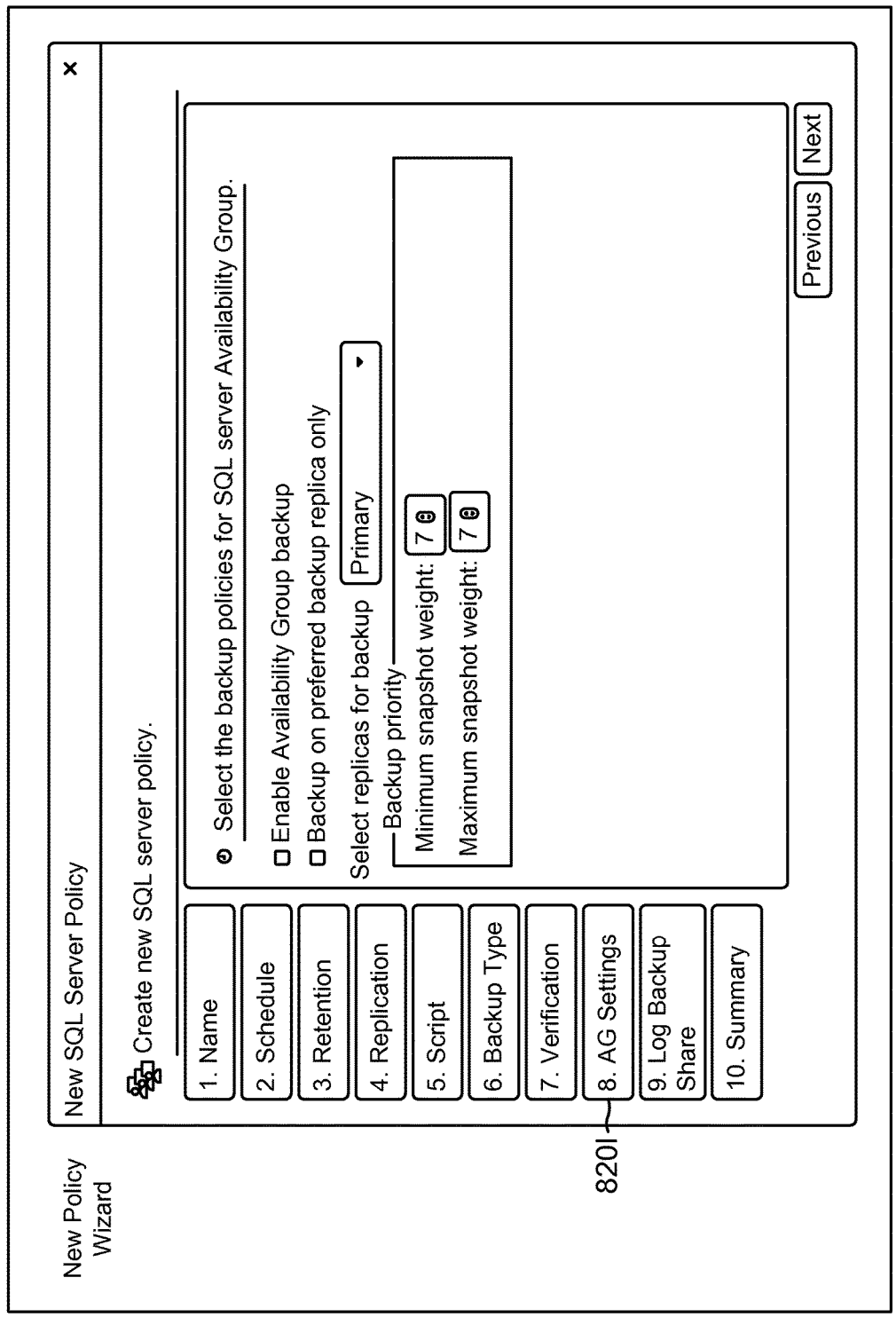
FIG. 8N shows an example of a GUI screenshot for adding an availability group for the new policy object of FIG. 8G, according to one aspect of the present disclosure.
Figure 8O:
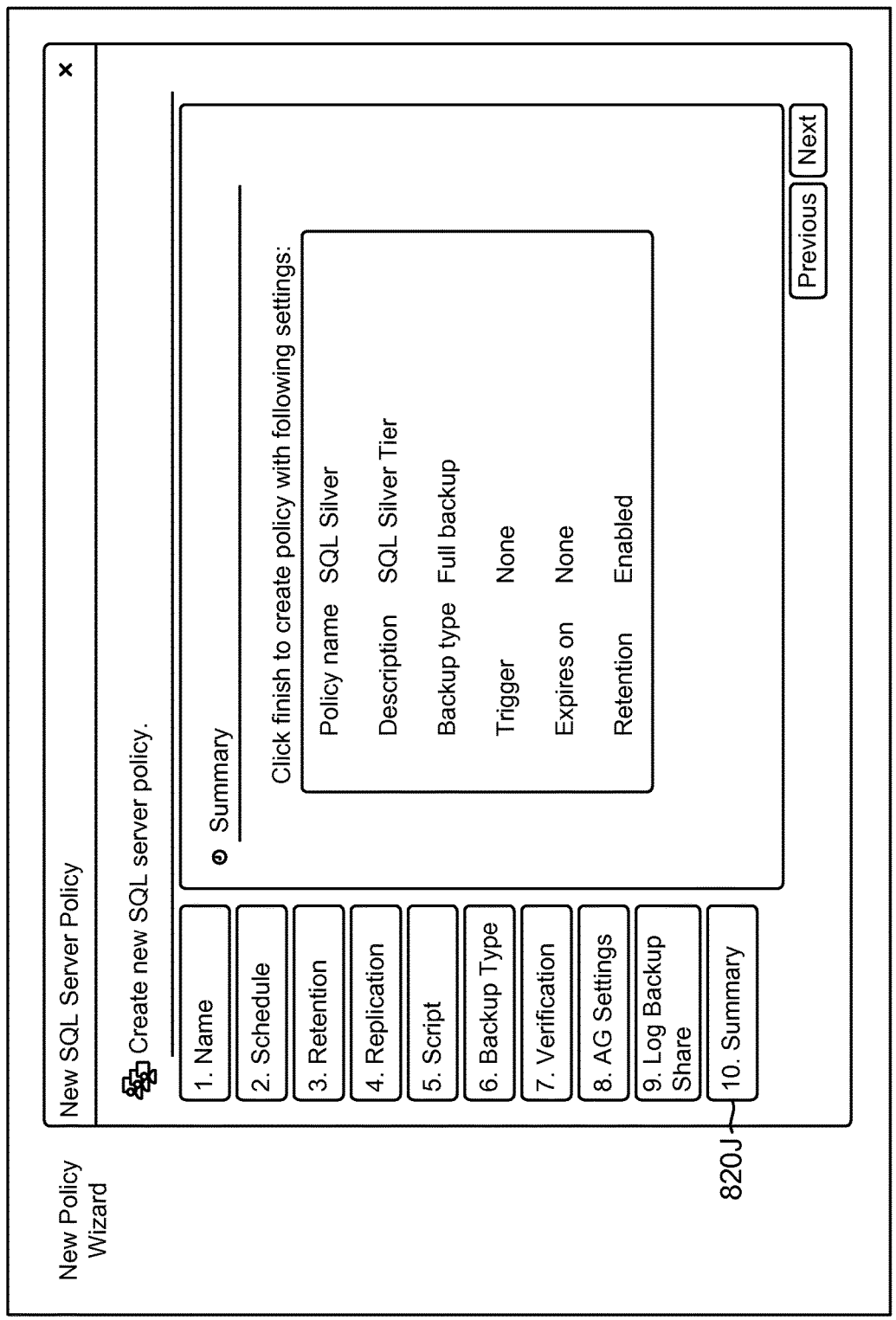
FIG. 8O shows an example of a GUI screenshot showing a summary for the new policy object of FIG. 8G, according to one aspect of the present disclosure.
Figure 8P:
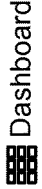
FIG. 8P shows an example of a GUI screenshot showing various jobs that are managed by the SMS, according to one aspect of the present disclosure.
Figure 8Q:
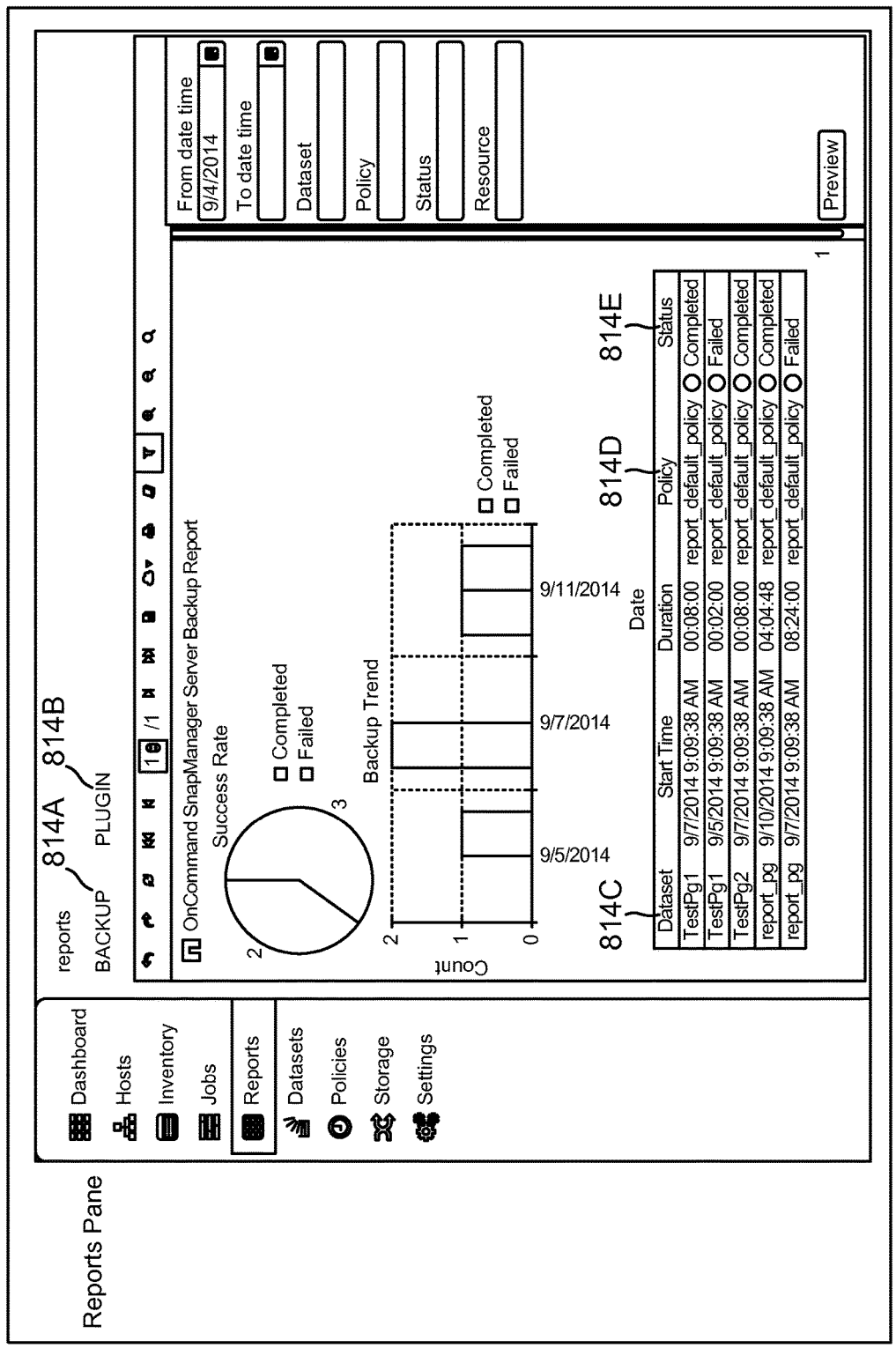
FIG. 8Q shows an example of a GUI screenshot of a reports pane provided by the SMS, according to one aspect of the present disclosure.
Figure 8T:
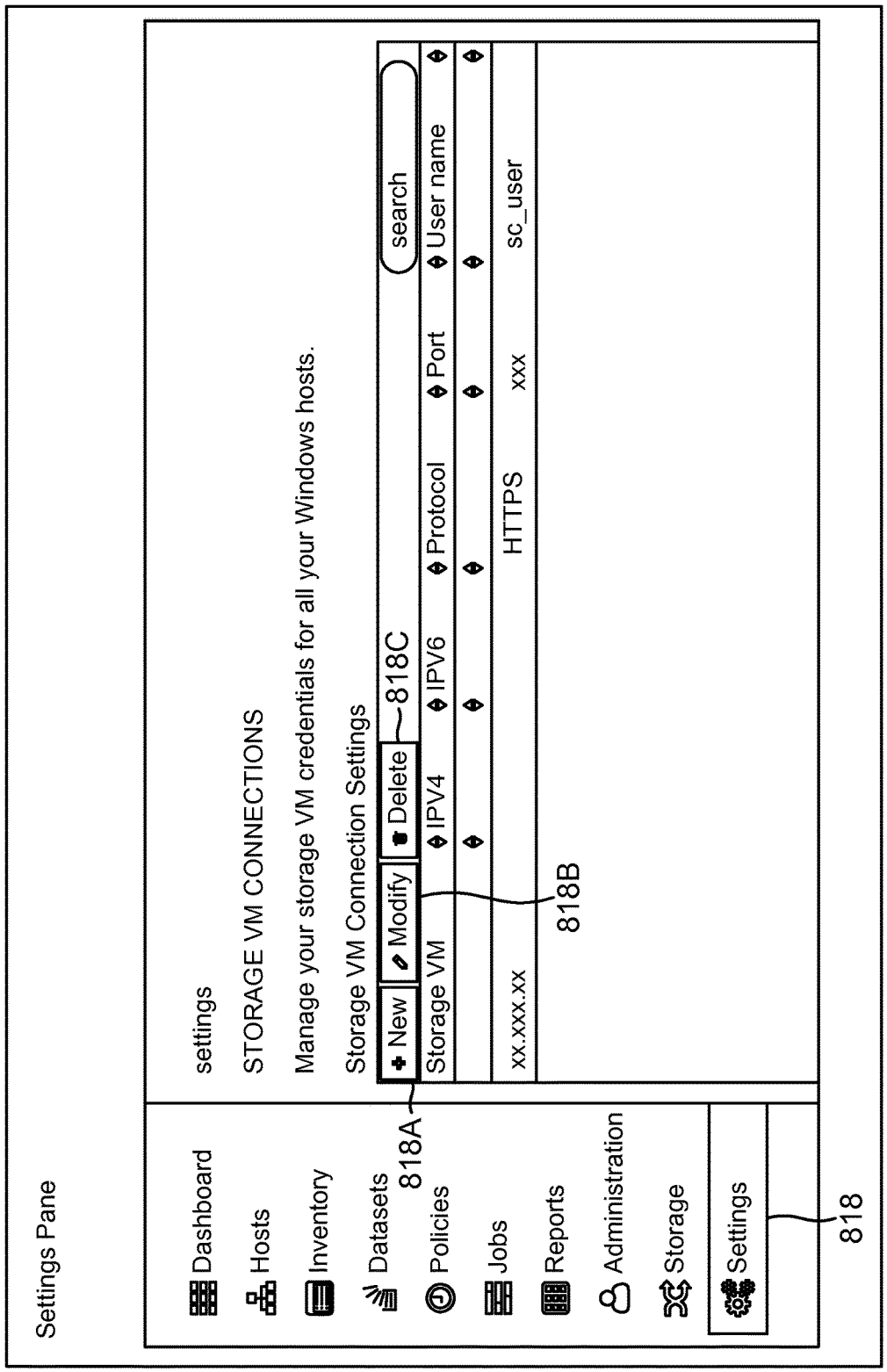
FIG. 8T shows an example of a settings GUI screenshot provided by the SMS, according to one aspect of the present disclosure.

FIGS. 8A-8T show examples of managing various storage service related operations through a GUI that may be provided by GUI module 142 of SMS 132, according to one aspect. The various screenshots are meant to be an example of the various adaptive aspects disclosed herein and are not intended to limit the scope of the present disclosure.

FIG. 8A shows a high-level GUI dashboard that may be displayed on a display device of a user using SMS 132 to manage an environment described above with respect to FIGS. 1A and 1E. The left hand side navigation bar allows navigation to different views. It is noteworthy that the dashboard panel is configurable and plugins can add custom dashboards. A user is also able to customize the dashboard view based on their preferences.

The dashboard 802 provides various selectable options or tabs, for example, hosts 804, an inventory view option 806, datasets 808, policies 810, jobs 812, reports 814, administration 816 and settings 818. In one aspect, the GUI views are customized for users and their associated roles that are maintained by the RBAC module 156.

The dashboard view shows different host systems that a user may be managing (819A), a consolidated view for the backups that may have been taken (819B) and restore view status (819C). Dashboard 802 provides a high level view that can be modified by using the "modify" option. The various views are based on database 176 maintained by SMS 132 for storing information regarding various hosts, as described above in detail.

FIG. 8B shows an example of a host system view when a user selects the host tab 804. The various displays are based on database 176 that are maintained by the SM module 134. The host system view allows a user to add any host using the add host option (804A) or remove a host using the "remove host" option (804B). The user can also view the details regarding each host, including the host name, operating system, if it is a part of a cluster and a port that is used to connect to the host.

Selectable options (or tabs) 804C, 804D, 804E, 804F and 804G provide other host related information. For example, 804C provides information regarding the various storage disks for a host. From this option, disks may be added or removed. CIFS share (storage objects) may be viewed and modified using tab 804D. Storage volume information is obtained from tab 804E which includes volume type, volume identifier, volume size and other details.

Initiator group (igroup) information may be obtained or modified using tab 804F. Tab 804F allows a user to add or delete members of the igroup from the same GUI. iSCSI session information may be obtained using tab 804G. iSCSI sessions are established to read or write data. iSCSI allows a host to send SCSI commands over TCP/IP. The host system view also allows a user to manage plugins by using tab 804H. The user is able to see all the plugins that are installed. If a plugin is needed then one can add that using tab 804H.

FIG. 8C provides an inventory view to a user using a GUI to manage the system 100 of FIG. 1A. The inventory view provides various options, including adding a dataset using tab 806A, performing an on demand backup using tab 806B, a restore operation using tab 806C, a refresh operation for clone life cycle management using tab 806D, and deleting a backup using tab 806E. The inventory view provides name of stored objects (for example, databases) under column 806F, the hosts that are managing the stored objects (column 806G), the owner of the database (column 806H), whether the database is a system database (806I), if the database is selectable by the user (806J), if a dataset is associated with the database (806K), if a policy is associated with the database (806L), the last backup (806M) and the status of the last backup.

In one aspect, the inventory view may be customized to adapt to user roles. For example, if a user is not permitted to take a backup on demand, then the user is not shown tab 806B.

The dataset view is shown in FIG. 8D. This screen allows the user to manage datasets from a single screen. The user may add a new dataset (808A), modify it (808B), attach a policy (808C), detach a policy (808D), backup dataset (808E) and delete the dataset (808F). The list of datasets and their creation and modification dates are shown in columns 808G, 808H, 808I and 808J, respectively. In one aspect, the dataset view may also be customized to adapt to user roles.

FIG. 8E shows how a new dataset is added using tab 808A. The user is allowed to name the dataset, describe it, associate a policy and associate a plugin. This format of the dataset allows SMS 132 to manage backups and other operations in a heterogeneous environment, regardless of format or application type.

FIG. 8F provides a policies view, according to one aspect of the present disclosure. This screen allows an authorized user to manage policies for different stored objects managed by different applications at different hosts. A new policy may be added using tab 810A. A policy may be copied using tab 810B, modified using tab 810C and deleted using tab 810D.

Details of a policy may be obtained by clicking on the policy. The details include a policy name (810E), schedule type (810F), description (810G), the date the policy is created and modified.

FIGS. 8G-8Q show various screen shots of a new policy wizard that allows an authorized user to create a policy. FIG. 8G shows where a user has selected tab 820A to name and describe a policy. FIG. 8H shows the use of tab 820B, where a schedule is associated with the policy. The schedule includes recurrence settings and credentials of a user. FIG. 8I, allows a user to specify a retention schedule using tab 820C. The user may specify a number of snapshots after which snapshots are deleted or a number of days.

FIG. 8J shows a screenshot that enables a user to replicate a backup from a first storage system (primary) to another storage system (secondary) using tab 820D. The replication process may use SnapMirror technology provided by NetApp Inc. or any other methodology. FIG. 8K shows a screen shot that allows a user to add a script to the policy using tab 820E. The backup scripts options are shown in FIG. 8K and are self-explanatory.

FIG. 8L enables a user to specify a backup type using tab 820F. The backup may be a full backup or a log backup. This option also allows a user to setup verification settings for a backup.

FIG. 8M enables a user to setup verification options using tab 820G. The verification settings include the type of authentication that may be needed (for example, SQL, Windows or others). The user may specific a user name and password for the verification.

FIG. 8N shows a screen shot for specifying availability group backup using tab 820I. An availability group is used to provide reliability and redundancy, in case a primary system fails. The various options in FIG. 8N are self-explanatory.

FIG. 8O shows a summary for the policy using tab 820J. The summary provides the policy name, description, backup type, triggers if any, expiration and retention.

FIG. 8P shows a job view (or pane), according to one aspect. The job view is based on the job objects managed by the job manager 182. In one aspect, all job information, regardless of application, database or stored object is maintained in the same format. This allows the user to review the status of any job, regardless of the plugin, application or host operating environment. A user may filter the jobs using the filter tab 812A. The filter tab allows the user to search for any job using a job identifier or other parameters.

FIG. 8Q shows a reports pane (view), according to one aspect. The report pane is presented by the reports module 172 of SM module 134 in conjunction with the GUI module. The reports module 172 uses database 176 to generate various reports that are presented within the reports pane based on user roles. As an example, the reports pane presents the status of all backup jobs, including job status, start time, end time and duration. The reports pane also provides restore status, if any for all backups. The reports pane also provides plugin specific report for any given plugin on a host system, as described below in detail.

In one aspect, a report is generated based on a request/response structure of FIG. 2A that is presented to or executed by the reports module 172, for example, a "createbackupreport" request gathers data for backups, "createrecoveryreport" request gathers information on restore operations, "createpluginreport" request gathers host plugin specific backup data and "Createsummaryreport" request gathers job summary data for a given day.

A createbackupreport request may specify a backupID, a time range, backup name, status, policy name, dataset name, resource name and a job identifier. The response is a list of backup reports based on the search criteria. The search criteria may be different for different plugins.

An example of a backup report includes an ID of a backup operation, job ID, protection group ID, policy ID, start and end time, protection group name and policy name.

A user may also generate detailed reports, for example, a list of objects that were successfully backed up, list of objects that failed backups, backup type, list of snapshots for an object that was backed up and other details.

A user is also able to obtain details about restore operations, for example, restore operations that occurred before or after a certain time and an ID of a restore job.

For a createpluginreport, the request may specify the name of a host, a dataset, plugin type, day count and a terse i.e. restrict the amount of data returned. The response provides a total number of backups for the plugin, number of backups older than day counts, number of protected objects, number of unprotected objects, number of objects with failed backups, number of objects with backups that are not protected to secondary storage, total number of objects, the objects that are not backed up, objects that are not part of a dataset and other information.

Referring back to FIG. 8Q, an authorized user may use the backup tab 814A to obtain information on backups. The GUI presents a summary of backups indicating how many backups were successful and how many failed. The GUI also shows a backup trend for completion and failure. A user may also view the backup status (814E) as it pertains to a dataset (814C) and an associated policy (814D). SMS 132 is able to present these reports because it manages applications/stored objects in a platform/application independent format.

FIG. 8R shows a plugin report that a user can view using tab 814B, according to one aspect. The plugin report provides an overview (814F) for a particular plugin, for example, SQL. The user can see the total backups that are associated with the plugins, the number of failed backups, unprotected databases and databases with unarchived backups. The overview enables a user to take preventive measures to protect databases. The protection status may be viewed as shown in 814G. Details of unprotected databases are shown in segment 814H and databases with failed backups are shown in segment 814I.

The administrative pane is shown in FIG. 8S. This allows a user to add roles (816A), modify existing roles (816B), assign a role to a user (816C) or delete a role (816D). The user is able to modify roles by changing permissions and attributes for different categories, including datasets, backup, restore, host systems and storage connections. Tab 816E allows a user to assign resources from a single pane including datasets, host systems, storage connections and others. The resources in this instance may be storage or networking resources.

The various plugin downloads may be viewed using tab 816F. The tab provides a view to the user of different plugins that may have been downloaded at different host systems.

FIG. 8T provides a settings pane, according to one aspect. The settings pane allows a user to manage VM credentials for all hosts. Tab 818A may be used to establish new VM connection settings (for example, a storage virtual machine), tab 818B is used to modify the settings and 818C may be used to delete the settings. Details regarding a storage virtual machine is also provided with the port connection and the protocol used.

In one aspect, a centralized server is provided to manage storage services for different applications with different requirements and parameters. The centralized server is able to manage the various operations efficiently based on the uniform format used to manage information regarding stored objects, as described above in detail.

Figure 9:
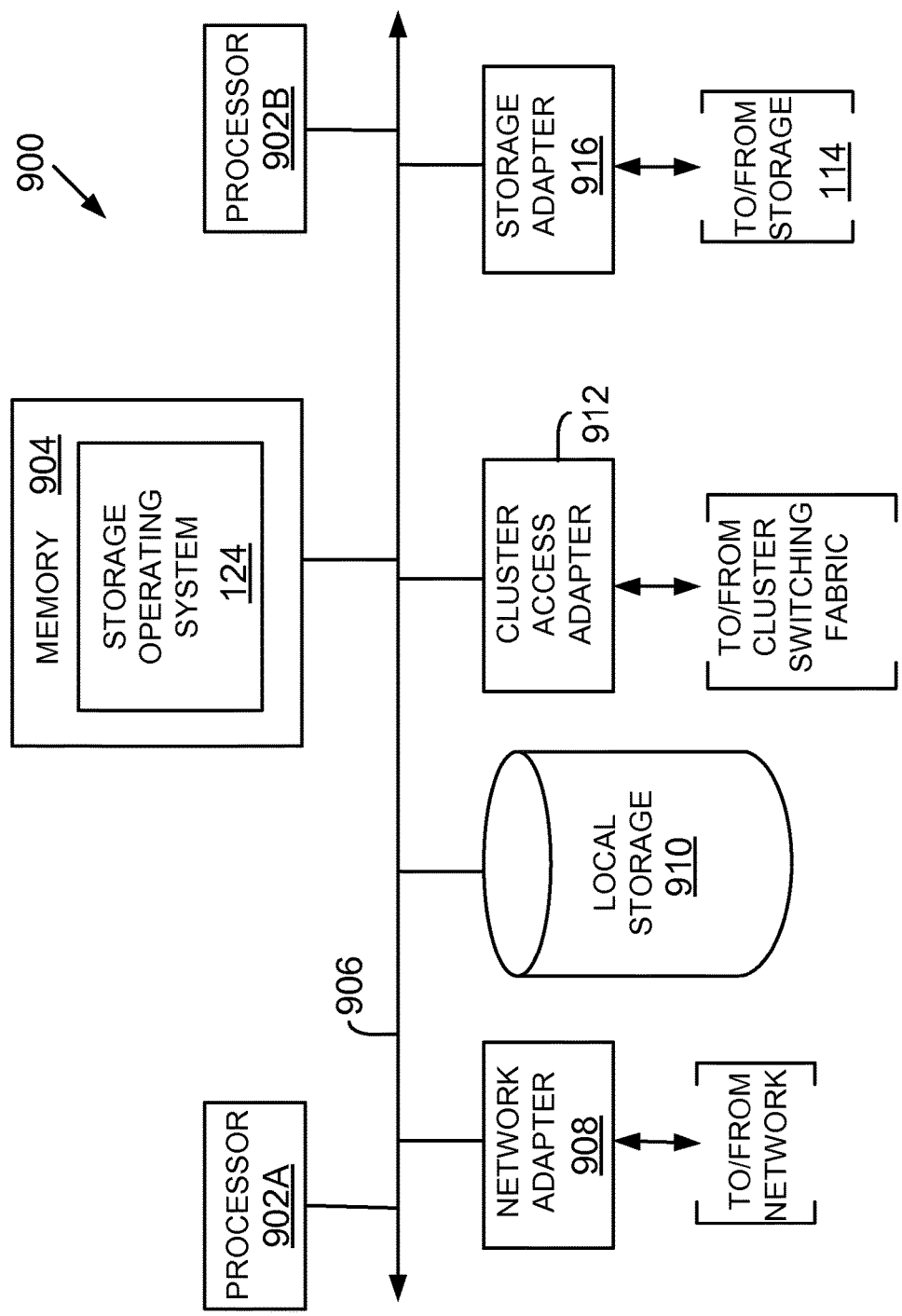
FIG. 9 shows an example of a storage system node, used according to one aspect of the present disclosure.

Storage System Node: FIG. 9 is a block diagram of a system 900, according to one aspect. System 900 may be used by a stand-alone storage system 120 and/or a storage system node operating within a clustered storage system node for performing various storage services described above. System 900 communicates with SAL 151A and/or storage system interface 195 for providing information regarding stored objects, backups, clones, restore operations and others as described above.

System 900 may include a plurality of processors 902A and 902B, a memory 904, a network adapter 908, a cluster access adapter 912 (used for a cluster environment), a storage adapter 916 and local storage 910 interconnected by a system bus 906. The local storage 910 comprises one or more storage devices, such as disks, utilized by the processors to locally store configuration and other information.

The cluster access adapter 912 comprises a plurality of ports adapted to couple system 900 to other nodes of a cluster (not shown). In the illustrative aspect, Ethernet may be used as the clustering protocol and interconnect media, although it will be apparent to those skilled in the art that other types of protocols and interconnects may be utilized within the cluster architecture described herein.

System 900 is illustratively embodied as a dual processor storage system executing a storage operating system 124 that preferably implements a high-level module, such as a file system, to logically organize information as a hierarchical structure of named directories, files and special types of files called virtual disks on storage devices 114. However, it will be apparent to those of ordinary skill in the art that the system 900 may alternatively comprise a single or more than two processor systems.

The memory 904 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the various aspects described herein.

The storage operating system 124, portions of which is typically resident in memory and executed by the processing elements, functionally organizes the system 900 by, inter alia, invoking storage operations in support of the storage service provided by storage system 120. An example of operating system 124 is the DATA ONTAP® (Registered trademark of NetApp, Inc. an operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of the various aspects disclosed herein.

The network adapter 908 comprises a plurality of ports adapted to couple the system 900 to one or more clients (for example, hosts 102) over point-to-point links, wide area networks, virtual private networks implemented over a public network (Internet) or a shared local area network. The network adapter 908 thus may comprise the mechanical, electrical and signaling circuitry needed to connect storage system 120 to the network. Illustratively, the computer network 109 may be embodied as an Ethernet network or a FC network.

The storage adapter 916 cooperates with the storage operating system 124 executing on the system 900 to access information requested by the clients and management application. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 916 comprises a plurality of ports having input/output (I/O) interface circuitry that couples to the disks over an I/O interconnect arrangement, such as a conventional high-performance, Fibre Channel link topology. In another aspect, instead of using a separate network and storage adapter, a converged adapter is used to process both network and storage traffic.

Figure 10:
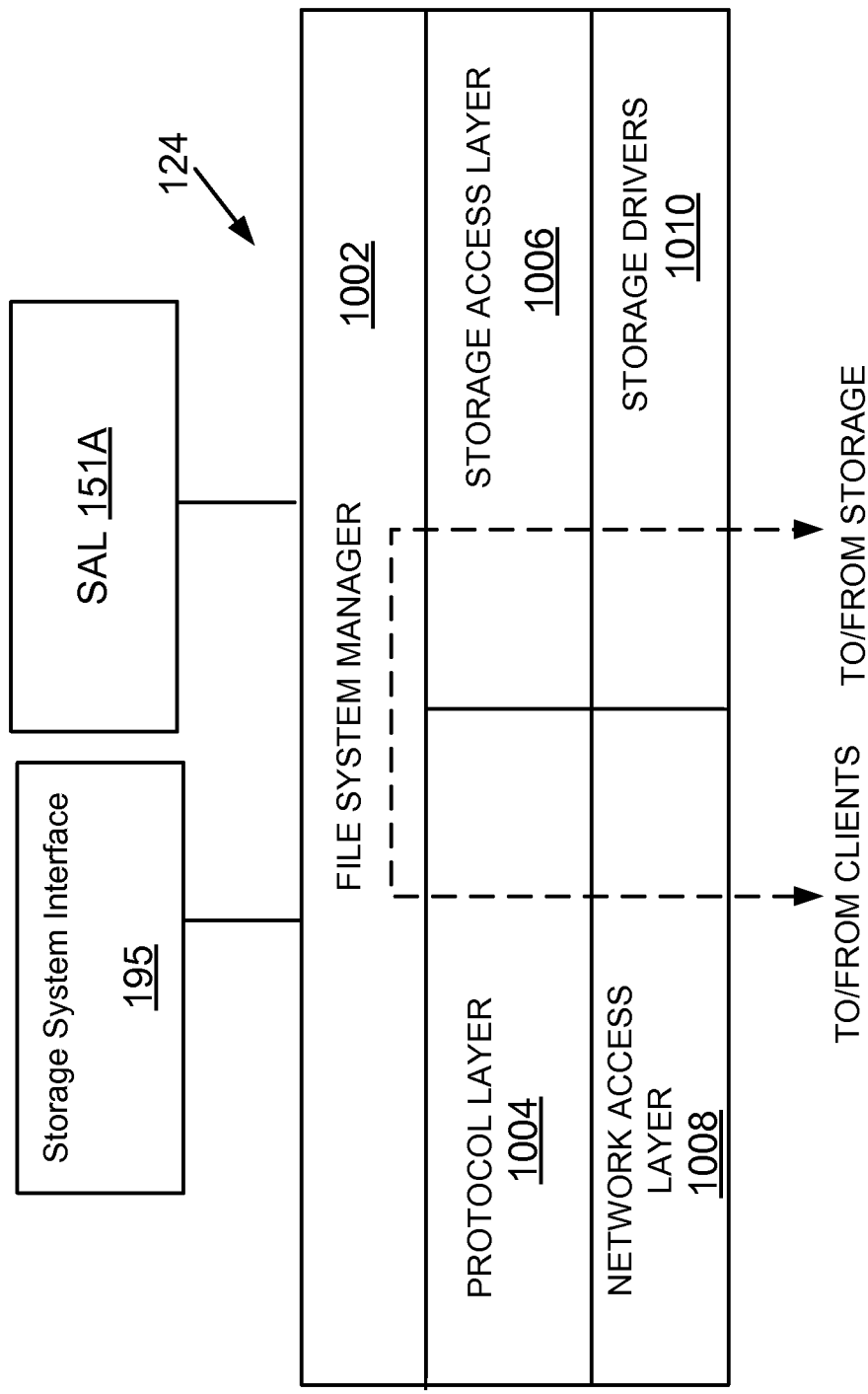
FIG. 10 shows an example of a storage operating system, used according to one aspect of the present disclosure.

Storage Operating System:

FIG. 10 illustrates a generic example of storage operating system 124 executed by storage system 120 and interfacing with storage system interface 195 (or SAL 151A), according to one aspect of the present disclosure. The storage operating system 124 maintains various stored objects and data containers. Storage system interface 195 and/or SAL 151A communicates with different layers of storage operating system 124 for providing storage services in system 100, described above in detail.

As an example, storage operating system 124 may include several modules, or "layers". These layers include a file system manager 1002 that keeps track of a directory structure (hierarchy) of the data stored in storage devices and manages read/write operations, i.e. executes read/write operations on disks in response to client requests.

Storage operating system 124 may also include a protocol layer 1004 and an associated network access layer 1008, to allow system 120 to communicate over a network with other systems. Protocol layer 1004 may implement one or more of various higher-level network protocols, such as NFS, CIFS, Hypertext Transfer Protocol (HTTP), TCP/IP and others, as described below.

Network access layer 1008 may include one or more drivers, which implement one or more lower-level protocols to communicate over the network, such as Ethernet. Interactions between clients (i.e. host systems/applications) and mass storage devices 114 are illustrated schematically as a path, which illustrates the flow of data through storage operating system 124.

The storage operating system 124 may also include a storage access layer 1006 and an associated storage driver layer 1010 to communicate with a storage device. The storage access layer 1006 may implement a higher-level disk storage protocol, such as RAID, while the storage driver layer 1010 may implement a lower-level storage device access protocol, such as FC or SCSI.

It should be noted that the software "path" through the storage operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120 in response to a file system request issued by client 114.

As used herein, the term "storage operating system" generally refers to the computer-executable code operable on a computer to perform a storage function that manages data access and may, in the case of system 120, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the various aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present aspects may be utilized with any suitable file system, including a write in place file system.

Figure 11:
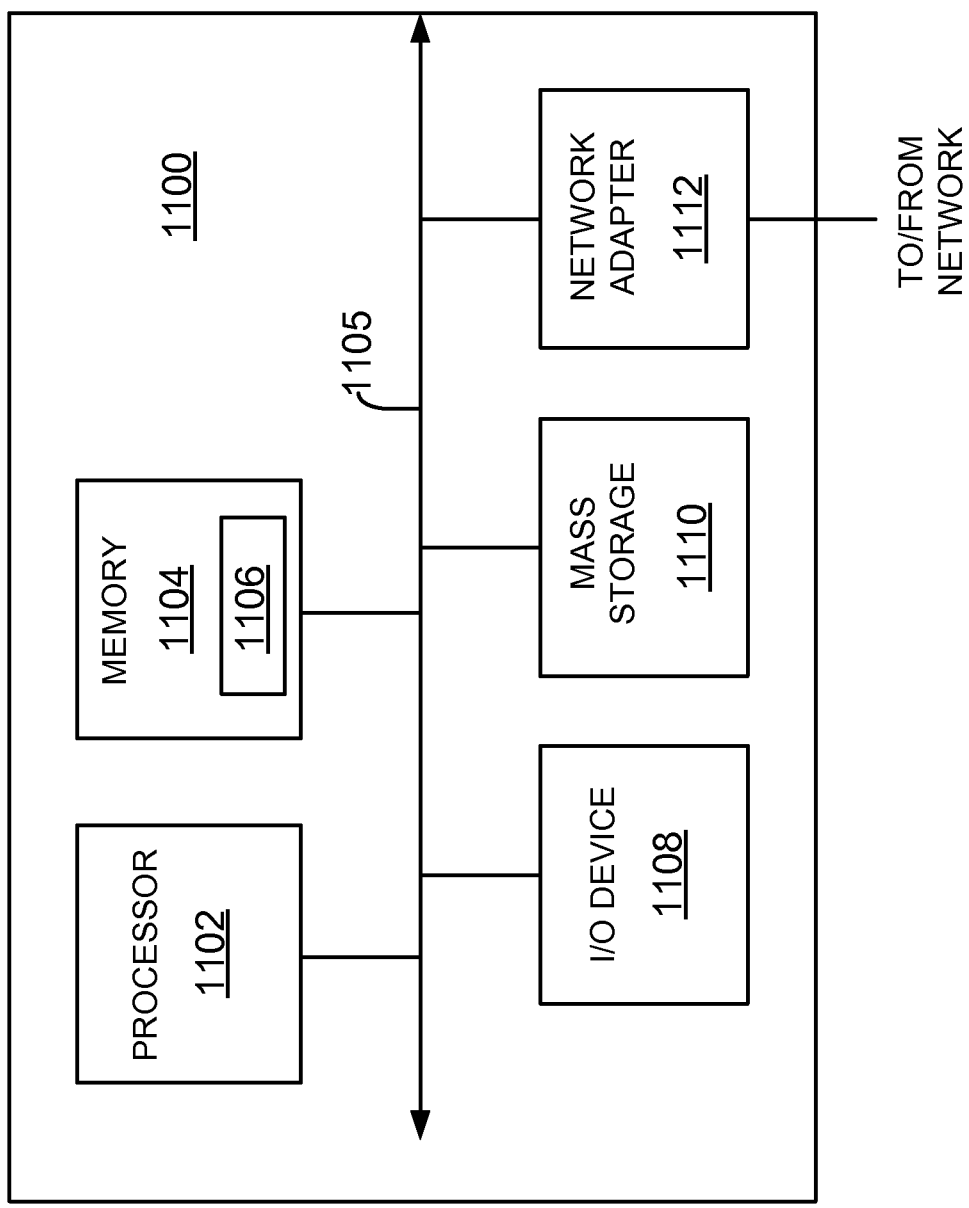
FIG. 11 shows an example of a processing system, used according to one aspect of the present disclosure.

Processing System: FIG. 11 is a high-level block diagram showing an example of the architecture of a processing system, at a high level, in which executable instructions as described above can be implemented. The processing system 1100 can represent SMS 132, host system 102, VMM 106, virtual management console 103, and others. Note that certain standard and well-known components which are not germane to the various aspects of this disclosure are not shown in FIG. 11.

The processing system 1100 includes one or more processors 1102 and memory 1104, coupled to a bus system 1105. The bus system 1105 shown in FIG. 11 is an abstraction that represents any one or more separate physical buses and/or point-to-point connections, connected by appropriate bridges, adapters and/or controllers. The bus system 1105, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 1102 are the central processing units (CPUs) of the processing system 1100 and, thus, control its overall operation. In certain aspects, the processors 1102 accomplish this by executing programmable instructions stored in memory 1104. A processor 1102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1104 represents any form of random access memory (RAM), read-only memory (ROM), flash memory, or the like, or a combination of such devices. Memory 1104 includes the main memory of the processing system 1100. Instructions 1106 which implement the various techniques/process flows introduced above may reside in and may be executed (by processors 1102) from memory 1104. It is noteworthy that portions of instructions 1106 may be executed by different processors out of different memory devices.

Also connected to the processors 1102 through the bus system 1105 are one or more internal mass storage devices 1110, and a network adapter 1112. Internal mass storage devices 1110 may be or may include any conventional medium for storing large volumes of data in a non-volatile manner, such as one or more magnetic or optical based disks. The network adapter 1112 provides the processing system 1100 with the ability to communicate with remote devices (e.g., storage servers) over a network and may be, for example, an Ethernet adapter, a FC adapter, or the like. The processing system 1100 also includes one or more input/output (I/O) devices 1108 coupled to the bus system 1105. The I/O devices 1108 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, a method and apparatus for managing storage services has been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    interfacing by a management application of a device with a plurality of management layers of a plurality of computing devices executing a plurality of applications, each management layer communicating with a plurality of application plugins, the management application using a same request and response format to communicate with the plurality of management layers, regardless of application type, each application plugin associated with an application for providing storage services for application objects stored by a storage system for the plurality of applications;
    maintaining an integrated object corresponding to each application in a same format for indicating a storage protocol, usage of a virtual resource, usage of a physical resource, and a storage share type used for storing data for each application;
    generating a clone dataset object using the management application, for managing a lifecycle of a clone of a backup of a first application object of a first application from among the plurality of applications, where the clone dataset object uses a same format for different configuration settings of the application objects and the application plugins;
    wherein the clone dataset object identifies a first application plugin associated with the first application and includes a first segment with attributes applicable for the plurality of applications and the corresponding application plugins, and a second segment having an attribute associated with the first application;
    identifying by the clone dataset object a mount path for the clone and a computing device associated with the clone;
    selecting the backup from either one of a primary or a secondary storage based on a policy object associated with the clone dataset object, the policy object indicating whether the clone is to be deleted after a scheduled expiration; and
    initiating by the management application, operations associated with the clone lifecycle, based on the first segment and the second segment of the clone dataset object and the policy object,
    wherein the management application instructs a first management layer to execute the operations, and the management layer utilizes the first application plugin for a task associated with the first application and a storage plugin interfacing with the storage system storing data for the first application object, wherein the storage plugin obtains information from the storage system for a first integrated object to execute one of the operations.

2. The method of claim 1, wherein the first application object is a database from among a plurality of databases managed by a database application.

3. The method of claim 1, wherein the plurality of application plugins include a virtual machine plugin interfacing with a virtual machine to obtain virtual storage information associated with a virtual storage object used for storing data for the first application object.

4. The method of claim 1, wherein the first application object is a virtual machine and includes data stored for the virtual machine.

5. The method of claim 1, wherein to delete the clone as one of the clone life cycle operations, a cloned application instance identified by the clone dataset object is deregistered by an operating system of the computing device.

6. The method of claim 1, wherein application objects are added to the clone dataset object via a user interface provided by the management application for enabling clone cycle management based on user preferences.

7. The method of claim 1, wherein the clone life cycle operations, comprising:
    obtaining metadata associated with the backup of the first application object by the management application; and
    requesting clone creation by the management application, and the first management layer coordinating clone creation with the first application plugin and the storage plugin.

8. A non-transitory, machine readable storage medium having stored thereon instructions for performing a method, comprising machine executable code which when executed by one or more machines, causes the one or more machines to:
    interface by a management application of a device with a plurality of management layers of a plurality of computing devices executing a plurality of applications, each management layer communicating with a plurality of application plugins, the management application using a same request and response format to communicate with the plurality of management layers, regardless of application type, each application plugin associated with an application for providing storage services for application objects stored by a storage system for the plurality of applications;
    maintain an integrated object corresponding to each application in a same format for indicating a storage protocol, usage of a virtual resource, usage of a physical resource, and a storage share type used for storing data for each application;
    generate a clone dataset object using the management application, for managing a lifecycle of a clone of a backup of a first application object of a first application from among the plurality of applications, where the clone dataset object uses a same format for different configuration settings of the application objects and the application plugins;
    wherein the clone dataset object identifies a first application plugin associated with the first application and includes a first segment with attributes applicable for the plurality of applications and the corresponding application plugins, and a second segment having an attribute associated with the first application;

identify by the clone dataset object a mount path for the clone and a computing device associated with the clone;

select the backup from either one of a primary or a secondary storage based on a policy object associated with the clone dataset object, the policy object indicating whether the clone is to be deleted after a scheduled expiration; and initiate by the management application, operations associated with the clone lifecycle, based on the first segment and the second segment of the clone dataset object and the policy object, wherein the management application instructs a first management layer to execute the operations, and the management layer utilizes the first application plugin for a task associated with the first application and a storage plugin interfacing with the storage system storing data for the first application object, wherein the storage plugin obtains information from the storage system for a first integrated object to execute one of the operations.

9. The storage medium of claim 8, wherein the first application object is a database from among a plurality of databases managed by a database application.

10. The storage medium of claim 8, wherein the plurality of application plugins include a virtual machine plugin interfacing with a virtual machine to obtain virtual storage information associated with a virtual storage object used for storing data for the first application object.

11. The storage medium of claim 8, wherein the first application object is a virtual machine and includes data stored for the virtual machine.

12. The storage medium of claim 8, wherein to delete the clone as one of the clone life cycle operations, a cloned application instance identified by the clone dataset object is deregistered by an operating system of the computing device.

13. The storage medium of claim 8, wherein application objects are added to the clone dataset object via a user interface provided by the management application for enabling clone cycle management based on user preferences.

14. The storage medium of claim 8, wherein the machine executable code further causes the machine to:

obtain metadata associated with the backup of the first application object by the management application; and request clone creation by the management application, and the first management layer coordinating clone creation with the first application plugin and the storage plugin.

15. A system, comprising:

a memory containing machine readable medium comprising machine executable code having stored thereon instructions; and a processor module of a device coupled to the memory, the processor module configured to execute the machine executable code to:

interface by a management application of the device with a plurality of management layers of a plurality of computing devices executing a plurality of applications, each management layer communicating with a plurality of application plugins, the management application using a same request and response format to communicate with the plurality of management layers, regardless of application type, each application plugin associated with an application for providing storage services for application objects stored by a storage system for the plurality of applications;

maintain an integrated object corresponding to each application in a same format for indicating a storage protocol, usage of a virtual resource, usage of a physical resource, and a storage share type used for storing data for each application;

generate a clone dataset object using the management application, for managing a lifecycle of a clone of a backup of a first application object of a first application from among the plurality of applications, where the clone dataset object uses a same format for different configuration settings of the application objects and the application plugins;

wherein the clone dataset object identifies a first application plugin associated with the first application and includes a first segment with attributes applicable for the plurality of applications and the corresponding application plugins, and a second segment having an attribute associated with the first application;

identify by the clone dataset object a mount path for the clone and a computing device associated with the clone;

select the backup from either one of a primary or a secondary storage based on a policy object associated with the clone dataset object, the policy object indicating whether the clone is to be deleted after a scheduled expiration; and initiate by the management application, operations associated with the clone lifecycle, based on the first segment and the second segment of the clone dataset object and the policy object, wherein the management application instructs a first management layer to execute the operations, and the management layer utilizes the first application plugin for a task associated with the first application and a storage plugin interfacing with the storage system storing data for the first application object, wherein the storage plugin obtains information from the storage system for a first integrated object to execute one of the operations.

16. The system of claim 15, wherein the first application object is a database from among a plurality of databases managed by a database application.

17. The system of claim 15, wherein the plurality of application plugins include a virtual machine plugin interfacing with a virtual machine to obtain virtual storage information associated with a virtual storage object used for storing data for the first application object.

18. The system of claim 15, wherein the first application object is a virtual machine and includes data stored for the virtual machine.

19. The system of claim 15, wherein to delete the clone as one of the clone life cycle operations, a cloned application instance identified by the clone dataset object is deregistered by an operating system of the computing device.

20. The system of claim 15, wherein application objects are added to the clone dataset object via a user interface provided by the management application for enabling clone cycle management based on user preferences.

* * * * *